United States Patent
Nakano et al.

(10) Patent No.: US 9,774,608 B2
(45) Date of Patent: Sep. 26, 2017

(54) DEVICE CONTROL METHOD, DEVICE CONTROL SYSTEM, AND SERVER DEVICE

(71) Applicant: Panasonic Intellectual Property Management Co., Ltd., Osaka (JP)

(72) Inventors: Toshihisa Nakano, Osaka (JP); Masayuki Kozuka, Osaka (JP); Masataka Minami, Hyogo (JP); Motoji Ohmori, Osaka (JP); Takeshi Matsuo, Nara (JP); Tsuyoshi Sakata, Kanagawa (JP); Fumiaki Suzuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 5 days.

(21) Appl. No.: 14/415,807

(22) PCT Filed: Aug. 1, 2013

(86) PCT No.: PCT/JP2013/004651
§ 371 (c)(1),
(2) Date: Jan. 20, 2015

(87) PCT Pub. No.: WO2014/024428
PCT Pub. Date: Feb. 13, 2014

(65) Prior Publication Data
US 2015/0180880 A1    Jun. 25, 2015

Related U.S. Application Data

(60) Provisional application No. 61/680,394, filed on Aug. 7, 2012.

(51) Int. Cl.
| | |
|---|---|
| *H04L 29/06* | (2006.01) |
| *G08C 17/02* | (2006.01) |
| *G05B 15/02* | (2006.01) |
| *H04L 12/28* | (2006.01) |
| *H04M 1/725* | (2006.01) |

(52) U.S. Cl.
CPC ............ *H04L 63/107* (2013.01); *G05B 15/02* (2013.01); *G08C 17/02* (2013.01);
(Continued)

(58) Field of Classification Search
CPC ............ H04L 63/0853; H04L 12/2807; H04L 63/105; H04L 63/107; H04M 1/72533; G05B 15/02
See application file for complete search history.

(56) References Cited

U.S. PATENT DOCUMENTS

| | | | | |
|---|---|---|---|---|
| 7,228,429 | B2 * | 6/2007 | Monroe | ............... G08B 25/085 713/182 |
| 8,239,922 | B2 * | 8/2012 | Sullivan | ............... F24F 11/0009 236/51 |

(Continued)

FOREIGN PATENT DOCUMENTS

| | | |
|---|---|---|
| JP | 2001-145175 | 5/2001 |
| JP | 2002-44763 | 2/2002 |

(Continued)

OTHER PUBLICATIONS

International Search Report issued Sep. 17, 2013 in corresponding International Application No. PCT/JP2013/004651.

*Primary Examiner* — Saleh Najjar
*Assistant Examiner* — Devin Almeida
(74) *Attorney, Agent, or Firm* — Wenderoth, Lind & Ponack, L.L.P.

(57) ABSTRACT

A device control method used in a device control system in which an operation terminal is used to remotely operate a device with a server device mediating between the operation terminal and the device, the device control method including: acquiring, upon reception of an operation instruction for operation of the device from the operation terminal, environment information pertaining to at least one of the device and the operation terminal; performing a determination of (Continued)

whether or not to cause execution of processing corresponding to the operation instruction based on whether or not the environment information satisfies a predetermined condition; and causing the device to execute an execution command for execution of the processing when a result of the determination is affirmative, and not causing the device to execute the execution command when the result of the determination is negative.

16 Claims, 40 Drawing Sheets

(52) U.S. Cl.
CPC ...... *H04L 12/2807* (2013.01); *H04L 63/0853* (2013.01); *H04L 63/105* (2013.01); *H04M 1/72533* (2013.01); *G08C 2201/42* (2013.01); *G08C 2201/93* (2013.01)

(56) References Cited

U.S. PATENT DOCUMENTS

| | | | |
|---|---|---|---|
| 2001/0032254 A1* | 10/2001 | Hawkins | G06F 17/3089 709/219 |
| 2002/0147926 A1* | 10/2002 | Pecen | H04W 12/06 726/7 |
| 2006/0044106 A1* | 3/2006 | Hirose | H04L 12/2805 340/3.54 |
| 2007/0055415 A1* | 3/2007 | Taki | B60R 25/2018 701/2 |
| 2007/0293190 A1* | 12/2007 | Ota | G08C 17/00 455/404.2 |
| 2008/0001773 A1* | 1/2008 | Rye | G08C 17/00 340/4.31 |
| 2009/0133051 A1* | 5/2009 | Hildreth | H04N 5/4403 725/28 |
| 2012/0210150 A1* | 8/2012 | de Lind van Wijngaarden | G06F 1/3212 713/320 |

FOREIGN PATENT DOCUMENTS

| | | |
|---|---|---|
| JP | 2003-120984 | 4/2003 |
| JP | 2003-172536 | 6/2003 |
| JP | 2003-319471 | 11/2003 |
| JP | 2005-348037 | 12/2005 |
| JP | 2007-336227 | 12/2007 |
| WO | 2004/102902 | 11/2004 |

* cited by examiner

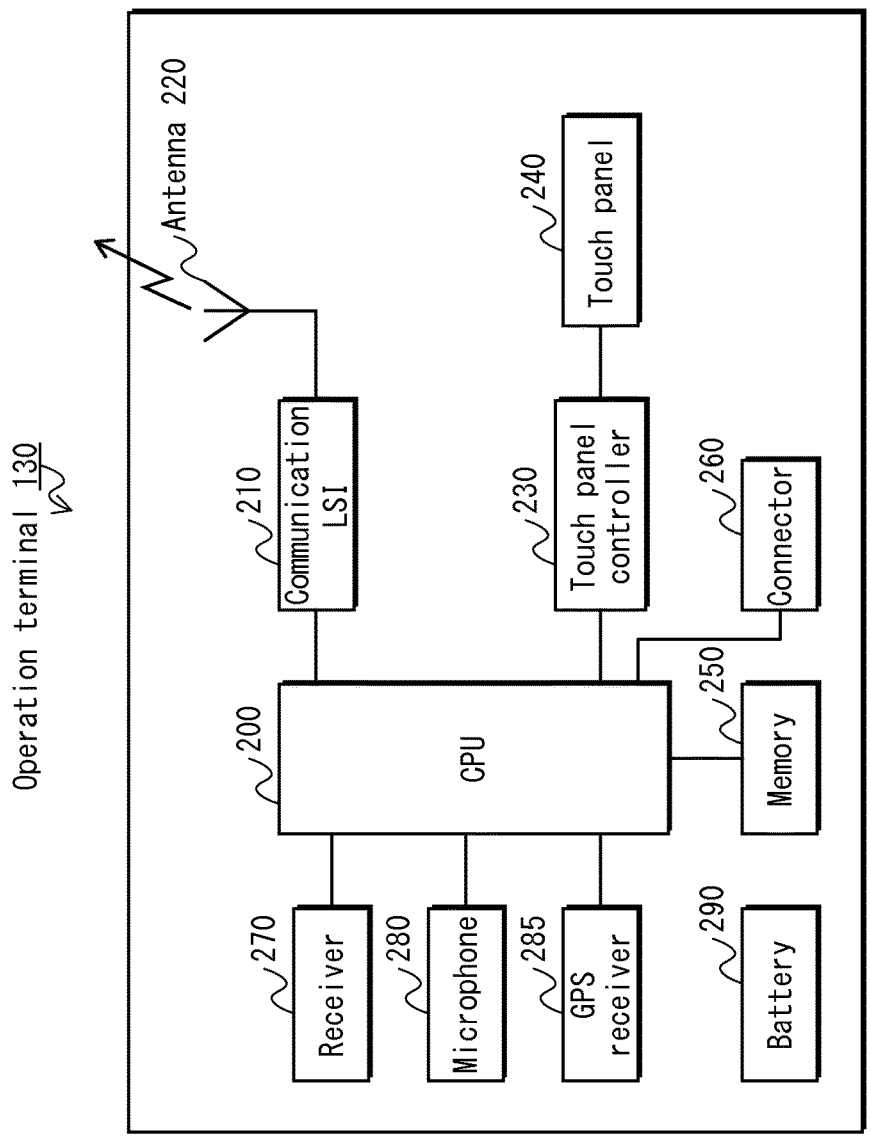

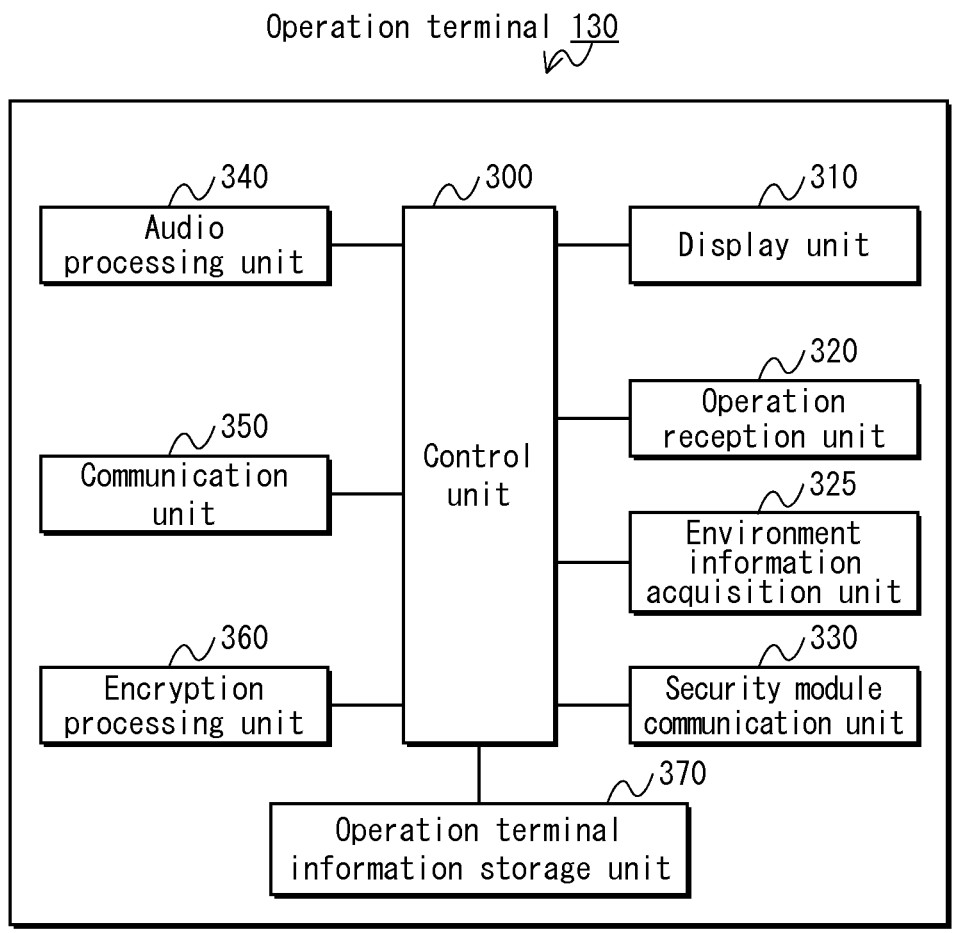

FIG. 11

Device information 1000

| Device type | Model number | Function | Security level | Command |
|---|---|---|---|---|
| Air conditioner | CS-X252C | Power ON | 1 | 0x3F389792B600 |
| | | Power OFF | 2 | 0x3F389792B6FF |
| | | Switch operation | 1 | 0x3F3911E0DD49 |
| | | Set timer | 1 | 0x3F33558264F3 |

FIG. 18

User information 1800

| User name 1810 | User account 1820 | Password 1830 | Attribute information 1840 | Device type 1850 | Model number 1860 | Security module ID 1870 |
|---|---|---|---|---|---|---|
| User A | xxxyyy... | C53B2473E9... | Address Telephone number Date of birth | Air conditioner | CS-X252C | 0xC63694AD |
| | | | | Refrigerator | NR-F456T | 0x50871E32 |
| | | | | Recorder | DMR-BZ820 | 0xFEBD41DC |
| | | | | Washing machine | NA-VH300L | 0xB3708D77 |
| | | | | Rice cooker | SR-SPX103 | 0x13CE6042 |
| | | | | Smartphone | P-06D | 0x481DA188 |
| User B | ... | ... | ... | ... | ... | ... |
| ... | ... | ... | ... | ... | ... | ... |

FIG. 19

Function information 1900

| Device type | Model number | Function | Security level |
|---|---|---|---|
| Air conditioner | CS-X252C | Power ON | 1 |
| | | Power OFF | 2 |
| | | Switch operation | 1 |
| | | Set timer | 1 |
| | CS-SX252C | ⋮ | ⋮ |
| | | ⋮ | ⋮ |
| | ⋮ | ⋮ | ⋮ |
| ⋮ | ⋮ | ⋮ | ⋮ |
| Recorder | DMR-BZT820 | Power ON | 1 |
| | | Power OFF | 2 |
| | | Programmed recording | 2 |
| | | ⋮ | ⋮ |
| | ⋮ | ⋮ | ⋮ |
| Washing machine | NA-VH300L | Power ON | 1 |
| | | Power OFF | 2 |
| | | ⋮ | ⋮ |
| Rice cooker | SR-SPX103 | Power ON | 1 |
| | | Power OFF | 2 |
| | | ⋮ | ⋮ |
| ⋮ | ⋮ | ⋮ | ⋮ |

Columns: 1910 Device type, 1920 Model number, 1930 Function, 1940 Security level

FIG. 20

Command information 2000

| Device type | Model number | Function | Command |
|---|---|---|---|
| Air conditioner | CS-X252C | Power ON | 0x3F389792B600 |
| | | Power OFF | 0x3F389792B6FF |
| | | Switch operation | 0x3F3911E0DD49 |
| | | Set timer | 0x3F33558264F3 |
| | CS-SX252C | ⋮ | ⋮ |
| | | ⋮ | ⋮ |
| ⋮ | ⋮ | ⋮ | ⋮ |
| Recorder | DMR-BZT820 | Power ON | 0xD827603A6FC0 |
| | | Power OFF | 0xD827603A6FC9 |
| | | Programmed recording | 0xD8278AF19535 |
| | | ⋮ | ⋮ |
| | ⋮ | ⋮ | ⋮ |
| Washing machine | NA-VH300L | Power ON | 0x5BB92B30C1A0 |
| | | Power OFF | 0x5BB92B30C1DF |
| | | ⋮ | ⋮ |
| Rice cooker | SR-SPX103 | Power ON | 0x7677CF48FD00 |
| | | Power OFF | 0x7677CF48FDFF |
| | | ⋮ | ⋮ |
| ⋮ | ⋮ | ⋮ | ⋮ |

Operation condition information 3000

| Device type | Model number | Function | Operation condition |
|---|---|---|---|
| Air conditioner | CS-X252C | Power ON | — |
| | | Power OFF | Reject while in operation |
| | | Switch operation | Reject while in operation |
| | | Set timer | — |
| | CS-SX252C | ⋮ | ⋮ |
| | | ⋮ | ⋮ |
| ⋮ | ⋮ | ⋮ | ⋮ |
| Recorder | DMR-BZT820 | Power ON | — |
| | | Power OFF | Reject while in recording |
| | | Programmed recording | — |
| | | ⋮ | ⋮ |
| | ⋮ | ⋮ | ⋮ |
| Washing machine | NA-VH300L | Power ON | — |
| | | Power OFF | Reject while in washing |
| | | ⋮ | ⋮ |
| Rice cooker | SR-SPX103 | Power ON | — |
| | | Power OFF | Reject while in rice-cooking |
| | | ⋮ | ⋮ |
| ⋮ | ⋮ | ⋮ | ⋮ |

Columns: 3010, 3020, 3030, 3040

FIG. 22

Location condition information 3100

| Device type | Model number | Function | Location condition |
|---|---|---|---|
| Air conditioner | CS-X252C | Power ON | <10km |
| | | Power OFF | — |
| | | Switch operation | <10km |
| | | Set timer | <10km |
| | CS-SX252C | ⋮ | ⋮ |
| | | ⋮ | ⋮ |
| ⋮ | ⋮ | ⋮ | ⋮ |
| Recorder | DMR-BZT820 | Power ON | <50km |
| | | Power OFF | — |
| | | Programmed recording | — |
| | | ⋮ | ⋮ |
| | | ⋮ | ⋮ |
| Washing machine | NA-VH300L | Power ON | <30km |
| | | Power OFF | — |
| | | ⋮ | ⋮ |
| Rice cooker | SR-SPX103 | Power ON | <20km |
| | | Power OFF | — |
| | | ⋮ | ⋮ |
| ⋮ | ⋮ | ⋮ | ⋮ |

Date/time condition information 3200

| Device type 3210 | Model number 3220 | Function 3230 | Date/time condition 3240 |
|---|---|---|---|
| Air conditioner | CS-X252C | Power ON | — |
| | | Power OFF | — |
| | | Switch operation | Reject heating from June to September Reject cooling from November to March |
| | | Set timer | — |
| | CS-SX252C | ⋮ | ⋮ |
| | | ⋮ | ⋮ |
| | ⋮ | ⋮ | ⋮ |
| ⋮ | ⋮ | ⋮ | ⋮ |
| Recorder | DMR-BZT820 | Power ON | — |
| | | Power OFF | — |
| | | Programmed recording | — |
| | | ⋮ | ⋮ |
| | ⋮ | ⋮ | ⋮ |
| Washing machine | NA-VH300L | Power ON | Reject from 10 P.M. to 5 A.M. the following day |
| | | Power OFF | — |
| | | ⋮ | ⋮ |
| Rice cooker | SR-SPX103 | Power ON | — |
| | | Power OFF | — |
| | | ⋮ | ⋮ |
| ⋮ | ⋮ | ⋮ | ⋮ |

FIG. 24

Temperature condition information 3300

| Device type 3310 | Model number 3320 | Function 3330 | Temperature condition 3340 |
|---|---|---|---|
| Air conditioner | CS-X252C | Power ON | — |
| | | Power OFF | — |
| | | Switch operation | Reject heating when temperature is 25°C or higher Reject cooling when temperature is 20°C or lower |
| | | Set timer | — |
| | CS-SX252C | ⋮ | ⋮ |
| | | ⋮ | ⋮ |
| ⋮ | ⋮ | ⋮ | ⋮ |
| Recorder | DMR-BZT820 | Power ON | — |
| | | Power OFF | — |
| | | Programmed recording | — |
| | | ⋮ | ⋮ |
| | ⋮ | ⋮ | ⋮ |
| ⋮ | ⋮ | ⋮ | ⋮ |

FIG. 25

In-room presence condition information 3400

| Device type | Model number | Function | When person present in room |
|---|---|---|---|
| Air conditioner | CS-X252C | Power ON | Reject |
| | | Power OFF | Reject |
| | | Switch operation | Reject |
| | | Set timer | Permit |
| | CS-SX252C | ⋮ | ⋮ |
| | | ⋮ | ⋮ |
| | ⋮ | ⋮ | ⋮ |
| ⋮ | ⋮ | ⋮ | ⋮ |
| Recorder | DMR-BZT820 | Power ON | Reject |
| | | Power OFF | Reject |
| | | Programmed recording | Permit |
| | | ⋮ | ⋮ |
| | ⋮ | ⋮ | ⋮ |
| ⋮ | ⋮ | ⋮ | ⋮ |

User information 1800B

| User name 1810 | User account 1820 | Password 1830 | E-mail address 1835 | Authority level 1836 | Attribute information 1840 | Device type 1850 | Model number 1860 | Security module ID 1870 |
|---|---|---|---|---|---|---|---|---|
| User A | xxxxyyy... | C53B2473E9... | userA@aa.com | 1 | Address | Air conditioner | CS-X252C | 0xC63694AD |
| | | | | | Telephone number | Refrigerator | NR-F456T | 0x50871E32 |
| | | | | | Date of birth | Recorder | DMR-BZ820 | 0xFEBD41DC |
| | | | | | | Washing machine | NA-VH300L | 0xB3708D77 |
| | | | | | | Rice cooker | SR-SPX103 | 0x13CE6042 |
| | | | | | | Smartphone | P-06D | 0x481DA188 |
| User B | ... | ... | ... | ... | ... | ... | ... | ... |
| ... | | | | | | | | |

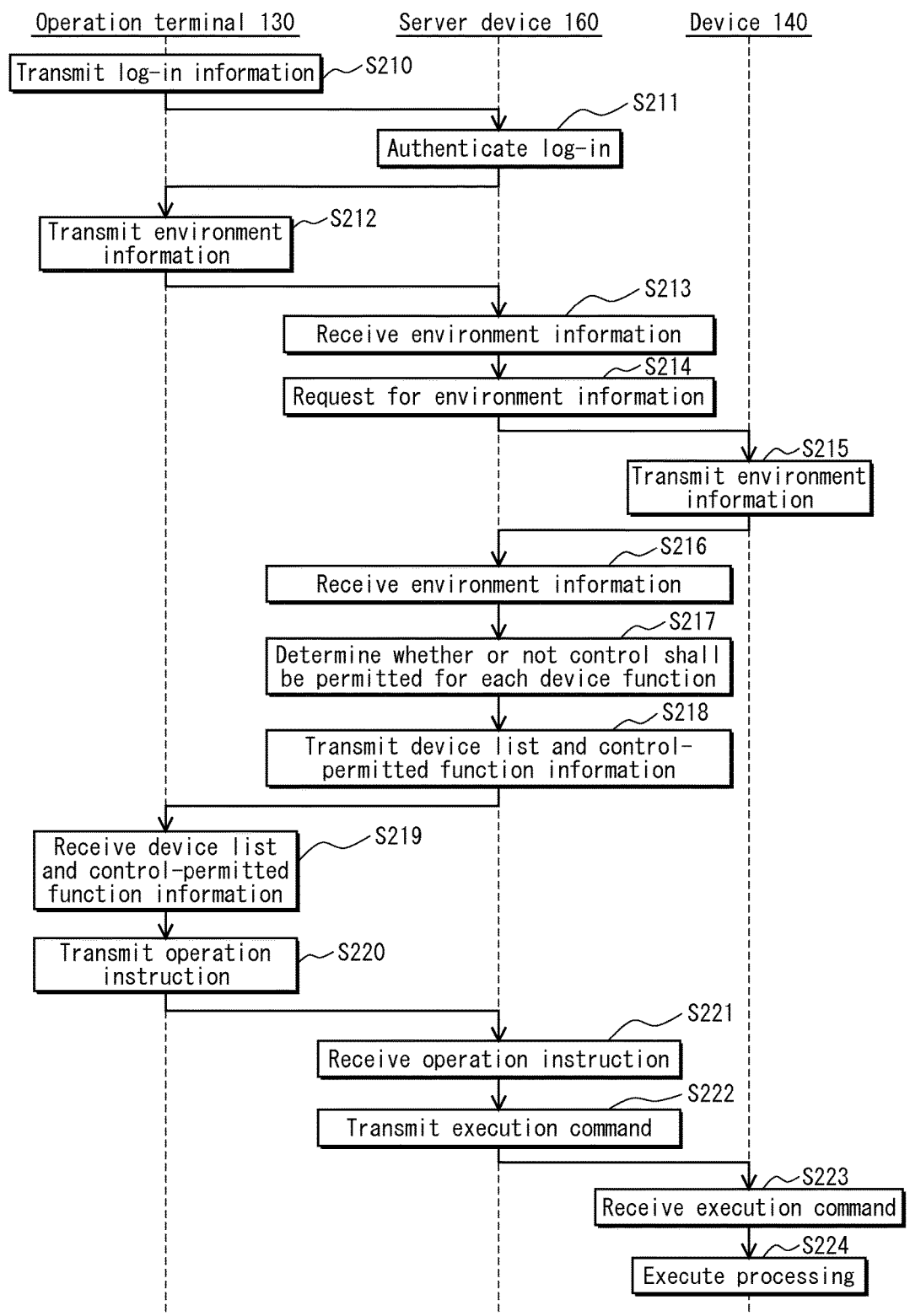

FIG. 40

User information 1800C

| User name | Device type | Model number | Security module ID | Location information |
|---|---|---|---|---|
| | 1850 | 1860 | 1870 | 1880 |
| User A | Air conditioner | CS-X252C | 0xC63694AD | Latitude: N34.7337803<br>Longitude: E135.575919 |
| | Refrigerator | NR-F456T | 0x50871E32 | Latitude: N34.7337828<br>Longitude: E135.575913 |
| | Recorder | DMR-BZ820 | 0xFEBD41DC | Latitude: N34.7337810<br>Longitude: E135.575925 |
| | Washing machine | NA-VH300L | 0xB3708D77 | Latitude: N34.7337832<br>Longitude: E135.575942 |
| | Rice cooker | SR-SPX103 | 0x13CE6042 | Latitude: N34.7337822<br>Longitude: E135.575915 |
| | Smartphone | P-06D | 0x481DA188 | GPS |
| | ... | ... | ... | ... |
| User B | ... | | | |
| ... | | | | |

User information 1800D

| Group | User name 1801 | User account 1810 | Password 1820 | E-mail address 1830 | 1835 | Authority level 1836 | Attribute information 1840 | Device type 1850 | Model number 1860 | Security module ID 1870 | Class 1890 |
|---|---|---|---|---|---|---|---|---|---|---|---|
| Group G | User A | xxxyyy... | C53B2473E9... | userA@aa.com |  | 1 | Address Telephone number Date of birth | Air conditioner | CS-X252C | 0xC63694AD | Device |
|  |  |  |  |  |  |  |  | Refrigerator | NR-F456T | 0x50871E32 | Device |
|  |  |  |  |  |  |  |  | Recorder | DMR-BZ820 | 0xFEBD41DC | Device |
|  |  |  |  |  |  |  |  | Washing machine | NA-VH300L | 0xB3708D77 | Device |
|  | User B | aaabbb... | 353CF471BC... | userB@zz.com |  | 0 | Address Telephone number Date of birth | Rice cooker | SR-SPX103 | 0x13CE6042 | Operation terminal |
|  |  |  |  |  |  |  |  | Smartphone | P-06D | 0x481DA188 | Operation terminal |
|  |  |  |  |  |  |  |  | Smartphone | P-02D | 0x06BC5D8F |  |
|  | User C | ... | ... | ... |  | 1 | ... | ... | ... | ... | ... |
| ... | ... | ... | ... | ... |  | ... | ... | ... | ... | ... | ... |

DEVICE CONTROL METHOD, DEVICE CONTROL SYSTEM, AND SERVER DEVICE

This application is the National Stage of International Application No. PCT/JP2013/004651, filed Aug. 1, 2013, which claims the benefit of U.S. Provisional Application No. 61/680,394, filed Aug. 7, 2012.

TECHNICAL FIELD

The present invention relates to a system for controlling a device, and in particular to control technology for remotely operating a device.

BACKGROUND ART

Some conventional household electronic devices can be remotely operated via operation terminals that communicate with the electronic devices over the interne, a communications network for portable phones, or the like. Patent Literature 1 discloses a home appliance remote control system for collectively managing a plurality of electronic devices that can be remotely operated in such a manner. The home appliance remote control system disclosed in Patent Literature 1 includes a central device. For each electronic device, an associated set of identification information identifying the electronic device and one or more remote operation commands each for remotely operating the electronic device is registered in advance to the central device. A user of the home appliance remote control system, in order to remotely operate an electronic device, accesses the central device from an operation terminal such as a portable communication terminal, reads information on the operation-target electronic device from the central device, and issues an operation instruction with respect to the operation-target electronic device. The central device, when receiving the operation instruction from the user, transmits a remote operation command corresponding to the operation instruction to the operation-target electronic device. The operation-target electronic device receives the remote operation command from the central device and executes processing according to the remote operation command.

CITATION LIST

Patent Literature

[Patent Literature 1]
Japanese Patent Application Publication No. 2003-319471

SUMMARY

Technical Problem

Here, it should be noted that in the home appliance remote control system disclosed in Patent Literature 1, the central device transmits a remote operation command corresponding to an operation instruction to an operation-target electronic device even if the operation instruction has been erroneously issued and is not the operation instruction originally desired by the user or even if execution of processing based on the operation instruction is inappropriate under the operation state of the operation-target electronic device at the point when the operation instruction is issued. Further, even those not having legitimate operation authority, if having access to the central device, can issue operation instructions, which would result in electronic devices executing processing based on remote operation commands received from the central device. As such, processing is executed based on operation instructions even when the operation instructions are those corresponding to processing that should not be executed (i.e., inappropriate operation instructions), which is problematic.

In view of the above, one aim of the present invention is to provide a device control method that prevents remote operation of devices based on inappropriate operation instructions.

Solution to Problem

In view of the above, one aspect of the present invention is a device control method used in a device control system in which an operation terminal is used to remotely operate a device with a server device mediating between the operation terminal and the device, the device control method including: receiving, from the operation terminal, an operation instruction for operation of the device; acquiring, upon reception of the operation instruction, environment information pertaining to at least one of the device and the operation terminal; performing a first determination of whether or not to cause execution of processing corresponding to the operation instruction based on whether or not the environment information satisfies a predetermined condition; and performing restriction of command execution such that (i) the device is caused to execute an execution command for execution of the processing when a result of the first determination is affirmative, and (ii) the device is not caused to execute the execution command when the result of the first determination is negative.

Advantageous Effects

The device control method pertaining to one aspect of the present invention determines whether or not to execute processing indicated by an operation instruction based on environment information of a device and an operation terminal at the point when remote operation is performed. Thus, the device control method pertaining to one aspect of the present invention prevents remote operation of devices based on inappropriate operation instructions.

BRIEF DESCRIPTION OF DRAWINGS

FIG. 3 illustrates hardware structure of operation terminal 130.

FIG. 4 is a functional block diagram of main part of operation terminal 130.

FIG. 5 illustrates one example of data structure and data of operation terminal information 400.

FIG. 11 illustrates one example of data structure and data of device information 1000.

FIG. 18 illustrates one example of data structure and data of user information 1800.

FIG. 19 illustrates one example of data structure and data of function information 1900.

FIG. 20 illustrates one example of data structure and data of command information 2000.

FIG. 21 illustrates one example of data structure and data of operation condition information 3000.

FIG. 22 illustrates one example of data structure and data of location condition information 3100.

FIG. 23 illustrates one example of data structure and data of date/time condition information 3200.

FIG. 24 illustrates one example of data structure and data of temperature condition information 3300.

FIG. 25 illustrates one example of data structure and data of in-room presence condition information 3400.

FIG. 33 illustrates one example of data structure and data of user information 1800B.

FIG. 39 illustrates one example of user interface of operation terminal 130 in embodiment 3.

FIG. 40 illustrates one example of data structure and data of user information 1800C in one modification.

FIG. 41 illustrates one example of data structure and data of user information 1800D in another modification.

DESCRIPTION OF EMBODIMENTS

<1. Embodiment 1>

<1.1 Overview>

The following describes one embodiment of the device control method pertaining to the present invention. In specific, the following describes a device control system where devices located inside a house can be controlled by using an operation terminal that is taken outside the house.

In the device control system, when a server device receives an operation instruction from an operation terminal, the server device acquires environment information from the operation terminal and an operation-target device. Then, the server device refers to one or more environment conditions corresponding to a function indicated by the operation instruction, and controls the operation-target device to execute the function only when the environment information having been acquired satisfies the environment conditions. Note that the environment conditions corresponding to the function are stored to the server device in advance, along with environment conditions for other functions.

Note that in the present disclosure, environment information of a given device (may be an operation terminal or an operation-target device) is information acquirable by the device and/or by a sensor or the like provided to the device, and includes, for example, at least one of: information indicating the location of the device; information indicating the operation state of the device; information indicating season, date/time, and/or the like; information indicating the state around the device (for example, the temperature, the humidity, the amount of light, and/or the presence or absence of a person around the device); and information indicating authority and priority related to operations.

Here, it should be noted that in the device control method pertaining to the present invention, even when a user issues an operation instruction for remotely operating a device, the server device prevents a function corresponding to the operation instruction from being executed when environment information at the point of issuance of the operation instruction does not satisfy predetermined environment conditions. Thus, the device control method pertaining to the present invention prevents functions corresponding to operation instructions determined as being inappropriate from being executed.

<1.2 Structure>

<1.2.1 Device Control System 100>

Figure 1:
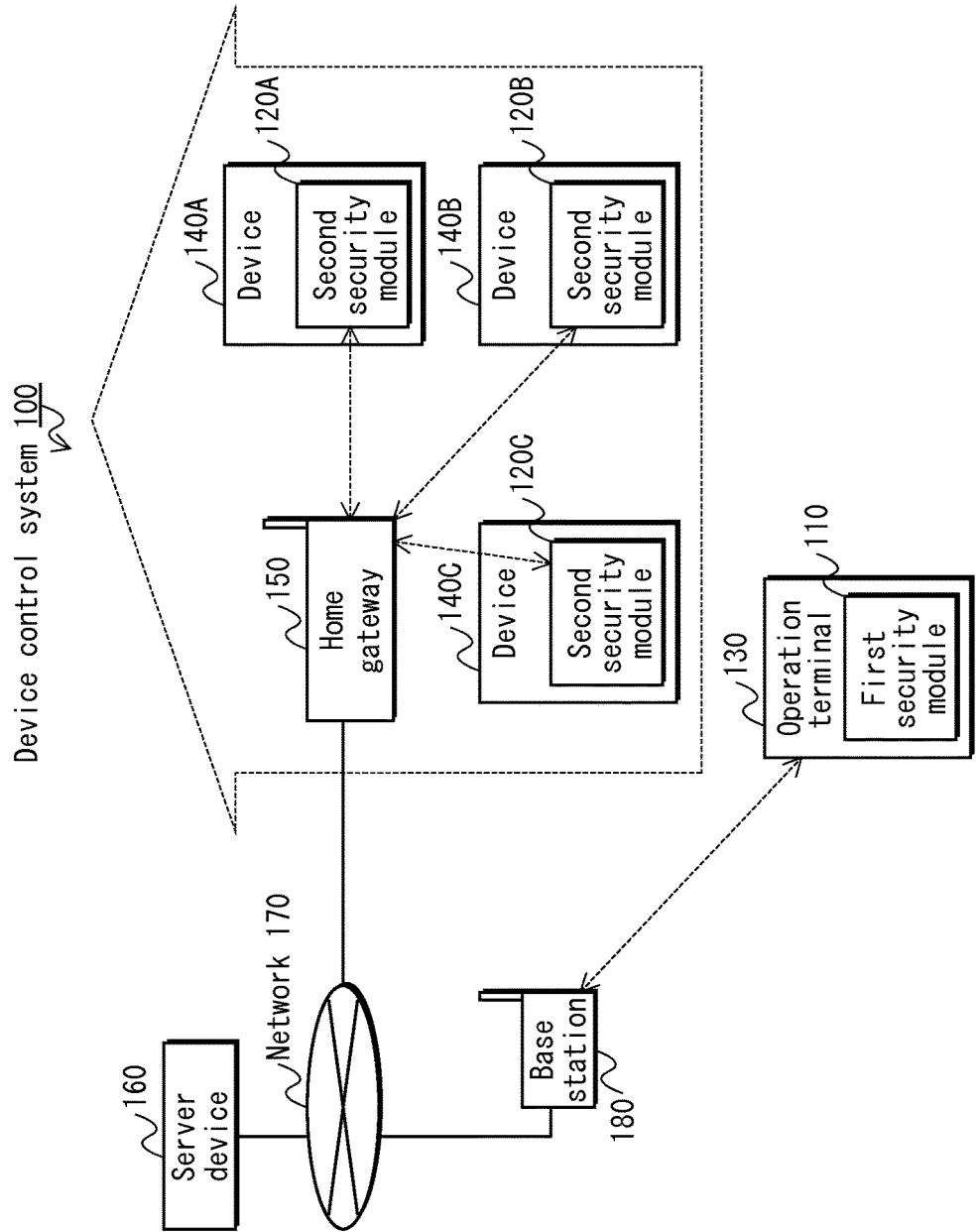
FIG. 1 is a schematic illustrating structure of device control system 100 in embodiment 1.

FIG. 1 is a schematic illustrating the structure of a device control system 100 pertaining to the present embodiment.

As illustrated in FIG. 1, the device control system 100 includes: an operation terminal 130; a first security module 110; devices 140A through 140C; second security modules 120A through 120C; a home gateway 150; a server device 160, a network 170; and a base station 180.

The following describes such structural elements of the device control system 100 one by one.

<1.2.2 Network 170, Base Station 180>

The network 170 is a network connected to the home gateway 150, the server device 160, and the base station 180. The network 170 has a function of transferring signals between devices connected thereto.

The base station 180 is connected to the network 170. The base station 180 is a wireless base station for telecommunication service, and communicates with the operation terminal 130 by utilizing a commercial wireless communication line for portable phones. The base station 180 has a function of relaying the communication between the operation terminal 130 and the server device 160.

<1.2.3 Operation Terminal 130>

<<Circuit Structure>>

Figure 2:
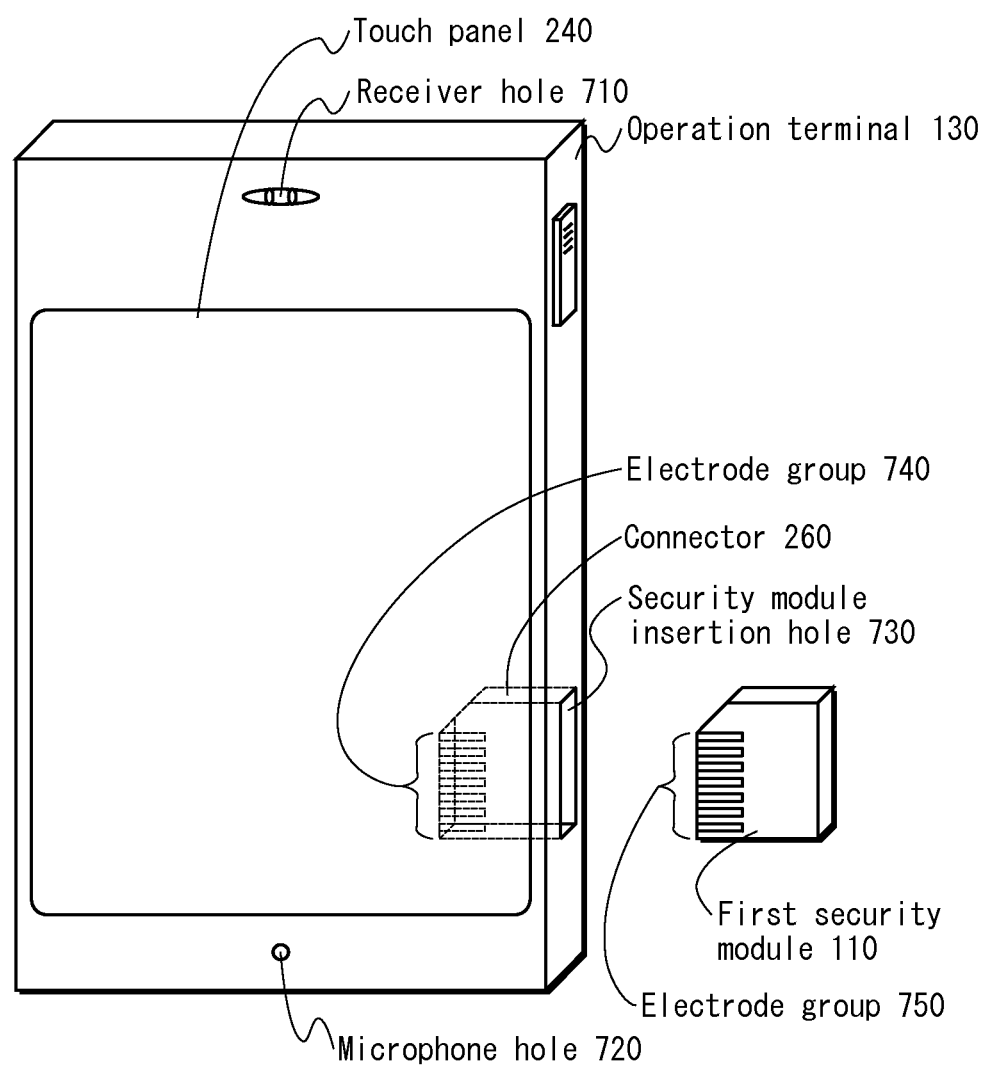
FIG. 2 is a schematic illustrating exterior of one example of operation terminal 130.

FIG. 2 is a perspective view illustrating the exterior of the operation terminal 130 and the first security module 110.

The operation terminal 130 is a portable communication terminal, or more specifically, a smartphone. The operation terminal 130 has the first security module 110 attached thereto in detachable state.

As illustrated in FIG. 2, the operation terminal 130 has a housing whose main surface has a receiver hole 710 and a microphone hole 720. The receiver hole 710 is for transmitting sound output from a receiver 270 to outside the housing, and the microphone hole 720 is for allowing sound from outside the housing to reach a microphone 280. Further, at the main surface of the housing, a main surface of a touch panel 240 is arranged. In addition, the housing has one side surface having a security module insertion hole 730. The security module insertion hole 730 has an inner part where a connector 260 is disposed.

Meanwhile, the first security module 110 has a housing that serves as a connector 560. Thus, when the housing of the first security module 110, or that is, the connector 560 is inserted into the security module insertion hole 730, the connector 260 and the connector 560 connect with one another. Thus, the first security module 110 is attached to the operation terminal 130.

The connector 260 includes an electrode group 740 composed of a plurality of metal electrodes. Meanwhile, the housing of the first security module 110, or that is, the connector 560 has an electrode group 750 composed of a plurality of metal electrodes. When the first security module 110 is attached to the operation terminal 130, each of the electrodes in the electrode group 740 is electrically connected with one of the electrodes in the electrode group 750. This allows the operation terminal 130 and the first security module 110 to perform wired communication.

FIG. 3 is a circuit diagram of the operation terminal 130.

As illustrated in FIG. 3, the operation terminal 130 includes: a central processing unit (CPU) 200; a large scale integration (LSI) 210 for communication (referred to in the following as a "communication LSI 210"); an antenna 220; a touch panel controller 230; the touch panel 240; a memory 250; the connector 260; the receiver 270; the microphone 280; and a battery 290.

(Antenna 220)

The antenna 220 is connected to the communication LSI 210, and is used in the communication performed by the communication LSI 210. For example, the antenna 220 may be a metal monopole antenna.

(Communication LSI 210)

The communication LSI 210 is connected to the antenna 220 and the CPU 200, and is controlled by the CPU 200. The communication LSI 210 has the following functions: a modulation function of modulating a transmission signal transmitted from the CPU 200; a transmission function of transmitting the modulated signal to the base station 180 by using the antenna 220; a reception function of receiving a signal transmitted from the base station 180 by using the antenna 220; and a demodulation function of demodulating the received signal and transmitting the demodulated signal to the CPU 200.

The communication between the communication LSI 210 and the base station 180 utilizes, for example, a commercial wireless communication line for portable phones that conforms to a communication standard such as Long Term Evolution (LTE).

(Touch Panel Controller 230, Touch Panel 240)

The touch panel 240 is connected to the touch panel controller 230, and is controlled by the touch panel controller 230. The touch panel 240 has a function of displaying images and a function of converting contact operations made thereon by a user of the operation terminal 130 into electric signals and outputting such electric signals.

The touch panel controller 230 is connected to the CPU 200 and the touch panel 240, and is controlled by the CPU 200. The touch panel controller 230 has a function of causing the touch panel 240 to display images based on image signals transmitted from the CPU 200 and a function of receiving contact operations made on the touch panel 240 by the user of the operation terminal 130 and transmitting signals indicative of the contact operations so received to the CPU 200.

(Connector 260)

The connector 260 is connected to the CPU 200 and has the three functions described in the following.

Function 1: The connector 260 connects to the connector 560 of the first security module 110. When the connector 260 connects to the connector 560, the first security module 110 is attached to the operation terminal 130 in detachable state. The connector 560 is described in detail later in the present disclosure.

Function 2: The connector 260, when the first security module 110 is attached to the operation terminal 130, realizes wired communication between the operation terminal 130 and the first security module 110.

Function 3: The connector 260, when the first security module 110 is attached to the operation terminal 130, feeds power supplied from the battery 290 to the first security module 110.

(Receiver 270, Microphone 280)

The receiver 270 is connected to the CPU 200, and is controlled by the CPU 200. The receiver 270 has a function of converting electric signals transmitted from the CPU 200 into sound and outputting the sound.

The microphone 280 is connected to the CPU 200. The microphone 280 converts sound into electric signals and transmits the electric signals so obtained to the CPU 200.

(Memory 250)

The memory 250 is connected to the CPU 200. The memory 250 is implemented by using a random access memory (RAM), a read-only memory (ROM), and a flash memory, and stores programs defining operations of the CPU 200 and data used by the CPU 200.

(CPU 200)

The CPU 200 is connected to the communication LSI 210, the touch panel controller 230, the memory 250, the connector 260, the receiver 270, and the microphone 280. The CPU 200 executes the programs stored in the memory 250 and controls the communication LSI 210, the touch panel controller 230, the receiver 270, and a Global Positioning System (GPS) receiver 285, thereby mainly realizing the three functions of the operation terminal 130 described in the following.

Smartphone control function: The CPU 200 controls the operation terminal 130 to provide the operation terminal 130 with functions similar to those typically possessed by conventional smartphones. Such functions include, for example, a telephone call function, an internet website browsing function, a mail transmission/reception function, and a standby function.

Device operation function A: The CPU 200 controls the operation terminal 130 to provide the operation terminal 130 with a function of realizing a device operation performed by the device control system 100, through cooperation with other structural elements included in the device control system 100.

Environment information acquisition function A: The CPU 200 controls the GPS receiver 285 to provide the operation terminal 130 with a function of acquiring, by using the GPS, location information indicating the location of the operation terminal 130, which is environment information of the operation terminal 130.

(GPS Receiver 285)

The GPS receiver 285, when a request is issued by the CPU 200, acquires location information (latitude and longitude values) of the operation terminal 130 at the point of issuance of the request, and outputs the location information of the operation terminal 130 to the CPU 200 as the environment information of the operation terminal 130.

(Battery 290) The battery 290 is a secondary battery that is repeatedly chargeable, and has a function of suppling power to electronic components of the operation terminal 130.

<<Functional Structure>>

The following describes the functional structure of the operation terminal 130, the circuit structure of which has been described above.

FIG. 4 is a block diagram illustrating the functional structure of the operation terminal 130.

As illustrated in FIG. 4, the operation terminal 130 includes: a control unit 300; a display unit 310; an operation reception unit 320; a security module (SM) communication unit 330; an audio processing unit 340; a communication unit 350; an encryption processing unit 360; and an operation terminal information storage unit 370.

(Display Unit 310)

The display unit 310 is implemented by using the touch panel controller 230 and the touch panel 240, and by the CPU 200 executing programs. The display unit 310 is controlled by the control unit 300, and has a function of generating images to be presented to the user of the operation terminal 130 and causing the touch panel 240 to display such images.

(Operation Reception Unit 320)

The operation reception unit 320 is implemented by using the touch panel controller 230 and the touch panel 240, and by the CPU 200 executing programs. The operation reception unit 320 is controlled by the control unit 300, and has a function of receiving contact operations performed on the touch panel 240 by the user of the operation terminal 130.

(Environment information Acquisition Unit 325)

An environment information acquisition unit 325 is implemented by using the GPS receiver 285 and by the CPU 200 executing programs. The environment information acquisition unit 325 has a function of acquiring the environment information of the operation terminal 130 (for example, location information indicating the present location of the operation terminal 130). For example, when the location information of the operation terminal 130 is the environment information of the operation terminal 130, the environment information acquisition unit 325 acquires, from the GPS receiver 285, the present location of the operation terminal 130 when the operation reception unit 320 receives an operation instruction from the user of the operation terminal 130. Further, the environment information acquisition unit 325 transmits the environment information (i.e., the location information) to the server device 160 via the communication unit 350.

(Security Module Communication Unit 330)

The security module communication unit 330 is implemented by using the connector 260 and by the CPU 200 executing programs. The security module communication unit 330 is controlled by the control unit 300. The security module communication unit 330 has a function of performing wired communication with the first security module 110 when the first security module 110 is attached to the operation terminal 130.

(Audio Processing Unit 340)

The audio processing unit 340 is implemented by using the receiver 270 and the microphone 280, and by the CPU 200 executing programs. The audio processing unit 340 is controlled by the control unit 300. The audio processing unit 340 has a function of inputting and outputting voices when the operation terminal 130 is making a telephone call.

(Communication Unit 350)

The communication unit 350 is implemented by using the communication LSI 210 and the antenna 220, and by the CPU 200 executing programs. The communication unit 350 is controlled by the control unit 300. The communication unit 350 has a function of communicating with the base station 180 by using the commercial wireless communication line for portable phones, and a function of communicating with the server device 160 via the base station 180 and the network 170.

(Encryption Processing Unit 360)

The encryption processing unit 360 is implemented by the CPU 200 executing programs, and is controlled by the control unit 300. The encryption processing unit 360 has an encryption function, an authentication function, and a key sharing function. The encryption function is a function of executing encryption for maintaining confidentiality and integrity of data. The authentication function is a function of executing authentication by utilizing encryption technology. The key sharing function is a function of executing key sharing by utilizing encryption technology. In order to achieve the functions described above (i.e., encryption function, authentication function, and key sharing function), the encryption processing unit 360 utilizes technology such as AES (Advanced Encrypting Standard), ECDSA (Elliptic Curve Digital Signature Standard), ECDH (Elliptic Curve Diffie-Hellman), and/or SSL (SecureSocketLayer)/TSL (Transport Layer Security).

(Operation Terminal Information Storage Unit 370)

The operation terminal information storage unit 370 is implemented by using a part of a storage area of the memory 250 and by the CPU 200 executing programs. The operation terminal information storage unit 370 has a function of storing operation terminal information 400. The operation terminal information 400 is described in detail later in the present disclosure.

(Control Unit 300)

The control unit 300 is implemented by the CPU 200 executing programs. The control unit 300 controls the display unit 310, the operation reception unit 320, the environment information acquisition unit 325, the security module communication unit 330, the audio processing unit 340, the communication unit 350, the encryption processing unit 360, and the operation terminal information storage unit 370, thereby realizing the three functions described above of the operation terminal 130 (i.e., the smartphone control function, the device operation function A, and the environment information acquisition function A).

<1.2.4 First Security Module 110>
<<Circuit Structure>>

Figure 6:
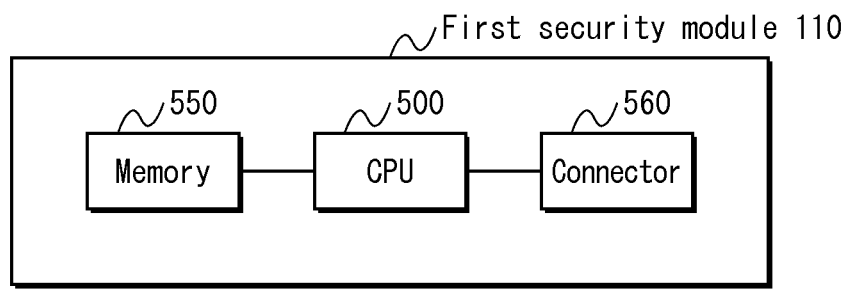
FIG. 6 illustrates hardware structure of first security module 110.

FIG. 6 is a circuit diagram of the first security module 110.

As illustrated in FIG. 6, the first security module 110 includes: a CPU 500; a memory 550; and the connector 560.

(Connector 560)

The connector 560 is connected to the CPU 500 and has the three functions described in the following.

Function 1: The connector 560 connects to the connector 260 of the operation terminal 130. When the connector 560 connects to the connector 260, the first security module 110 is attached to the operation terminal 130 in detachable state.

Function 2: The connector 560, when the first security module 110 is attached to the operation terminal 130, realizes wired communication between the operation terminal 130 and the first security module 110.

Function 3: The connector 560, when the first security module 110 is attached to the operation terminal 130, feeds power passed on from the connector 260 to electric components of the first security module 110.

(Memory 550)

The memory 550 is connected to the CPU 500. The memory 550 is implemented by using a RAM, a ROM, and a flash memory, and stores programs defining operations of the CPU 500 and data used by the CPU 800.

(CPU 500)

The CPU 500 is connected to the memory 550 and the connector 560. The CPU 500 executes the programs stored in the memory 550, thereby realizing the two functions of the first security module 110 described in the following.

Device operation function B: The CPU 500 controls the first security module 110 to provide the first security module 110 with a function of realizing the device operation performed by the device control system 100, through cooperation with other structural elements included in the device control system 100.

Environment information transmission function B: The CPU 500 controls the first security module 110 to provide the first security module 110 with a function of transmitting the environment information of the operation terminal 130 to the server device 160.

<<Functional Structure>>

The following describes the functional structure of the first security module 110, the circuit structure of which has been described above.

Figure 7:
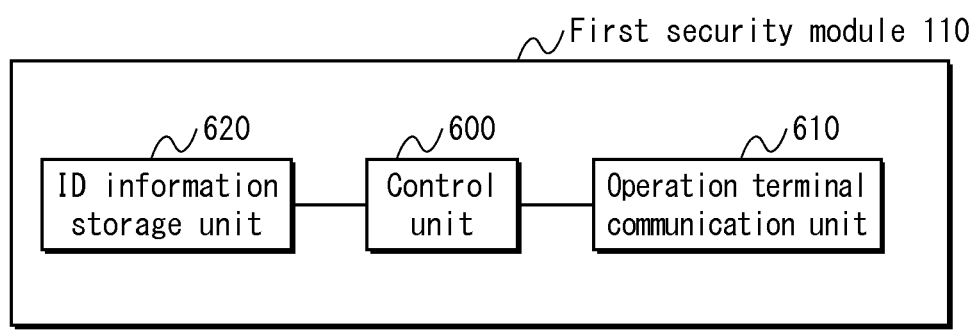
FIG. 7 is a functional block diagram of main part of first security module 110.

FIG. 7 is a block diagram illustrating the functional structure of the first security module 110.

As illustrated in FIG. 7, the first security module 110 includes: a control unit 600; an operation terminal communication unit 610; and an ID information storage unit 620.

(ID Information Storage Unit 620)

The ID information storage unit 620 is implemented by using a part of a storage area of the memory 550, and by the CPU 500 executing programs. The ID information storage unit 620 has a function of storing a security module ID that uniquely identifies the first security module 110.

The security module ID is written to a predetermined storage area of the ROM of the memory 550 in the manufacturing of the first security module 110. This prevents tampering of the security module ID of the first security module 110.

Further, the ID information storage unit 620 is tamper-resistant, particularly with respect to tampering of the security module ID stored therein. The ID information storage unit 620 is provided with such tamper resistance by utilizing encryption technology involving software and/or hardware.

(Operation Terminal Communication Unit 610)

The operation terminal communication unit 610 is implemented by using the connector 560 and by the CPU 500 executing programs. The operation terminal communication unit 610 is controlled by the control unit 600. The operation terminal communication unit 610 has a function of performing wired communication with the operation terminal 130 when the first security module 110 is attached to the operation terminal 130.

(Control Unit 600)

The control unit 600 is implemented by the CPU 500 executing programs. The control unit 600 controls the operation terminal communication unit 610 and the ID information storage unit 620, thereby realizing the two functions of the first security module 110 described above (i.e., the device operation function B and the environment information transmission function B).

<1.2.5 Device 140>

FIG. 1 illustrates the devices 140A through 140C. Each of the devices 140A through 140C is a household electric device or facility equipment that has a function of connecting to various networks including the interne. In specific, each of the devices 140A through 140C may be: an air conditioner; a refrigerator; a microwave oven; a breadmaker; a toaster; a water heater remote controller; a washing machine; a drying machine; a dish washer; a vacuum machine; a gas cooktop; an IH cooking device; a rice cooker; a washlet-type toilet seat; an electronic lock; an intercom; a lighting device; an air purifier; a humidifier; a security sensor (e.g., a human detection sensor, burglar sensor, etc.,); a home server; a washbin; an electric toothbrush; a hair blower; a beauty-related home appliance; a healthcare-related home appliance such as a massage chair, a pedometer, or a body composition monitor; an information device such as a personal computer, a tablet-type terminal, or a smartphone; a portable phone; a fax machine; a game machine; a television; a recorder device; an audio device; or a remote controller for such devices.

<<Circuit Structure>>

The following describes a device 140, which may be any one of the devices 140A through 140C, instead of describing each of the devices 140A through 140C separately.

The device 140 is connected to the home gateway 150, and communicates with the server device 160, which is located outside the house, via the home gateway 150. Detailed description of the home gateway 150 is provided later in the present disclosure.

Figure 8:
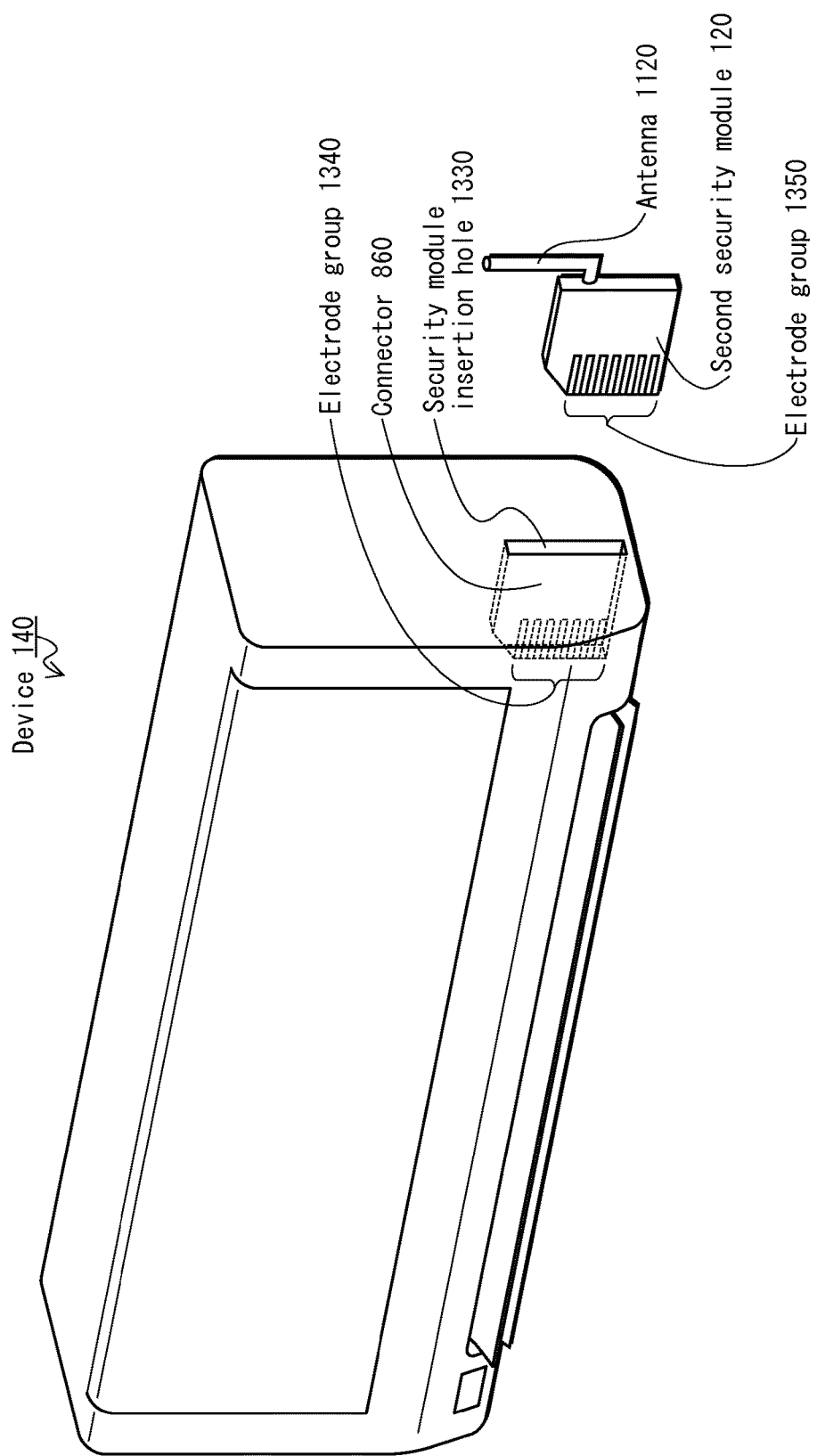
FIG. 8 is a schematic illustrating exterior of one example of device 140.

FIG. 8 is a perspective view illustrating the exterior of the device 140 and a second security module 120.

FIG. 8 illustrates an example where the device 140 is an air conditioner.

As illustrated in FIG. 8, the device 140 has a housing. A side surface of the housing has a security module insertion hole 1330. The security module insertion hole 1330 has an inner part where a connector 860 is disposed.

Meanwhile, the security module 120 has a housing that serves as a connector 1160. Thus, when the housing of the second security module 120, or that is, the connector 1160 is inserted into the security module insertion hole 1130, the connector 860 and the connector 1160 connect with one another. Thus, the second security module 120 is attached to the device 140.

The connector 860 includes an electrode group 1340 composed of a plurality of metal electrodes. Meanwhile, the housing of the second security module 120, or that is, the connector 1160 has an electrode group 1350 composed of a plurality of metal electrodes. When the second security module 120 is attached to the device 140, each of the electrodes in the electrode group 1340 is electrically connected with one of the electrodes in the electrode group 1350. This allows the device 140 and the second security module 120 to perform wired communication.

Figure 9:
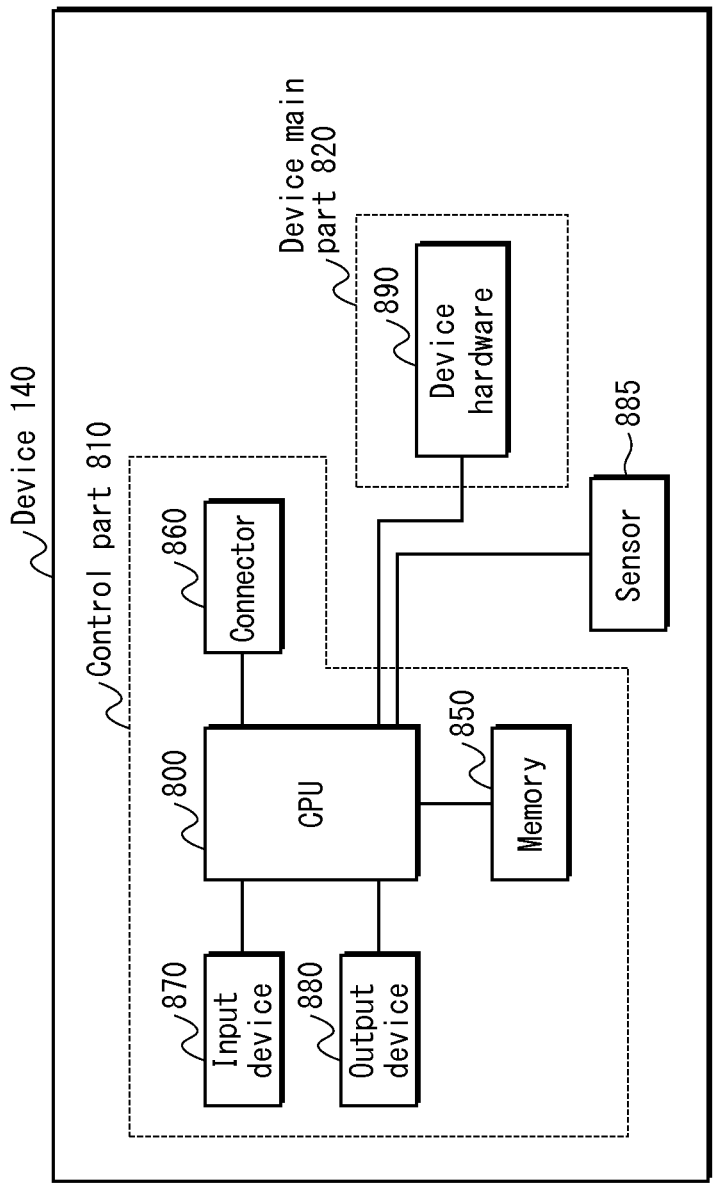
FIG. 9 illustrates hardware structure of device 140.

FIG. 9 is a circuit diagram of the device 140.

As illustrated in FIG. 9, the device 140 includes: a control part 810; a device main part 820; and a sensor 885.

(Control Part 810)

The control part 810 is implemented by using: a CPU 800; the connector 860; a memory 850; an input device 870; and an output device 880. The device main part 820 is implemented by using device hardware 890.

(Connector 860)

The connector 860 is connected to the CPU 800 and has the three functions described in the following.

Function 1: The connector 860 connects to the connector 1160 of the second security module 120. When the connector 860 connects to the connector 1160, the second security module 120 is attached to the device 140 in detachable state. The second security module 120 and the connector 1160 are described in detail later in the present disclosure.

Function 2: The connector 860, when the second security module 120 is attached to the device 140, realizes wired communication between the device 140 and the second security module 120.

Function 3: The connector 860, when the second security module 120 is attached to the device 140, feeds power to the second security module 120.

(Input Device 870)

The input device 870 is connected to the CPU 800. The input device 870 has a function of converting operations performed thereon by a user of the device 140 into electric signals and transmitting the electric signals to the CPU 800. The input device 870 is implemented, for example, by using a control panel.

(Output Device 880)

The output device 880 is connected to the CPU 800. The output device 880 has a function of displaying images, sound, etc., based on image signals transmitted from the CPU 800. For example, the output device 880 may be implemented by using a liquid crystal display and a speaker.

(Memory 850)

The memory 850 is connected to the CPU 800. The memory 880 is implemented by using a RAM, a ROM, and a flash memory, and stores programs defining operations of the CPU 500 and data used by the CPU 800.

(CPU 800)

The CPU 800 is connected to the memory 850, the connector 860, the input device 870, the output device 880, the sensor 885, and the device hardware 890. The CPU 800 executes the programs stored in the memory 850 and controls the sensor 885, the device hardware 890, the input device 870, and the output device 880, thereby realizing the three functions of the device 140 described in the following.

Device control function: The CPU 800 controls the device 140 to provide the device 140 with functions similar to those typically possessed by conventional devices. For example, when the device 140 is a television, such functions include a program playback function and a channel switching function. For example, when the device 140 is a washing machine, such functions include a rinsing function and a spin-drying function.

Device operation function C: The CPU 800 controls the device 140 to provide the device 140 with a function of realizing the device operation performed by the device control system 100, through cooperation with other structural elements included in the device control system 100.

Environment information acquisition function C: The CPU 800 controls the sensor 885 to provide the device 140 with a function of acquiring environment information of the device 140.

(Device Main Part 820)

The main structural element constituting the device main part 820 is the device hardware 890.

The device hardware 890 is connected to the CPU 800, and is controlled by the CPU 800. The device hardware 890 is a group of hardware that, by being controlled by the CPU 800, allows the device 140 to achieve its functions as an electronic device. For example, when the device 140 is an air conditioner, the device hardware 890 is a group of hardware that allows the device 140 to function as an air conditioner, and in this case, includes such hardware as a compressor, a heat exchanger, and a mechanical fan.

(Sensor 885)

The sensor 885 is a sensor for acquiring environment information of the device 140.

For example, the sensor 885 is a temperature sensor, and by being controlled by the CPU 800, measures the temperature around the device 140 and outputs the measurement result to the CPU 800. In addition, the sensor 885 is a human detection sensor, and detects whether or not a person is present around the device 140 and outputs the detection result to the CPU 800. Further, the sensor 885 may also be a device such as a GPS receiver, a hygrometer, a clock, etc., or may also be a sensor group including one or more of such sensors. Note that devices 140 of different types may have different sensors.

<<Functional Structure>>

The following describes the functional structure of the device 140, the circuit structure of which has been described above.

Figure 10:
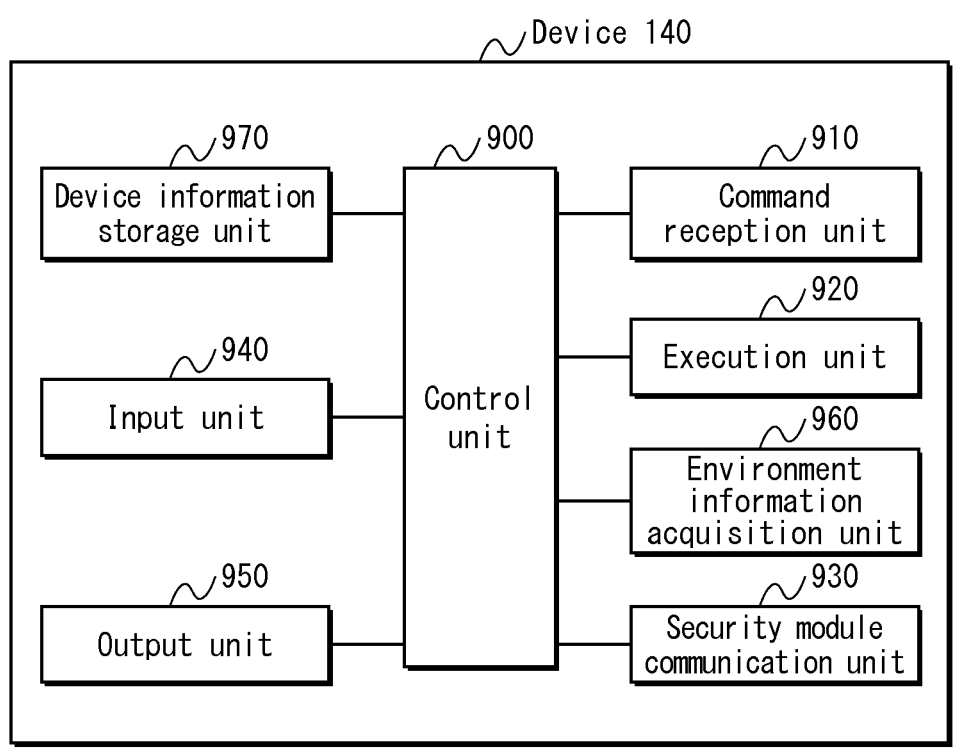
FIG. 10 is a functional block diagram of main part of device 140.

FIG. 10 is a block diagram illustrating the functional structure of the device 140.

As illustrated in FIG. 10, the device 140 includes: a control unit 900; a command reception unit 910; an execution unit 920; a security module communication unit 930; an input unit 940; an output unit 950; an environment information acquisition unit 960; and a device information storage unit 970.

(Command Reception Unit 910)

The command reception unit 910 is implemented by the CPU 800 executing programs. The command reception unit 910 receives, via the connector 860, an execution command that the second security module 120 receives from the operation terminal 130, and outputs the execution command to the control unit 900.

(Execution Unit 920)

The execution unit 920 is implemented by using the device hardware 890 and by the CPU 800 executing programs. The execution unit 920 is controlled by the control unit 900. The execution unit 920, when an execution command indicating that the device hardware 890 is to be caused to carry out a predetermined operation is transmitted thereto, executes the predetermined operation indicated by the execution command by using the device hardware 890.

(Security Module Communication Unit 930)

The security module communication unit 930 is implemented by using the connector 860 and by the CPU 800 executing programs. The security module communication unit 930 is controlled by the control unit 900. The security module communication unit 930 has a function of performing wired communication with the second security module 120 when the second security module 120 is attached to the device 140.

(Input Unit 940)

The input unit 940 is implemented by using the input device 870 and by the CPU 800 executing programs. The input unit 940 is controlled by the control unit 900. The input unit 940 has a function of receiving operations performed on the input device 870 by the user of the device 140. In addition, the input unit 940 has a function of, when receiving an operation performed by the user of the device 140 and the operation indicates that the device hardware 890 is to be caused to carry out a predetermined operation, generating an execution command indicating that the device hardware 890 is to be caused to carry out the predetermined operation, and transmitting the execution command to the control unit 900.

(Output Unit 950)

The output unit 950 is implemented by using the output device 880 and by the CPU 800 executing programs. The output unit 950 is controlled by the control unit 900. The output unit 950 has a function of generating images that are to be presented to the user of the device 140, and causing the output device 880 to display such images.

(Environment Information Acquisition Unit 960)

The environment information acquisition unit 960 is implemented by using the sensor 885 and by the CPU 800 executing programs. The environment information acquisition unit 960 is controlled by the control unit 900, and has a function of acquiring the environment information of the device 140. Further, the environment information acquisition unit 960 outputs the environment information so acquired to the control unit 900.

(Device Information Storage Unit 970)

The device information storage unit 970 is implemented by using a part of a storage area of the memory 850 and by the CPU 800 executing programs. The device information storage unit 970 has a function of storing device information 1000. The device information 1000 is described in detail later in the present disclosure.

(Control Unit 900)

The control unit 900 is implemented by the CPU 800 executing programs. The control unit 900 controls the command reception unit 910, the execution unit 920, the security module communication unit 930, the input unit 940, the output unit 950, the environment information acquisition unit 960, and the device information storage unit 970, thereby realizing the three functions of the device 140 described above (i.e., the device control function, the device operation function C, and the environment information acquisition function C).

<1.2.6 Second Security Module 120>

<<Circuit Structure>>

The following describes the second security modules 120A through 120C illustrated in FIG. 1, which have similar structures and similar functions.

Thus, the following describes the second security module 120, which may be any of the second security modules 120A through 120C, instead of describing each of the second security modules 120A through 120C separately.

Figure 12:
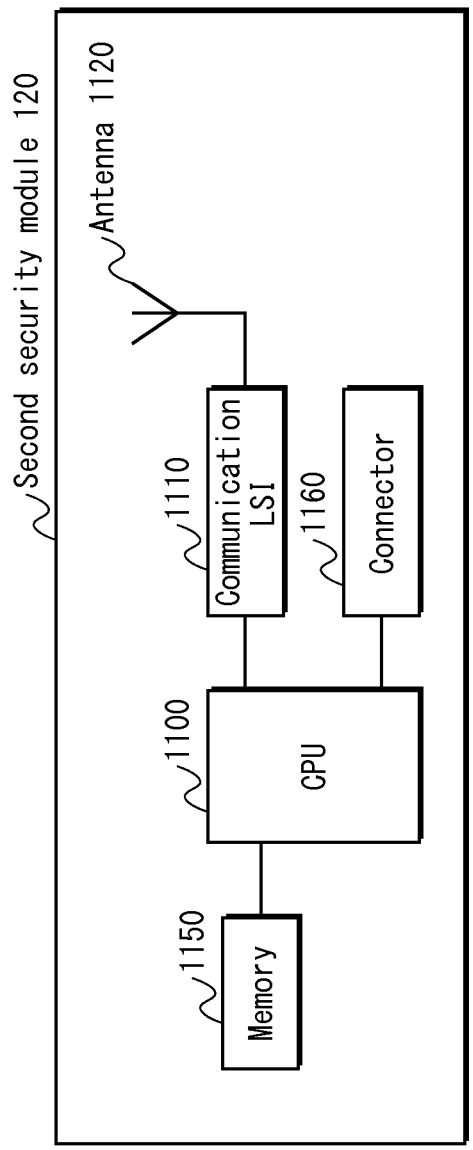
FIG. 12 illustrates hardware structure of second security module 120.

FIG. 12 is a circuit diagram of the second security module 120.

As illustrated in FIG. 12, the second security module 120 includes: a CPU 1100; an LSI 1110 for communication (referred to in the following as a "communication LSI 1110"); an antenna 1120; a memory 1150; and the connector 1160.

(Antenna 1120, Communication LSI 1110)

The antenna 1120 is connected to the communication LSI 1110, and is used in the communication performed by the communication LSI 1110. For example, the antenna 1120 may be a metal monopole antenna.

The communication LSI 1110 is connected to the antenna 1120 and the CPU 1100, and is controlled by the CPU 1100. The communication LSI 1110 has the following functions: a modulation function of modulating a transmission signal transmitted from the CPU 1100; a transmission function of transmitting the modulated signal to the home gateway 150 by using the antenna 1120; a reception function of receiving a signal transmitted from the home gateway 150 by using the antenna 1120; and a demodulation function of demodulating the received signal and transmitting the demodulated signal to the CPU 1100.

The communication between the communication LSI 1110 and the home gateway 150 conforms to the Bluetooth™ protocol.

(Connector 1160)

The connector 1160 is connected to the CPU 1100 and has the three functions described in the following.

Function 1: The connector 1160 connects to the connector 860 of the device 140. When the connector 1160 connects to the connector 860, the second security module 120 is attached to the device 140 in detachable state.

Function 2: The connector 1160, when the second security module 120 is attached to the device 140, realizes wired communication between the device 140 and the second security module 120.

Function 3: The connector 1160, when the second security module 120 is attached to the device 140, feeds power passed on from the connector 860 to electric components of the second security module 120.

(Memory 1150)

The memory 1150 is connected to the CPU 1100. The memory 1150 is implemented by using a RAM, a ROM, and a flash memory, and stores programs defining operations of the CPU 1100 and data used by the CPU 1100.

(CPU 1100)

The CPU 1100 is connected to the communication LSI 1110, the memory 1150, and the connector 1160. The CPU 1100 executes the programs stored in the memory 1150 and controls the communication LSI 1110, thereby realizing the two functions of the second security module 120 described in the following.

Device operation function D: The CPU 1100 controls the second security module 120 to provide the second security module 120 with a function of realizing the device operation performed by the device control system 100, through cooperation with other structural elements included in the device control system 100.

Environment information transmission function D: The CPU 1100 controls the second security module 120 to provide the second security module 120 with a function of transmitting the environment information output from the device 140 to the operation terminal 130 via the antenna 1120.

<<Functional Structure>>

The following describes the functional structure of the second security module 120, the circuit structure of which has been described above.

Figure 13:
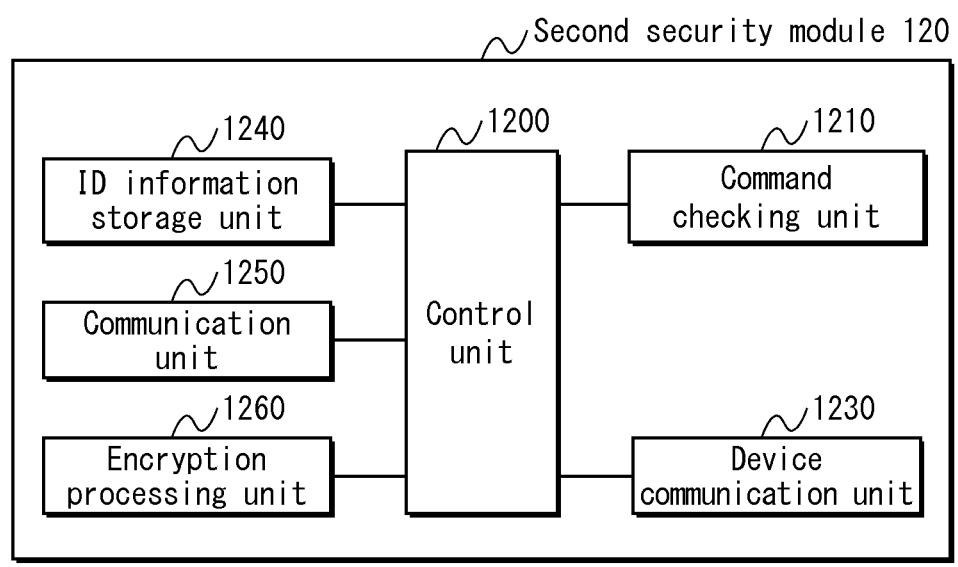
FIG. 13 is a functional block diagram of main part of second security module 120.

FIG. 13 is a block diagram illustrating the functional structure of the second security module 120.

As illustrated in FIG. 13, the second security module 120 includes: a control unit 1200; a command checking unit 1210; a device communication unit 1230; an ID information storage unit 1240; a communication unit 1250; and an encryption processing unit 1260.

(Communication Unit 1250)

The communication unit 1250 is implemented by using the communication LSI 1110 and the antenna 1120, and by the CPU 1100 executing programs. The communication unit 1250 is controlled by the control unit 1200. The communication unit 1250 has a function of communicating with the home gateway 150 through communication that conforms to the Bluetooth™ protocol, and a function of communicating with the server device 160 via the home gateway 150 and the network 170.

(Encryption Processing Unit 1260)

The encryption processing unit 1260 is implemented by the CPU 1100 executing programs, and is controlled by the control unit 1200. The encryption processing unit 1260 has an encryption function, an authentication function, and a key sharing function. The encryption function is a function of executing encryption for maintaining confidentiality and integrity of data. The authentication function is a function of executing authentication by utilizing encryption technology. The key sharing function is a function of executing key sharing by utilizing encryption technology. In order to achieve the functions described above (i.e., encryption function, authentication function, and key sharing function), the encryption processing unit 1260 utilizes technology such as AES, ECDSA, ECDH, and/or SSL/TSL.

(Command Checking Unit 1210)

The command checking unit 1210 is implemented by the CPU 1100 executing programs, and is controlled by the control unit 1200. The command checking unit 1210 has the two functions described in the following.

Command checking function: The command checking unit 1210, when the communication unit 1250 receives a signature-provided execution command from the server device 160, performs signature verification. The command checking unit 1210, when performing the signature verification, checks the authenticity of the signature provided to the signature-provided execution command by using the encryption processing unit 1260.

Signature verification result notification function: The command checking unit 1210, when the authenticity of a signature provided to a signature-provided execution command is confirmed through the signature verification, generates a command included in the signature-provided execution command, and transmits the generated command and a signal indicating the authenticity of the signature to the control unit 1200. Meanwhile, the command checking unit 1210, when the authenticity of a signature provided to a signature-provided execution command is not confirmed through the signature verification, transmits a signal indicating the inauthenticity of the signature to the control unit 1200.

(Device Communication Unit 1230)

The device communication unit 1230 is implemented by using the connector 1160 and by the CPU 1100 executing programs. The device communication unit 1230 is controlled by the control unit 1200. The device communication unit 1230 has a function of performing wired communication with the device 140 when the second security module 120 is attached to the device 140.

(ID Information Storage Unit 1240)

The ID information storage unit 1240 is implemented by using a part of a storage area of the memory 1150 and by the CPU 1100 executing programs. The ID information storage unit 1240 has a function of storing a security module ID that uniquely identifies the second security module 120.

The security module ID is written to a predetermined storage area of the ROM of the memory 1150 in the manufacturing of the second security module 120. This prevents tampering of the security module ID of the second security module 120.

Further, the ID information storage unit 1240 is tamper-resistant, particularly with respect to tampering of the security module ID stored therein. The ID information storage unit 1240 is provided with such tamper resistance by utilizing encryption technology involving software and/or hardware.

(Control Unit 1200)

The control unit 1200 is implemented by the CPU 1100 executing programs. The control unit 1200 controls the command checking unit 1210, the device communication unit 1230, the ID information storage unit 1240, the communication unit 1250, and the encryption processing unit 1260, thereby realizing the two functions of the second security module 120 described above (i.e., the device operation function D and the environment information transmission function D).

<1.2.7 Home Gateway 150>

Figure 14:
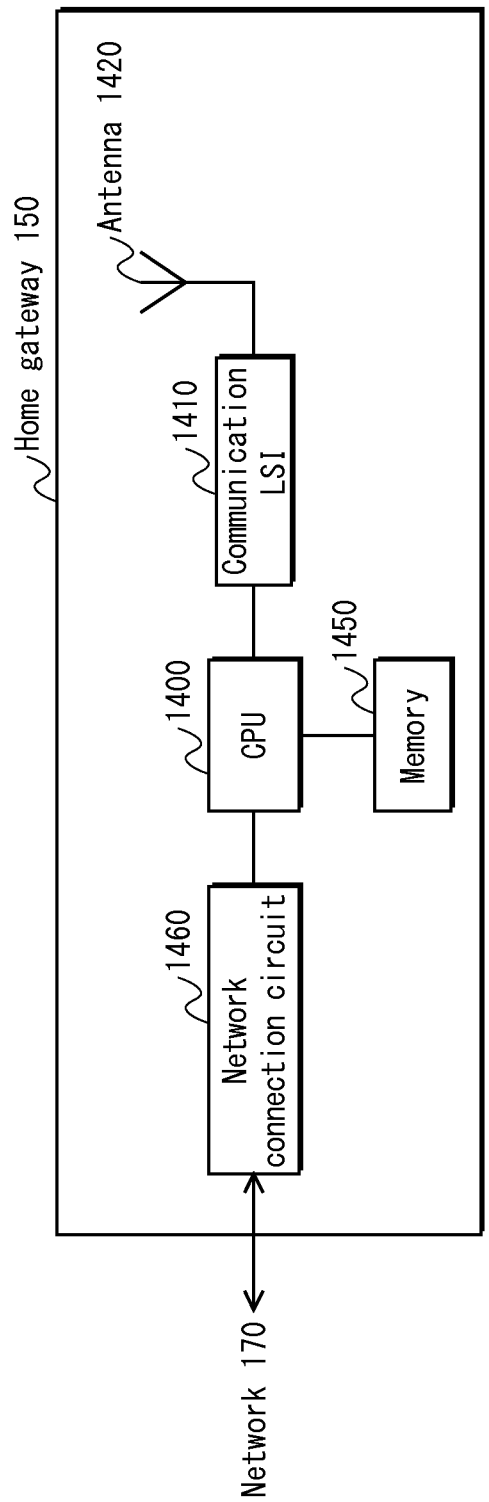
FIG. 14 illustrates hardware structure of home gateway 150.

FIG. 14 is a circuit diagram of the home gateway 150.

As illustrated in FIG. 14, the home gateway 150 includes: a CPU 1400; an LSI 1410 for communication (referred to in the following as a "communication LSI 1410"); an antenna 1420; a memory 1450; and a network connection circuit 1460.

(Antenna 1420, Communication LSI 1410)

The antenna 1420 is connected to the communication LSI 1410, and is used in the communication performed by the communication LSI 1410. For example, the antenna 1420 may be a metal monopole antenna.

The communication LSI 1410 is connected to the antenna 1420 and the CPU 1400. The communication LSI 1410 is controlled by the CPU 1400. The communication LSI 1410 has the following functions: a modulation function of modulating a transmission signal transmitted from the CPU 1400; a transmission function of transmitting the modulated signal to the second security module 120 by using the antenna 1420; a reception function of receiving a signal transmitted from the second security module 120 by using the antenna 1420; and a demodulation function of demodulating the received signal and transmitting the demodulated signal to the CPU 1400.

The communication between the communication LSI 1410 and the second security module 120 conforms to the Bluetooth™ protocol.

(Memory 1450)

The memory 1450 is connected to the CPU 1400. The memory 1450 is implemented by using a RAM, a ROM, and a flash memory, and stores programs defining operations of the CPU 1400 and data used by the CPU 1100.

(Network Connection Circuit 1460)

The network connection circuit 1460 is connected to the CPU 1400 and the network 170. The network connection circuit 1460 is controlled by the CPU 1400. The network connection circuit 1460 has a function of receiving signals transmitted from external devices via the network 170 and transmitting such signals to the CPU 1400, and a function of transmitting signals transmitted from the CPU 1400 to external devices via the network 170.

(CPU 1400)

The CPU 1400 is connected to the communication LSI 1410, the memory 1450, and the network connection circuit 1460. The CPU 1400 executes programs stored in the memory 1450 and controls the communication LSI 1410 and the network connection circuit 1460, thereby providing the home gateway 150 with a communication relay function of relaying the communication between the server device 160 and the second security module 120.

<<Functional Structure>>

The following describes the functional structure of the home gateway 150, the circuit structure of which has been described above.

Figure 15:
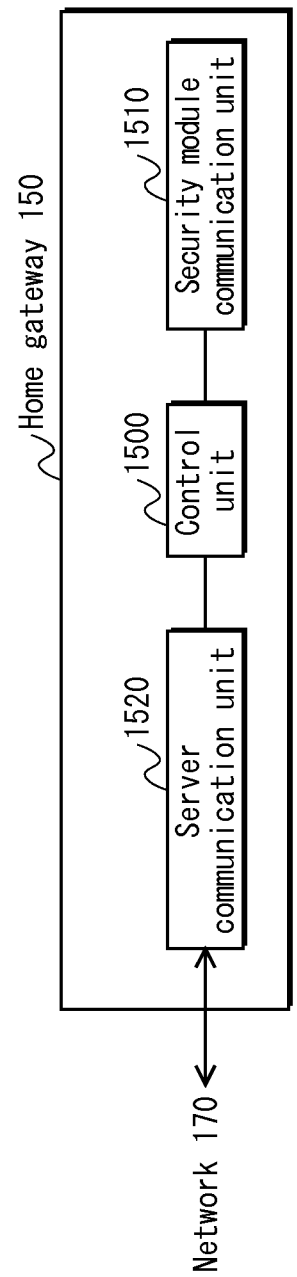
FIG. 15 is a functional block diagram of main part of home gateway 150.

FIG. 15 is a block diagram illustrating the functional structure of the home gateway 150.

As illustrated in FIG. 15, the home gateway 150 includes: a control unit 1500; a security module communication unit 1510; and a server communication unit 1520.

(Security Module Communication Unit 1510)

The Security module communication unit 1510 is implemented by using the communication LSI 1410 and the antenna 1420, and by the CPU 1400 executing programs. The Security module communication unit 1510 is controlled by the communication unit 1500. The Security module communication unit 1510 has a function of communicating with the second security module 120 through communication that conforms to the Bluetooth™ protocol.

(Server Communication Unit 1520)

The server communication unit 1520 is implemented by using the network connection circuit 1460 and by the CPU 1400 executing programs. The server communication unit 1520 is controlled by the control unit 1500. The server communication unit 1520 has a function of communicating with the server device 160 via the network 170.

(Control Unit 1500)

The control unit 1500 is implemented by the CPU 1400 executing programs. The control unit 1500 controls the Security module communication unit 1510 and the server communication unit 1520, thereby providing the home gateway 150 with the above-described communication relay function.

<1.2.8 Server Device 160>

<<Circuit Structure>>

Figure 16:
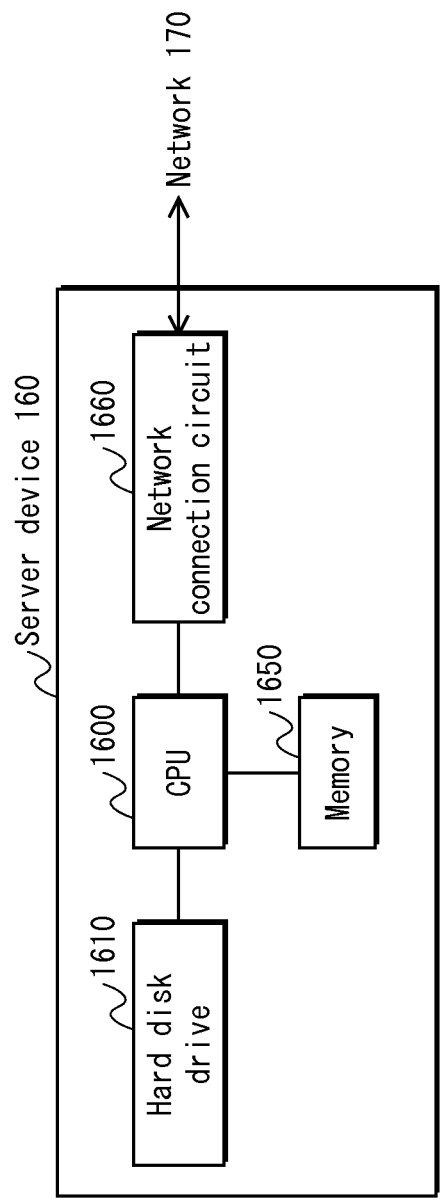
FIG. 16 illustrates hardware structure of server device 160.

FIG. 16 is a circuit diagram of the server device 160.

The server device 160 is a computer that is connected to the network 170. As illustrated in FIG. 16, the server device 160 includes: a CPU 1600; a network connection circuit 1660; a memory 1650; and a hard disk drive 1610.

(Network Connection Circuit 1660)

The network connection circuit 1660 is connected to the CPU 1600 and the network 170. The network connection circuit 1660 is controlled by the CPU 1600. The network connection circuit 1660 has a function of receiving signals transmitted from external devices via the network 170 and transmitting the signals to the CPU 1600, and a function of transmitting signals transmitted from the CPU 1600 to external devices via the network 170.

(Memory 1650)

The memory 1650 is connected to the CPU 1600. The memory 1650 is implemented by using a RAM, a ROM, and a flash memory, and stores programs defining operations of the CPU 1600 and data used by the CPU 1600.

(Hard Disk Drive 1610)

The hard disk drive 1610 is connected to the CPU 1600. The hard disk drive 1610 includes a built-in hard disk, and stores data used by the CPU 1600.

(CPU 1600)

The CPU 1600 is connected to the network connection circuit 1660, the memory 1650, and the hard disk drive 1610. The CPU 1600 executes programs stored in the memory 1650 and controls the network connection circuit 1660 and the hard disk drive 1610, thereby realizing the three functions of the server device 160 described in the following.

Device registration function E: The CPU 1600 controls the server device 160 to provide the server device 160 with a function of realizing a device registration performed by the device control system 100, through cooperation with other structural elements included in the device control system 100.

Device operation function E: The CPU 1600 controls the server device 160 to provide the server device 160 with a function of realizing the device operation performed by the device control system 100, through cooperation with other structural elements included in the device control system 100.

Environment information acquisition function E: The CPU 1600 controls the server device 160 to provide the server device 160 with a function of acquiring environment information from each of the operation terminal 130 and the device 140.

<<Functional Structure>>

The following describes the functional structure of the server device 160, the circuit structure of which has been described above.

Figure 17:
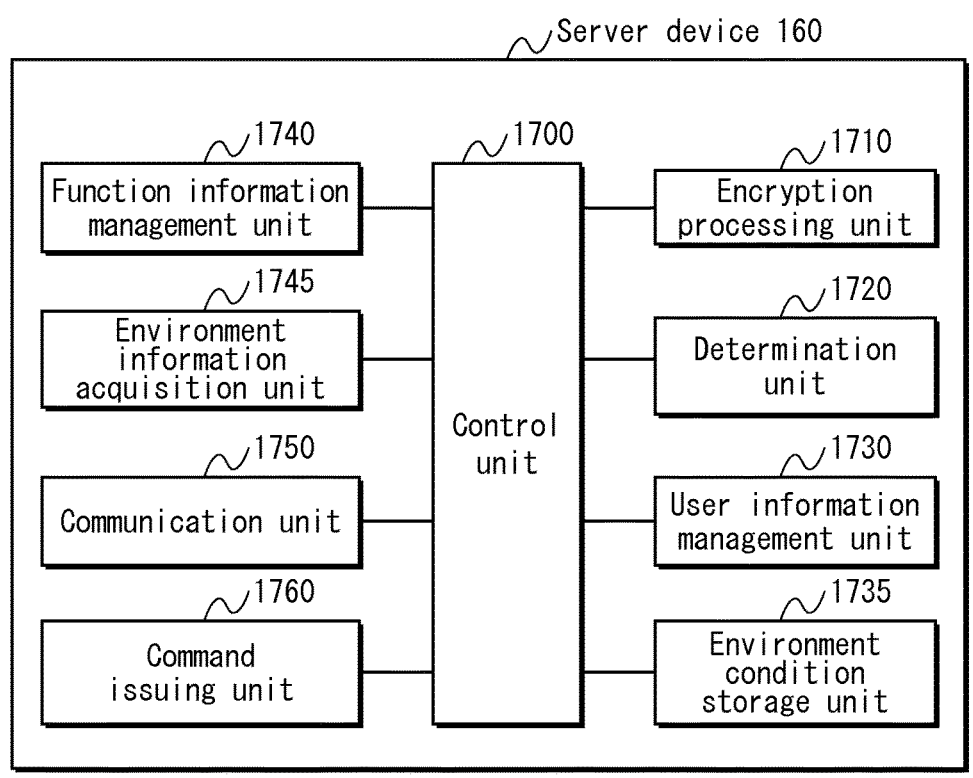
FIG. 17 is a functional block diagram of main part of server device 160.

FIG. 17 is a block diagram illustrating the functional structure of the server device 160.

As illustrated in FIG. 17, the server device 160 includes: a control unit 1700; an encryption processing unit 1710; a determination unit 1720; a user information management unit 1730; an environment condition storage unit 1735; a function information management unit 1740; an environment information acquisition unit 1745; a communication unit 1750; and a command issuing unit 1760.

(Communication Unit 1750)

The communication unit 1750 is implemented by using the network connection circuit 1660 and by the CPU 1600 executing programs. The communication unit 1750 is controlled by the control unit 1700. The communication unit 1750 has a function of communicating with the second security module 120 via the network 170 and the home gateway 150, and a function of communicating with the operation terminal 130 via the network 170 and the base station 180.

(Encryption Processing Unit 1710)

The encryption processing unit 1710 is implemented by the CPU 1600 executing programs, and is controlled by the control unit 1700. The encryption processing unit 1710 has an encryption function, an authentication function, and a key sharing function. The encryption function is a function of executing encryption for maintaining confidentiality and integrity of data. The authentication function is a function of executing authentication by utilizing encryption technology. The key sharing function is a function of executing key sharing by utilizing encryption technology. In order to achieve the functions described above (i.e., encryption function, authentication function, and key sharing function), the encryption processing unit 1710 utilizes technology such as AES, ECDSA, ECDH, and/or SSL/TSL.

(User Information Management Unit 1730)

The user information management unit 1730 is implemented by using a part of a storage area of the hard disk drive 1610 and by the CPU 1600 executing programs. The user information management unit 1730 has a function of storing user information 1800, and a function of updating the user information 1800 stored therein. Note that the user information 1800 is described in detail later in the present disclosure.

(Function Information Management Unit 1740)

The function information management unit 1740 is implemented by using a part of a storage area of the hard disk drive 1610 and by the CPU 1600 executing programs. The function information management unit 1740 has a function of storing function information 1900 and command information 2000, and a function of updating the function information 1900 and the command information 2000 stored therein. Note that the function information 1900 and the command information 2000 are described in detail later in the present disclosure.

(Command Issuing Unit 1760)

The command checking unit 1760 is implemented by the CPU 1600 executing programs, and is controlled by the control unit 1700. The command checking unit 1760 has the two functions described in the following.

Command generation function: The command checking unit 1760 refers to the function information 1900 and the command information 2000 stored by the function information management unit 1740, and generates execution commands each causing a control-target device 140 to execute a control-target function.

Signature provision function: The command checking unit 1760, when an execution command is generated, provides an electronic signature to the execution command by using the encryption processing unit 1260, and thereby generates a signature-provided execution command. The electronic signature indicates the authenticity of the execution command.

(Environment Condition Storage Unit 1735)

The environment condition storage unit 1735 is implemented by using a part of a storage area of the hard disk drive 1610, and by the CPU 1600 executing programs. The environment condition storage unit 1735 has a function of storing environment condition information such as operation condition information 3000; location condition information 3100; date/time condition information 3200; temperature condition information 3300; and in-room presence condition information 3400. Details of the environment condition information are described later in the present disclosure.

(Environment Information Acquisition Unit 1745)

The environment information acquisition unit 1745 is implemented by using the network connection circuit 1660, and by the CPU 1600 executing programs. The environment information acquisition unit 1745 is controlled by the control unit 1700. The environment information acquisition unit 1745 acquires environment information from each of the operation terminal 130 and the device 140, and outputs the environment information so acquired to the control unit 1700.

(Determination Unit 1720)

The determination unit 1720 is implemented by the CPU 1600 executing programs, and is controlled by the control unit 1700. The determination unit 1720 refers to the environment condition information stored in the environment condition storage unit 1735, and determines whether or not a function corresponding to an operation instruction received from the operation terminal 130 is to be executed, based on the environment information that the environment information acquisition unit 1745 acquires from the operation terminal 130 and the device 140.

(Control Unit 1700)

The control unit 1700 is implemented by the CPU 1600 executing programs. The control unit 1700 controls the encryption processing unit 1710, the determination unit 1720, the user information management unit 1730, the environment condition storage unit 1735, the function information management unit 1740, the environment information acquisition unit 1745, the communication unit 1750, and the command issuing unit 1760, thereby realizing the three functions of the server device 160 described above (i.e., the device registration function E, the device operation function E, and the environment information acquisition function E).

<1.3 Data>

The following describes different types of data used in the device control system 100.

(Operation Terminal Information 400)

FIG. 5 illustrates one example of the data structure of the operation terminal information 400, which is stored by the operation terminal information storage unit 370.

As illustrated in FIG. 5, the operation terminal information 400 includes a terminal type 410 and a model number 420. The terminal type and the model number are associated with one another as illustrated in FIG. 5.

The terminal type 410 indicates the type of terminal that the operation terminal 130 is classified into.

The model number 420 indicates the model of the operation terminal 130.

In this example, the operation terminal 130 is a smartphone of a model number "P-06D".

Note that the operation terminal information 400 is stored to the operation terminal information storage unit 370 by the manufacturer of the operation terminal 130 when the operation terminal 130 is manufactured.

(Device Information 1000)

FIG. 11 illustrates one example of the data structure of the device information 1000, which is stored by the device information storage unit 970.

As illustrated in FIG. 11, the device information 1000 includes a device type 1010, a model number 1020, one or more functions 1030, one or more security levels 1040, and one or more commands 1050. The device type 1010, the model number information 1020, the functions 1030, the security levels 1040, and the commands 1050 are associated with one another as illustrated in FIG. 11.

The device type 1010 indicates the type of device that the device 140 is classified into.

The model number 1020 indicates the model of the device 140.

Each function 1030 indicates a function that is controllable from the operation terminal 130, among the functions that the device 140 has as an electronic device.

Each security level 1040 indicates a security level that the operation terminal 130 needs to have in order to control the function 1030 associated therewith.

Here, the security level of the operation terminal 130 indicates the state of the operation terminal 130. In specific, the operation terminal 130 is in a first security level when the first security module 110 is attached to the operation terminal 130, whereas the operation terminal 130 is in a second security level when the first security module 110 is not attached to the operation terminal 130.

Further, the first security level is superior to the second security level. When the operation terminal 130 has the first security level, the operation terminal 130 is capable of controlling both functions that are associated with the first security level and functions that are associated with the second security level. In contrast, when the operation terminal 130 has the second security level, the operation terminal 130 is capable of controlling only the functions that are associated with the second security level.

Each command 1050 is an execution command for causing the device 140 to carry out the function 1030 associated therewith.

The example of the device information 1000 illustrated in FIG. 11 indicates that the device 140 is an air conditioner of a model number "CS-X252C". Further, this example of the device information 1000 indicates that the "Power ON", "Power OFF", "Switch operation", and "Set timer" functions of the device 140 are controllable from the operation terminal 130, and that the "Power ON", "Power OFF", "Switch operation", and "Set timer" functions are controllable from the operation terminal 130 when having the first security level, whereas the "Power OFF" function is controllable from the operation terminal 130 when having the second security level.

Note that the device information 1000 is stored to the device information storage unit 970 by the manufacturer of the device 140 when the device 140 is manufactured.

(User Information 1800)

FIG. 18 illustrates one example of the data structure of the user information 1800, which is stored by the user information management unit 1730.

As illustrated in FIG. 18, the user information 1800 includes one or more user names 1810, one or more user accounts 1820, one or more passwords 1830, one or more pieces of attribute information 1840, one or more device types 1850, one or more model numbers 1860, and one or more security module IDs 1870. The user names 1810, the user accounts 1820, the passwords 1830, the pieces of attribute information 1840, the device types 1850, the model numbers 1860, and the security module IDs 1870 are associated with one another as illustrated in FIG. 18.

Each user name 1810 indicates a name of a user using the device control system 100.

Each user account 1820 indicates an account that a user indicated by the user name 1810 associated therewith uses to log in to the server device 160.

Each password 1830 indicates a hash value of a password that a user indicated by the user name 1810 associated therewith uses to log in to the server device 160. Note that a user may determine his/her log-in password as he/she desires and may also change his/her log-in password. When a user desires to change his/her password, the user logs in to the server device 160 and changes his/her password by following predetermined procedures. In response, the password 1830 associated with the user is overwritten with a different value.

Each piece of attribute information 1840 indicates attribute information (e.g., an address, a telephone number, and a date of birth) of a user indicated by the user name 1810 associated therewith.

Each device type 1850 indicates a type of device that a device that is used by a user indicated by the user name 1810 associated therewith is classified into. The device is either one device 140 among one or more devices 140 included in the device control system 100, or one operation terminal 130 among one or more operation terminals 130 included in the device control system 100.

Each model number 1860 indicates a model of the device, whose device type is indicated by the device type 1850 associated therewith.

Each security module ID 1870 indicates a security module ID stored by a security module (i.e., a first security module or second security module) inserted into the device, whose model is indicated by the model number 1860 associated therewith.

Note that when a user desires to register a remote operation target device, the user logs in to the server device 160 and follows predetermined procedures. Further, one user is able to register more than one devices as remote operation target devices. Further, a user is able to add or delete remote operation target devices by overwriting the one or more device types 1850 currently included in the user information 1800.

(Function Information 1900)

FIG. 19 illustrates one example of the data structure of the function information 1900, which is stored by the function information management unit 1740.

The function information 1900 is a collection of the device information 1000 stored in the one or more devices 140 included in the device control system 100. The function information 1900 includes one or more associated sets of a device type and a model number, each specifying one device 140. Further, the function information 1900 associates, with each of such devices 140, one or more remotely-operatable functions of the device 140 and the security level of the device 140. Thus, the function information management unit 1740 collectively stores such information related to one or more devices 140.

As illustrated in FIG. 19, the function information 1900 includes one or more device types 1910, one or more model numbers 1920, one or more functions 1930, and one or more security levels 1940. The device types 1910, the model numbers 1920, the functions 1930, and the security levels 1940 are associated with one another as illustrated in FIG. 19.

Each device type 1910 indicates a type of device that a device 140 included in the device control system 100 is classified into.

Each model number 1920 indicates a model of the device 140.

Each function 1930 indicates, among one or more functions that the device 140 of the model indicated by the model number 1920 associated therewith has as an electronic device, one function that is controllable from the operation terminal 130.

Each security level 1940 indicates a security level that the operation terminal 130 needs to have in order to control a function of the device 140 indicated by the function 1930 associated therewith. Thus, the security levels 1940 are similar to the security levels 1040 (illustrated in FIG. 11).

(Command Information 2000)

FIG. 20 illustrates one example of the data structure of the command information 2000 and the data included in the command information 2000.

As illustrated in FIG. 20, the command information 2000 includes one or more device types 2010, one or more model numbers 2020, one or more functions 2030, and one or more commands 2040.

The device types 2010, the model numbers 2020, and the functions 2030 in the command information 2000 are the same as the device types 1910, the model numbers 1920, and the functions 1930 in the function information 1900 (illustrated in FIG. 19), respectively.

Each command 2040 is an execution command for causing a device 140 to execute the function 2030 associated therewith. The command information 2000 is stored in the function information management unit 1740, as is the function information 1900.

The server device 160, when receiving an operation instruction from an operation terminal 130, transmits an execution command corresponding to the function indicated by the operation instruction to an operation-target device 140 based on the command information 2000.

(Operation Condition Information 3000)

FIG. 21 illustrates one example of the data structure of the operation condition information 3000 and the data included in the operation condition information 3000.

As illustrated in FIG. 21, the operation condition information 3000 includes one or more device types 3010, one or more model numbers 3030, one or more functions 3030, and one or more operation conditions 3040.

The device types 3010, the model numbers 3020, and the functions 3030 in the operation condition information 3000 are the same as the device types 1910, the model numbers 1920, and the functions 1930 in the function information 1900 (illustrated in FIG. 19), respectively.

Each operation condition 3040 is a condition used in the determination of whether or not to execute a function indicated by an operation instruction, and is used to determine whether or not a function indicated by a function 3030 associated therewith is to be executed when an operation instruction for the function is issued, based on the operation state of the operation-target device 140. For example, in the example illustrated in FIG. 21, when an operation instruction is issued for "Power OFF" of a device 140 identified by a device type "air conditioner" and a model number "CS-X2520C", the operation instruction is rejected when the air conditioner is in operation (due to the corresponding operation condition 3040 indicating "Reject while in operation"). That is, when the operation condition 3040 for the "Power off" function indicates "Reject while in operation", the air conditioner cannot be remotely operated and turned off while the air conditioner is in operation. Similarly, the "Switch operation" function cannot be executed while the air conditioner is in operation. Here, note that an air conditioner is considered as being "in operation" when the air conditioner is on and is running.

Further, in the example illustrated in FIG. 21, the "Power OFF" function of a recorder identified by a model number "DMR-BZT820" cannot be remotely operated while the recorder is in recording. Further, the "Power OFF" function of a washing machine identified by a model number "NA-VH300L" cannot be remotely operated while the washing machine is in washing, and the "Power OFF" function of a rice cooker identified by a model number "SR-SPX103" cannot be remotely operated while the rice cooker is in rice cooking.

Note that when an operation condition 3040 associated with a given function includes the indication "-" (hyphen), an operation condition is not set with respect to the function. More specifically, in the example illustrated in FIG. 21, the "Set timer" function of the air conditioner identified by the model number "CS-X252C" can be remotely operated regardless of the operation state of the air conditioner.

(Location Condition Information 3100)

FIG. 22 illustrates one example of the data structure of the location condition information 3100 and the data included in the location condition information 3100.

As illustrated in FIG. 22, the location condition information 3100 includes one or more device types 3110, one or more model numbers 3120, one or more functions 3130, and one or more location conditions 3140.

The device types 3110, the model numbers 3120, and the functions 3130 in the location condition information 3100 are the same as the device types 1910, the model numbers 1920, and the functions 1930 in the function information 1900 (illustrated in FIG. 19), respectively.

Each location condition 3140 is a condition used in the determination of whether or not to execute a function indicated by an operation instruction, and is used to determine whether or not a function indicated by a function 3130 associated therewith is to be executed when an operation instruction for the function is issued, based on the distance between the operation terminal 130 having issued the operation instruction and the operation-target device 140. For example, in the example illustrated in FIG. 22, execution of the "Power OFF", "Switch operation", and "Set timer" functions of the air conditioner identified by the model number "CS-X2520C" is permitted when the distance between the air conditioner and an operation terminal 130 issuing an operation instruction is no greater than 10 km at the point when the operation instruction is issued, whereas the execution of such functions is rejected when the distance between the air conditioner and the operation terminal 130 is greater than 10 km at the point when the operation instruction is issued.

Note that when a location condition 3140 associated with a given function includes the indication "-", a location condition is not set with respect to the function. This is similar to an operation condition 3040 including the indication "-". For example, in the example illustrated in FIG. 22, the "Power OFF" function of the air conditioner identified by the model number "CS-X252C" can be remotely operated regardless of the distance between the air conditioner and the operation terminal 130 issuing an operation instruction.

(Time Condition Information 3200)

FIG. 23 illustrates one example of the data structure of the date/time condition information 3200 and the data included in the date/time condition information 3200.

As illustrated in FIG. 23, the date/time condition information 3200 includes one or more device types 3210, one or more model numbers 3220, one or more functions 3230, and one or more date/time conditions 3240.

The device types 3210, the model numbers 3220, and the functions 3230 in the date/time condition information 3200 are the same as the device types 1910, the model numbers 1920, and the functions 1930 in the function information 1900 (illustrated in FIG. 19), respectively.

Each date/time condition 3240 is a condition used in the determination of whether or not to execute a function indicated by an operation instruction, and is used to determine whether or not a function indicated by a function 3230 associated therewith is to be executed when an operation instruction for the function is issued, based on the date/time at which the operation instruction is issued. For example, in the example illustrated in FIG. 23, when an operation instruction is issued for switching the air conditioner identified by the model number "CS-X2520C" to heating through execution of the "Switch operation" function, the execution of the switching to heating is rejected when the operation instruction is issued between June and September. Further, when an operation instruction is issued for switching the air conditioner to cooling through execution of the "Switch operation" function, the execution of the switching to cooling is rejected when the operation instruction is issued between November and March. Note that when a date/time condition 3240 associated with a given function includes the indication "-", a date/time condition is not set with respect to the function. For example, in the example illustrated in FIG. 23, the "Power ON", "Power OFF", and "Set timer" functions of the air conditioner identified by the model number "CS-X252C" can be remotely operated regardless of date/time.

Further, when an operation terminal 130 issues an operation instruction for the "Power ON" function of a washing machine identified by a model number "NA-VH300L", the execution of the "Power ON" function is rejected when the date/time of issuance of the operation instruction is between 10 P.M. and 5 A.M. the following day, and is permitted when the date/time of issuance of the operation instruction is not between 10 P.M. and 5 A.M. the following day.

Note that in the present disclosure, the term "date/time" is used to refer to time in a broad sense, and refers not only includes "time" in a strict sense (e.g., hour, minute, second) and "date", but also includes "year", "month", and "season".

(Temperature Condition Information 3300)

FIG. 24 illustrates one example of the data structure of the temperature condition information 3300 and the data included in the temperature condition information 3300.

Figure 34:
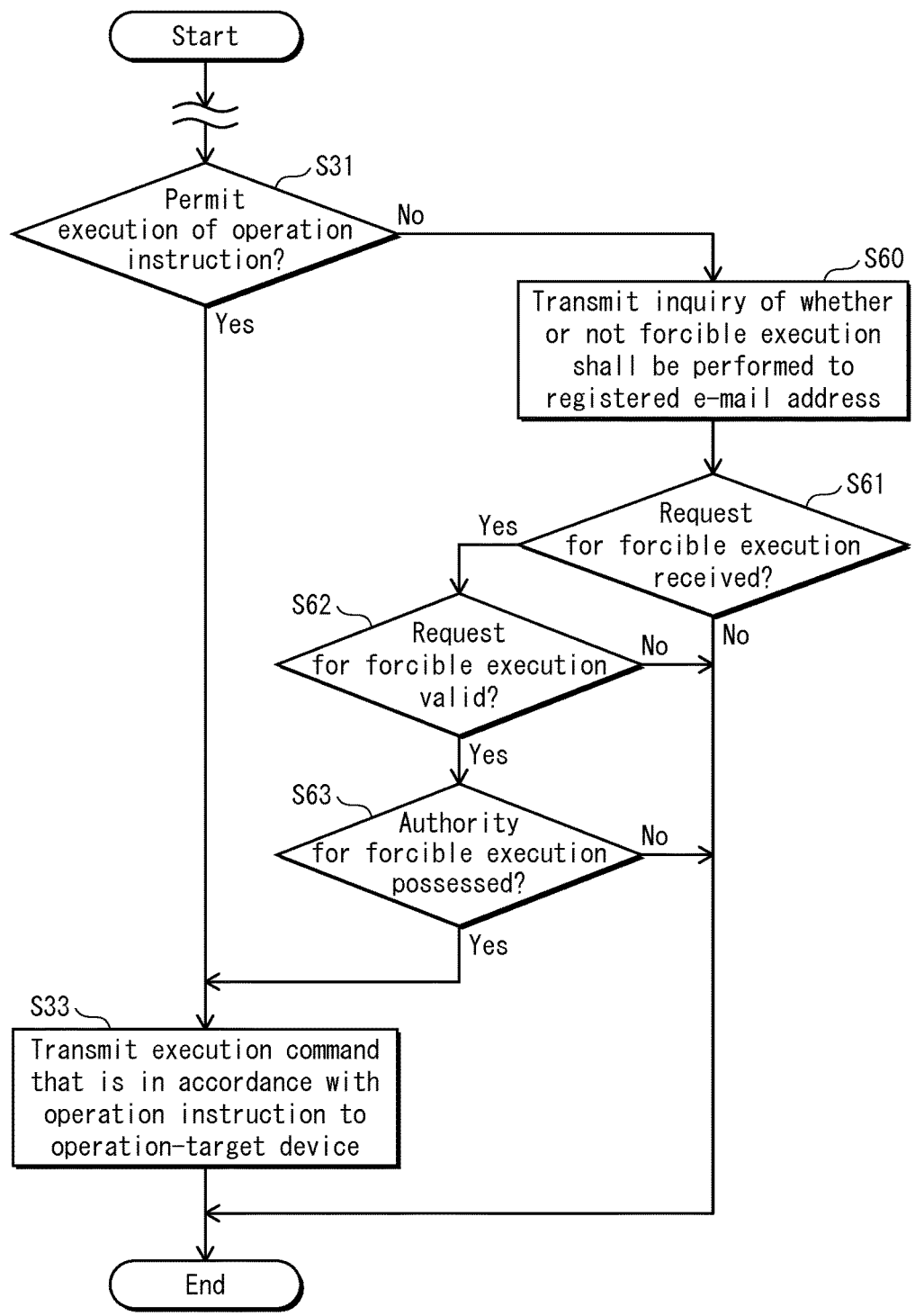
FIG. 34 is a flowchart illustrating processing by server device 160 in embodiment 2.

As illustrated in FIG. 34, the temperature condition information 3300 includes one or more device types 3310, one or more model numbers 3320, one or more functions 3330, and one or more temperature conditions 3340.

The device types 3310, the model numbers 3320, and the functions 3330 in the temperature condition information 3300 are the same as the device types 1910, the model numbers 1920, and the functions 1930 in the function information 1900 (illustrated in FIG. 19), respectively.

Each temperature condition 3340 is a condition used in the determination of whether or not to execute a function indicated by an operation instruction, and is used to determine whether or not a function indicated by a function 3330 associated therewith is to be executed when an operation instruction for the function is issued, based on the temperature at the location of an operation-target device 140 at the point when the operation instruction is issued. For example, in the example illustrated in FIG. 24, when an operation instruction is issued for switching the air conditioner identified by the model number "CS-X2520C" to heating through execution of the "Switch operation" function, the execution of the switching to heating is rejected when the temperature is 25 degrees Celsius or higher. Further, when an operation instruction is issued for switching the air conditioner to cooling through execution of the "Switch operation" function, the execution of the switching to cooling is rejected when the temperature is 20 degrees Celsius or lower. Note that when a temperature condition 3340 associated with a given function includes the indication "-", a temperature condition is not set with respect to the function. For example, in the example illustrated in FIG. 24, the "Power ON", "Power OFF", and "Set timer" functions of the air conditioner identified by the model number "CS-X252C" can be remotely operated regardless of temperature.

(In-room Presence Condition Information 3400)

FIG. 25 illustrates one example of the data structure of the in-room presence condition information 3400 and the data included in the in-room presence condition information 3400.

As illustrated in FIG. 25, the in-room presence condition information 3400 includes one or more device types 3410, one or more model numbers 3420, one or more functions 3430, and one or more in-room presence conditions 3440.

The device types 3410, the model numbers 3420, and the functions 3430 in the in-room presence condition information 3400 are the same as the device types 1910, the model numbers 1920, and the functions 1930 in the function information 1900 (illustrated in FIG. 19), respectively.

Each in-room presence condition 3440 is a condition used in the determination of whether or not to execute a function indicated by an operation instruction, and is used to determine whether or not a function indicated by a function 3430 associated therewith is to be executed when an operation instruction for the function is issued, based on whether or not a person is detected around the operation-target device 140 at the point when the operation instruction is issued. More specifically, when an in-room presence condition 3440 associated with a given function includes the indication "Reject", the function is not executed when a person is detected around the operation-target device 140. On the other hand, when an in-room presence condition 3440 associated with a given function includes the indication "Permit", the function is executed even when a person is detected around the operation-target device 140. Note that each of these functions is executed when a person is not detected around the operation-target device 140.

For example, in the example illustrated in FIG. 25, execution of the "Power ON", "Power OFF", and "Switch operation" functions of the air conditioner identified by the model number "CS-X2520C" is rejected when a person is detected around the air conditioner, whereas execution of the "Set timer" function of the air conditioner is permitted even when a person is detected around the air conditioner. Similarly, execution of the "Power ON" and "Power OFF" functions of the recorder identified by the model number "DMR-BZT820" is rejected when a person is detected around the recorder, whereas execution of the "Programmed recording" function of the recorder is permitted even when a person is detected around the recorder.

<1.4 Operations>

This concludes the description of the structure of the device control system 100. The following describes operations performed by the device control system 100, with reference to the accompanying drawings.

<1.4.1 Operations of Operation Terminal 130>

The following describes the operations of an operation terminal 130.

Figure 26:
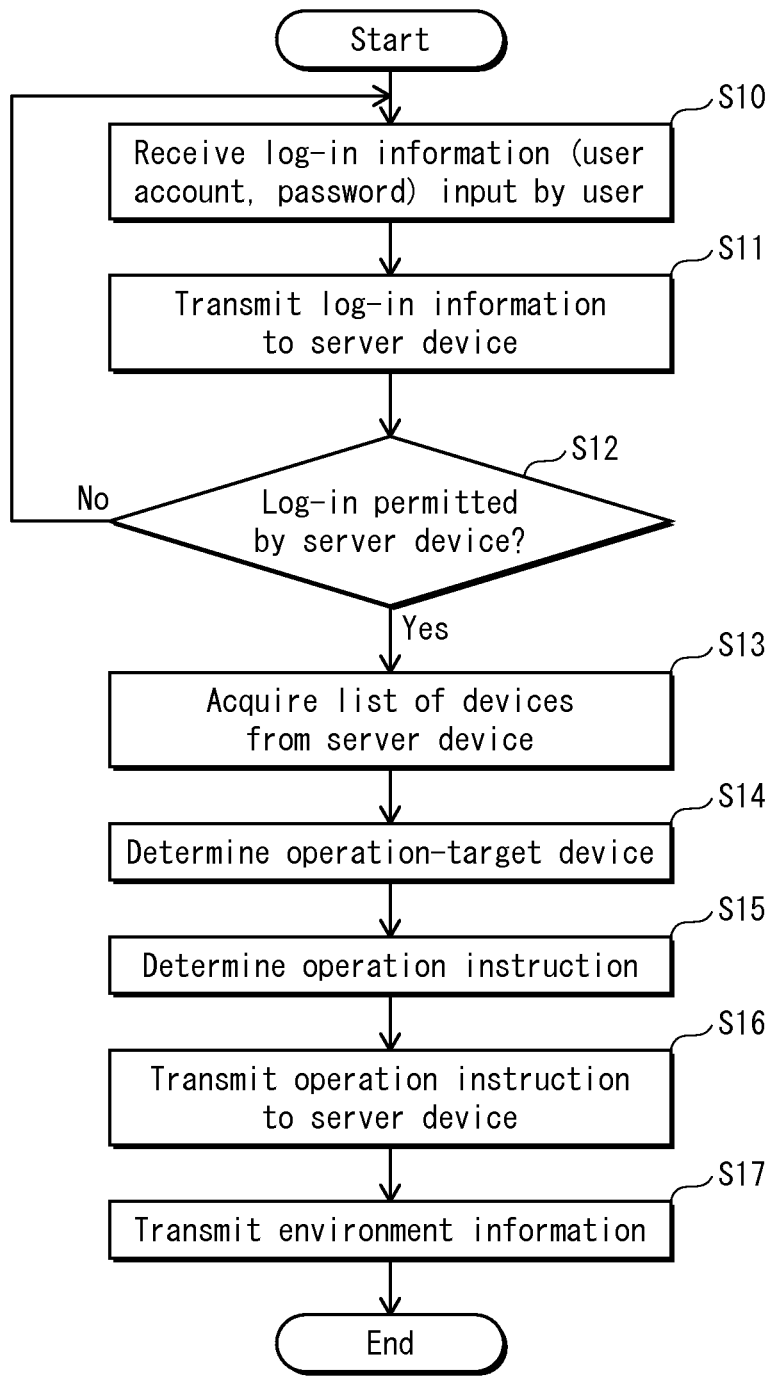
FIG. 26 is a flowchart illustrating processing by operation terminal 130 in issuance of operation instruction.

FIG. 26 is a flowchart illustrating processing of an operation terminal 130 when issuing an operation instruction.

A user desiring to remotely operate a device 140 first logs in to the server device 160 by using an operation terminal 130, and issues an operation instruction according to an operation menu.

The operation terminal 130 receives a user account and a password from the user (Step S10). The user account and the password are those input by the user to log in to the server device 160.

The operation terminal 130 transmits the user account and the password so received to the server device 160 via the communication unit 350. Here, note that a security module ID received from a first security module attached to the operation terminal 130 is also transmitted to the server device 160 along with the user account and the password (Step S11).

Then, the operation terminal 130 determines whether or not the user has been permitted to log in to the server device 160 (Step S12). In specific, this determination is made according to information transmitted from the server device 160 that indicates whether or not the user has been permitted to log in.

The operation terminal 130, when receiving information indicating that the user has not been permitted to log in from the server device 160 (NO in Step S12), returns to the processing in Step S10.

Meanwhile, the operation terminal 130, when receiving information indicating that the user has been permitted to log in from the server device 160 (YES in Step S12), acquires a list of remotely-operatable devices 140 from the server device 160 (Step S13).

When such a device list is acquired, the display unit 310 displays the device list, and the user operates the touch panel 240 with the device list displayed thereon to select an operation-target device 140.

The operation reception unit 320 receives this operation, and the control unit 300 specifies the operation-target device 140 according to the operation received (Step S14).

Having selected an operation-target device 140, the user selects a function that the user would like for the operation-target device 140 to execute. The operation reception unit 320 receives the selected function, and the control unit 300 specifies an operation instruction based on the selected function (Step S15).

The control unit 300 transmits the operation instruction to the server device 160 via the communication unit 350 (Step S16).

Subsequently, the control unit 300 transmits the environment information of the operation terminal 130, which is acquired by the environment information acquisition unit 325, via the communication unit 350 (Step S17). More specifically, in this example, the operation terminal 130 transmits, as the environment information of the operation terminal 130, location information (e.g., values of latitude and longitude) indicating the present location of the operation terminal 130, which is based on location-related information that the GPS receiver 285 acquires.

<1.4.2 Operations of Server Device 160>

The following describes the operations of the server device 160.

FIG. 26 is a flowchart illustrating processing of the server device 160 when accessed by an operation terminal 130 for remote operation.

The control unit 1700 of the server device 160 receives, via the communication unit 1750, the log-in information that the operation terminal 130 transmits in Step S11 in FIG. 26 (Step S20).

The control unit 1700 authenticates the log-in information so received (Step S21).

The control unit 1700, when determining that the operation terminal 130 shall not be permitted to log in (NO in Step S22), transmits, to the operation terminal 130, information indicating that the operation terminal 130 has not been permitted to log in, via the communication unit 1750 (Step S23). Further, the control unit 1700 returns to the processing in Step S20 and waits for log-in information to be input from the operation terminal 130.

Meanwhile, the control unit 1700, when determining that the operation terminal 130 shall be permitted to log in (YES in Step S22), transmits to the operation terminal 130 information indicating that the operation terminal 130 has been permitted to log in via the communication unit 1750 (Step S23).

Subsequently, the control unit 1700 refers to the user information 1800 stored in the user information management unit 1730 to extract a list of devices registered along with the user account that has been permitted to log in to the server device 160. Further, the control unit 1700 refers to the function information 1900 stored in the function information management unit 1740 to extract, for each of such the devices extracted, functions that are operatable. Further, the control unit 1700 transmits the list of devices and a list including operatable functions of each of the devices to the operation terminal 130 via the communication unit 1750 (Step S25).

Following this, the control unit 1700 waits until the operation instruction the operation terminal 130 is transmitted from the operation terminal 130 (Step S26), and when receiving the operation instruction from the operation terminal 130 (YES in Step S26), the control unit 1700 requests that the operation terminal 130 transmit the environment information of the operation terminal 130 (i.e., location information indicating the present location of the operation terminal 130 in this example) thereto (Step S27). Thus, the control unit 1700 receives the environment information of the operation terminal 130 (i.e., location information indicating the present location of the operation terminal 130 in this example), which the operation terminal 130 transmits in Step S17 in FIG. 26 (Step S28).

Following this, the control unit 1700 transmits, to the operation-target device 140 via the communication unit 1750, a request that the operation-target device 140 transmit thereto environment information of the operation-target device 140 (Step S29). In this example, the control unit 1700 requests that the operation-target device 140 transmit thereto, as environment information of the operation-target device 140, information indicating the operation state of the operation-target device 140 (e.g., whether or not the device 140 is in operation), information indicating the location of the device 140 (e.g., the latitude and longitude of the location), information indicating the present date/time (including year and month), information indicating the temperature around the operation-target device 140, and information indicating whether or not a person is present around the operation-target device 140. Note that in this example, the server device 160 pertaining to the present embodiment requests that the operation-target device 140 transmit thereto all such information as environment information of the operation-target device 140.

Then, the control unit 1700 receives, via the communication unit 1750, the environment information of the operation-target device 140 from the operation-target device 140 (Step S30).

Subsequently, the determination unit 1720 compares the environment information received by the control unit 1700 with the information stored by the environment condition storage unit 1735, and thereby makes a determination of whether or not to permit the operation-target device 140 to execute the function indicated by the operation instruction (Step S31). The information stored by the environment condition storage unit 1735 includes: the operation condition information 3000; the location condition information 3100; the date/time condition information 3200; the temperature condition information 3300, and the in-room presence condition information 3400. When the determination unit 1720 determines not to permit the operation-target device 140 to execute the function indicated by the operation instruction (NO in Step S31), the control unit 1700 transmits information indicating that execution of the function has not been permitted to the operation terminal 130 via the communication unit 1750 (Step S32). Further, the determination unit 1720 returns to the processing Step S26 once again and waits until the operation terminal 130 to transmit another operation instruction thereto.

Meanwhile, when the determination unit 1720 determines to permit the operation-target device 140 to execute the function indicated by the operation instruction (YES in Step S31), the command issuing unit 1760 refers to the command information 2000 stored by the function information management unit 1740 to extract an execution command corresponding to the function, and transmits the execution command so extracted to the operation-target device 140 via the communication unit 1750 (Step S33).

The following describes the procedures in the determination of whether or not to permit the operation-target device 140 to execute the function indicated by the operation instruction, based on a specific example where the operation instruction is an operation instruction that is received from an operation terminal 130 used by an user A and that is for causing an air conditioner that is registered as a device that the user A is able to operate (the air conditioner illustrated in FIG. 18 whose security module ID is "0xC63694AD" and whose model number is "CS-X252C") to execute the "Switch operation" function (switching to heating in this example).

Figure 28:
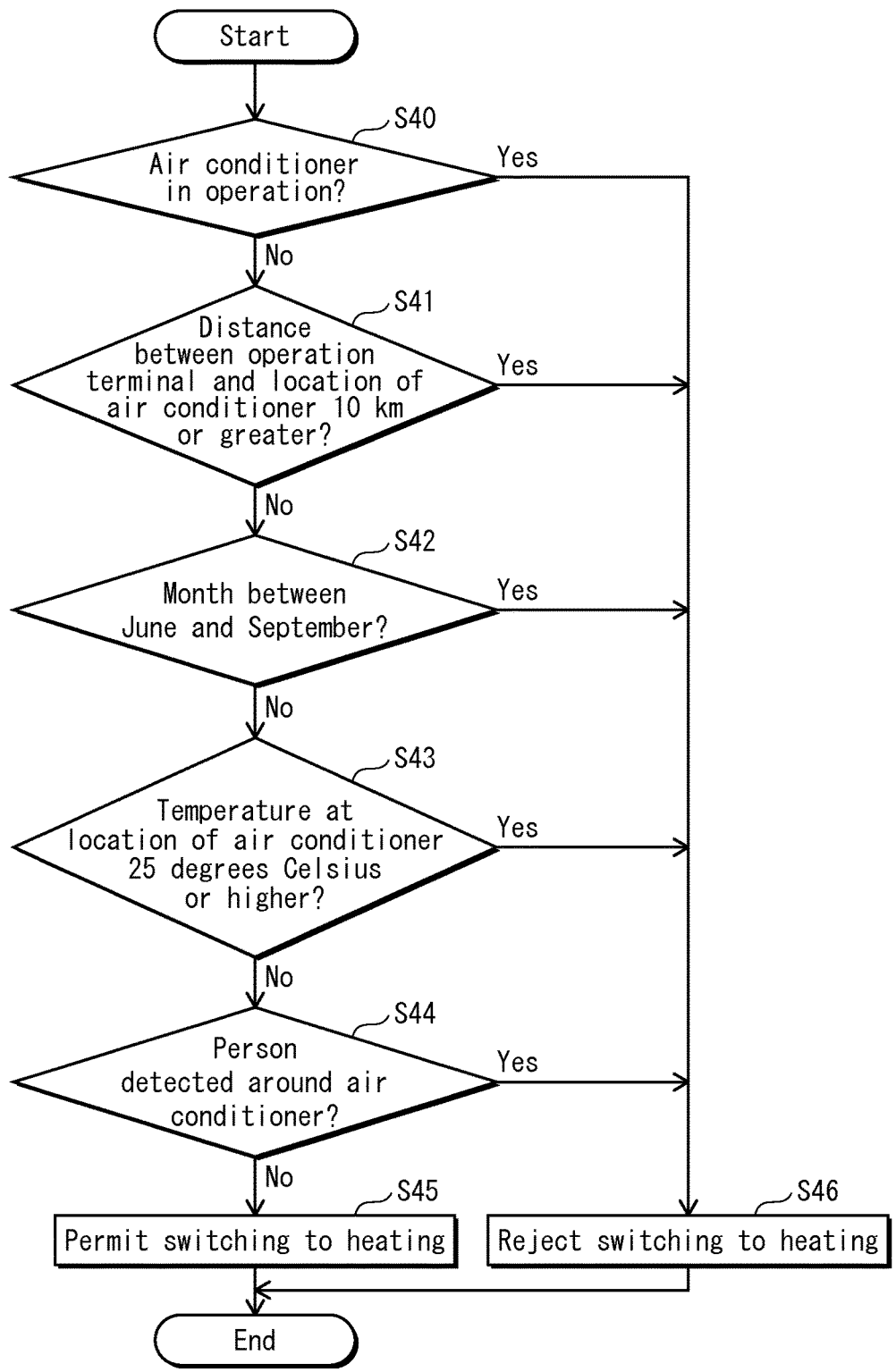
FIG. 28 is a flowchart illustrating one example of specific processing in determination of whether or not to permit execution of function indicated by operation instruction.

FIG. 28 is a flowchart illustrating processing of the server device 160 for determining whether or not to permit execution of the "Switch operation" function in the above-described example where the operation instruction is that for causing the operation-target device 140 (i.e., the air conditioner) to switch to heating.

First, the determination unit 1720 determines whether or not the air conditioner is in operation (Step S40). In specific, the determination unit 1720 determines that the device 140 is in operation when the operation state of the device 140, which is included in the environment information of the operation-target device 140 acquired in Step S30 (illustrated in FIG. 27), indicates that the operation-target device 140 is in operation. When YES in Step S40, the determination unit 1720 does not permit the operation-target device 140 to switch to heating because in the operation condition information 3000, an operation condition 3040 corresponding to the function 3030 "Switch operation" indicates "Reject in operation", and thus, the server device 160 does not transmit an execution command to the operation-target device 140 (Step S46).

Figure 27:
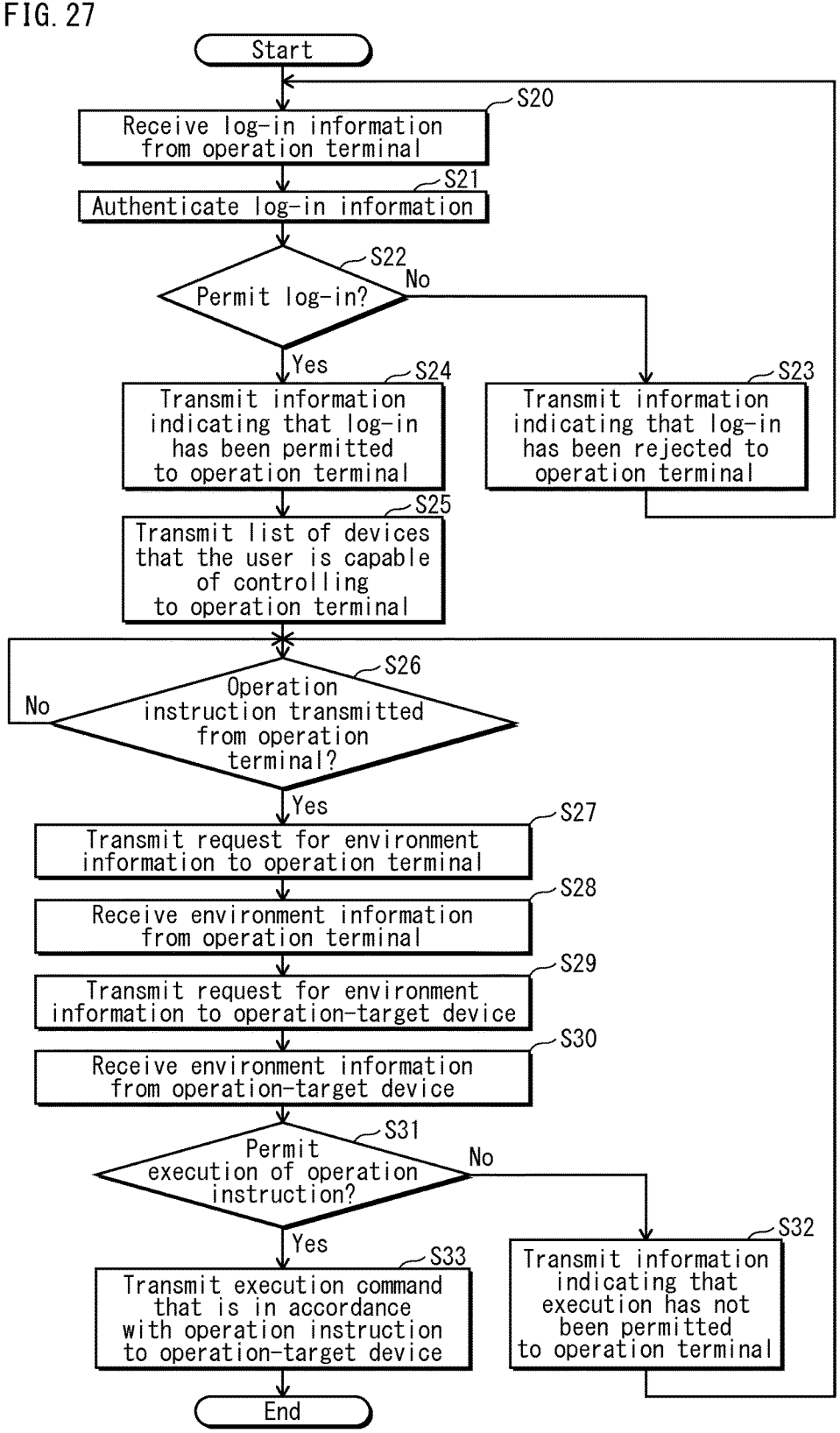
FIG. 27 is a flowchart illustrating processing by server device 160 in embodiment 1.

Meanwhile, when the air conditioner is not in operation (NO in Step S40), the determination unit 1720 calculates the distance between the location of the operation terminal 130 and the location of the air conditioner, and determines whether or not the distance is 10 km or greater (Step S41). In specific, the determination unit 1720 calculates the distance by using (i) the location information of the operation terminal 130 (e.g., values of latitude and longitude) acquired in Step S28 in FIG. 27 and (ii) the location of the air conditioner (e.g., values of latitude and longitude) acquired in Step S30 in FIG. 27. When determining that the distance so calculated is 10 km or greater (YES in Step S41), the determination unit 1720 executes the processing in Step S46. Meanwhile, when determining that the distance so calculated is smaller than 10 km (NO in Step S41), the determination unit 1720 determines whether or not the operation instruction has been issued between June and September (Step S42). In specific, the determination unit 1720 extracts information on the month from the present date/time acquired in Step S30 in FIG. 27, and determines whether or not the month so extracted corresponds to one of the months between June and September (i.e., June, July, August, or September). When the month so extracted corresponds to one of the months between June and September (YES in Step S42), the determination unit 1720 executes the processing in Step S46. Meanwhile, when the month so extracted does not correspond to any of the months between June and September (NO in Step S42), the determination unit 1720 determines whether or not the temperature at the location of the air conditioner is 25 degrees Celsius or higher (Step S43). In specific, the determination unit 1720 determines whether or not the temperature indicated by the temperature around the device acquired in Step S30 in FIG. 27 is 25 degrees Celsius or higher. When determining that the temperature indicated by the temperature around the device is 25 degrees Celsius or higher (YES in Step S43), the determination unit 1720 executes the processing in Step S46.

Meanwhile, when determining that the temperature around the device is lower than 25 degrees Celsius, the determination unit 1720 determines whether or not a person is present around the air conditioner (Step S44). In specific, the determination unit 1720 performs this determination based on the information indicating whether or not a person is present around the device, which is acquired in Step S30 in FIG. 27. When the information indicates that a person is present around the device (YES in Step S44), the determination unit 1720 executes the processing in Step S46. When the information does not indicate that a person is present around the device (NO in Step S44), the determination unit 1720 permits the air conditioner to execute the "Switch operation" function to switch to heating (Step S45).

Note that the order in which the condition-based comparisons in Steps S40 through S44 are performed is not limited to that illustrated in FIG. 28. That is, the comparisons performed by using registered conditions may be performed in any order. Further, note that when a plurality of conditions need to be satisfied for a function indicated by an operation instruction to be executed, the determination unit 1720 rejects the execution of the function if any of such conditions is not satisfied, or in other words, permits the execution of the function only when all such conditions are satisfied.

Note that the distance "10 km" used in Step S41 is not a fixed value and may be changed. In specific, the distance set to a corresponding location condition 3140 in the location condition information 3100 is used in the determination in Step S41, and when a distance other than 10 km is set to a corresponding location information 3140, such a distance is used instead. For example, the distance used when determining whether or not to permit execution of the "Power ON" function of the recorder identified by the model number "DMR-BZT820" is 50 km.

Similarly, the conditions "from June to September" and "25 degrees Celsius" used in Steps S42 and S43, respectively, are not fixed values. In specific, a function-specific value set to a corresponding date/time condition 3240 is used in the determination in Step S42, and a function-specific value set to a corresponding temperature condition 3340 is used in the determination in Step S43.

<1.4.2 Operations of Device 140>

The following describes the operations of an operation-target device 140.

Figure 29:
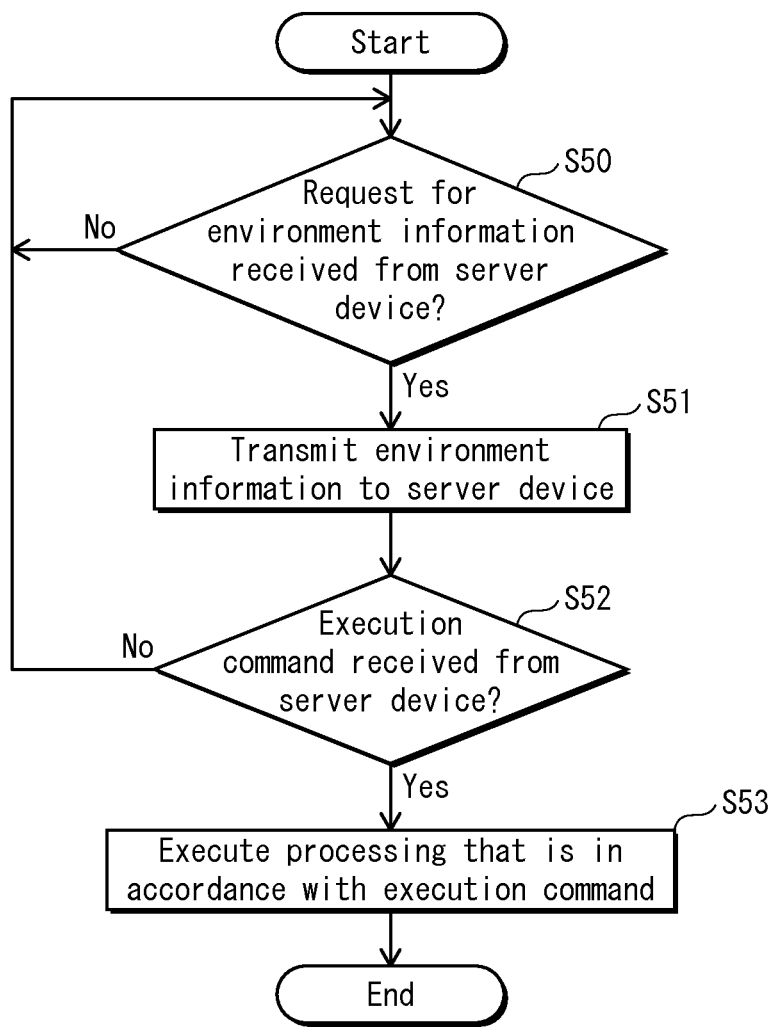
FIG. 29 is a flowchart illustrating processing by device 140.

FIG. 29 is a flowchart illustrating processing executed by the operation-target device 140 when an operation terminal 130 issues an operation instruction.

The request for acquisition of the environment information of the operation-target device 140, which is transmitted by the server device 160 in Step S29 in FIG. 27, is received by the control unit 900 of the operation-target device 140 by the control unit 900 communicating with a second security module 120 connected to the connector 860 and receiving the request via the second security module 120 (YES in Step 50). When not receiving the acquisition request from the server device 160 in Step S50 (NO in Step S50), the control unit 900 waits until another request for acquisition of the environment information of the operation-target device 140 is received.

Meanwhile, when YES in Step S50, the control unit 900 instructs the environment information acquisition unit 960 to acquire the environment information of the operation-target device 140, whose acquisition has been requested by the server device 160. The environment information acquisition unit 960 acquires the environment information in accordance with the instruction from the control unit 900, and outputs the environment information so acquired to the control unit 900. When acquiring the environment information from the environment information acquisition unit 960, the control unit 900 outputs the environment information to the second security module 120 via the security module communication unit 930, and the control unit 1200 of the second security module 120 transmits the environment information so received to the server device 160 via the communication unit 1250 (Step S51).

Subsequently, the control unit 900 determines whether or not an execution command is received from the server device 160 via the second security module 120 (Step S52). When an execution command is not received from the server device 160 (NO in Step S52), the control unit 900 repeats the processing in Step S50 and on once again. Meanwhile, when the command reception unit 910 receives the execution command from the server device 160 (YES in Step S52), the control unit 900 outputs the execution command so received to the execution unit 920, in response to which the execution unit 920 causes the device hardware 890 to execute processing corresponding to the execution command (Step S53).

<1.5 Specific Example of Operations of Device Control System 100 in Remote Operation>

The following explains the specific operations performed in the device control system 100, which includes an operation terminal 130, one or more devices 140, and a server device 160 having the respective functions described above, when a device 140 is remotely operated by using the operation terminal 130.

Figure 30:
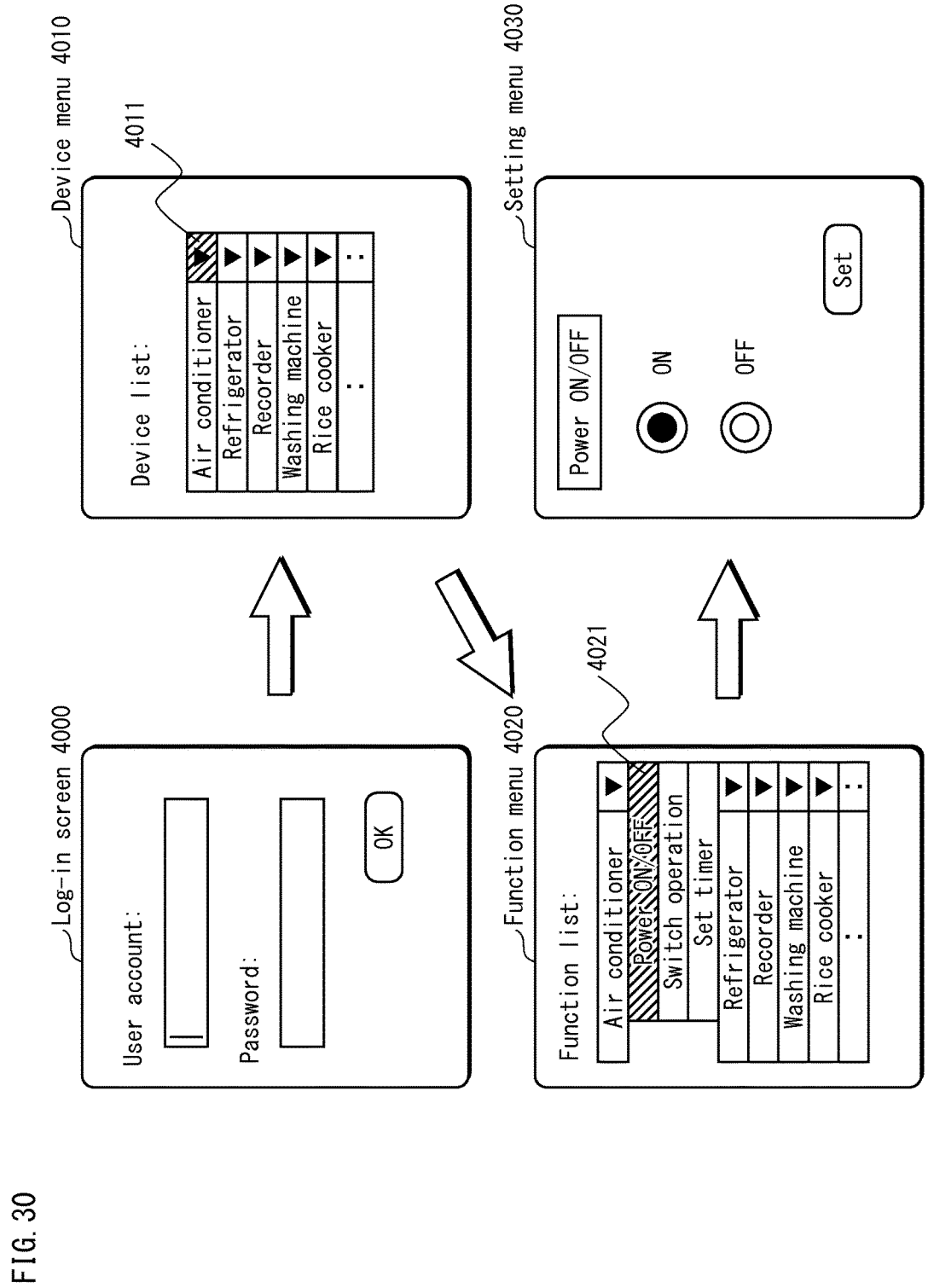
FIG. 30 illustrates one example of user interface (UI) of operation terminal 130.
Figure 31:
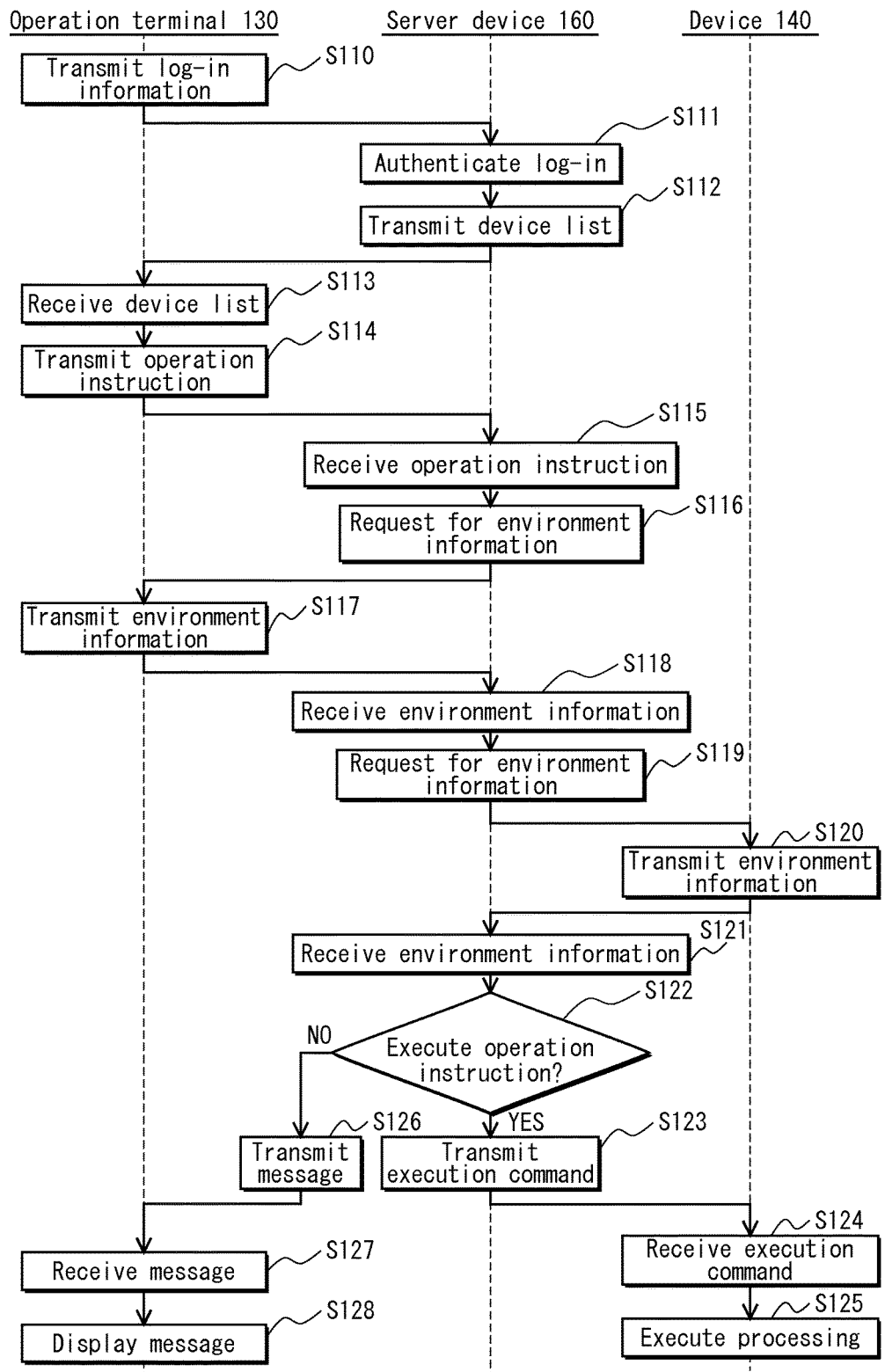
FIG. 31 illustrates one example of sequence of processing in remote operation by device control system 100.
Figure 32:
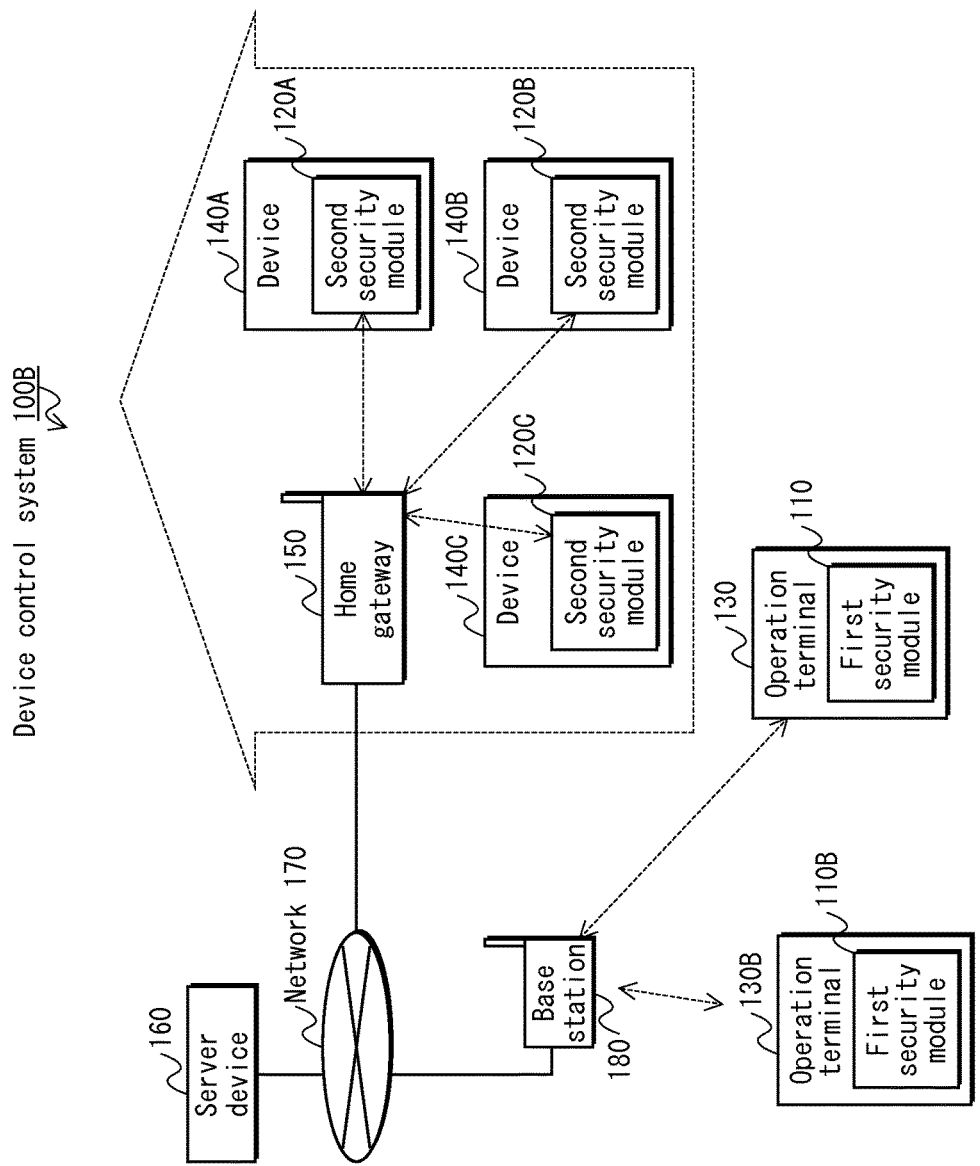
FIG. 32 is a schematic illustrating structure of device control system 100B in embodiment 2.

FIG. 30 illustrates one example of a user interface displayed by the display unit 310 of the operation terminal 130. Further, FIG. 31 illustrates one example of the sequence of processing in the remote operation.

First, a user desiring to remotely operate a device 140 inputs his/her user account and password on a log-in screen (e.g., the log-in screen 4000 illustrated in FIG. 30), whereby the user attempts to log in to the server device 160 (Step S110). Here, description is provided based on the assumption that the user's user account and password are already registered to the server device 160. In specific, when the user presses the OK button after inputting his/her user account and password, the control unit 300 of the operation terminal 130 encrypts the user account, the password, and a security module ID of the first security module 110 by using the encryption processing unit 360, and transmits the encrypted information to the server device 160 via the communication unit 350 as log-in information.

The server device 160 authenticates the log-in information so received (Step S111). In specific, the server device 160 receives the log-in information transmitted from the operation terminal 130, decrypts the log-in information so received by using the encryption processing unit 1710, and checks the validity of the log-in information so received by referring to the user information 1800 stored in the user information management unit 1730.

When determining that the log-in information is valid, the server device 160 extracts the devices that are registered to the user information 1800 as devices that the user specified by the user account is able to remotely operate, and transmits a list of such devices to the operation terminal 130 (Step S112).

The operation terminal 130 receives this device list transmitted from the server device 160, and causes the display unit 310 to display a list of devices that the user is able to remotely operate (e.g., device menu 4010 illustrated in FIG. 30) based on the device list so received (Step S113).

The user selects one device that he/she would like to remotely operate from the devices displayed on the device menu 4010. In specific, when the user presses a pull-down button 4011 corresponding to an air conditioner in the device menu 4010 illustrated in FIG. 30 to select an air conditioner as the operation-target device 140, a list of functions of the air conditioner that the user is able to control (e.g., the function menu 4020 illustrated in FIG. 30) is displayed.

Then, the user selects one function from among the functions included in the function list so displayed to issue an operation instruction. In the example illustrated in FIG. 30, the user has selected the "Power ON/OFF" function 4021 in the function menu 4020. When the user selects the "Power ON/OFF" function 4021, the operation terminal 130 causes the display unit 310 to display the setting menu 4030 for the "Power ON/OFF" function 4021. When the setting menu 4030 is displayed, the user selects an operation that he/she would like to set on the setting menu 4030 so displayed. In the example illustrated in FIG. 30, the user has selected the operation of turning on the air conditioner. When the user selects an operation and presses the "Set" button, the operation terminal 130 transmits an operation instruction corresponding to the operation so selected to the server device 160 (Step S114).

The server device 160 receives the operation instruction transmitted from the operation terminal 130 (Step S115). The server device 160, when receiving the operation instruction from the operation terminal 130, transmits a request for the environment information of the operation terminal 130 (e.g., location information indicating the present location of the operation terminal 130) to the operation terminal 130 (Step S116).

In response, the operation terminal 130 transmits the environment information thereof (e.g., location information indicating the present location thereof) to the server device 160 (Step S117).

When receiving the environment information transmitted from the operation terminal 130 (Step S118), the server device 160 transmits, to the operation-target device 140, a request for the environment information of the operation-target device 140 (Step S119).

The operation-target device 140, when receiving the request for the environment information thereof from the server device 160, transmits the environment information thereof to the server device 160 (Step S120).

When receiving the environment information from the operation-target device 140 (Step S121), the server device 160 determines whether or not to execute the operation instruction based on the environment information received from the operation terminal 130 and the environment information received from the operation-target device 140, by referring to the environment conditions stored therein in advance (Step S122). When determining not to execute the function indicated by the operation instruction (NO in Step S122), the server device 160 transmits, to the operation terminal 130, a message indicating that the function indicated by the operation instruction has not been executed (Step S126).

When receiving this message from the server device 160 (Step S127), the operation terminal 130 uses the display unit 310 to display this message, and thereby notifies the user of non-execution of the function (Step S128).

Meanwhile, when determining to execute the function indicated by the operation instruction (YES in Step S122), the server device 160 transmits, to the operation-target device 140, an execution command corresponding to the function indicated by the operation instruction (Step S123).

When receiving the execution command from the server device 160 (Step S124), the operation-target device 140 executes the processing indicated by the execution command (Step S125).

<2. Embodiment 2>

<2.1 Overview>

In the device control system 100 pertaining to embodiment 1, when determining not to execute the operation instruction received from the operation terminal 130, the server device 160 does not transmit the execution command to the operation-target device 140. Thus, the operation-target device 140 does not execute a function thereof in response to the remote operation.

The present embodiment describes a device control system 100B. In the device control system 100B, after determining not to execute a function indicated by an operation instruction received from the operation terminal 130, the server device 160 checks with the user whether or not the user would like the function indicated by the operation instruction, execution of which has once been rejected, to be executed (i.e., whether or not the user would like to force the function to be executed). Following this, when specific conditions are satisfied, the server device 160 transmits an execution command corresponding to the function indicated by the operation instruction to the operation-target device 140.

The following describes the structure of the device control system 100B, while omitting description of structural elements similar to those in the device control system 100 and thus focusing on structural elements differing between the device control system 100B and the device control system 100.

<2.2 Structure>

(Device Control System 100B)

The device control system 100B has the same basic structure as the device control system 100. However, the structure of the device control system 100B differs from that of the device control system 100 in that the device control system 100B includes, in addition to the structural elements of the device control system 100, an operation terminal 130B.

(Operation Terminal 130B)

Basically, the operation terminal 130B has the same structure and functions as the operation terminal 130. However, in addition to the functions of the operation terminal 130, the operation terminal 130B has a function of receiving e-mails that are addressed to an e-mail address 1835 registered in user information 1800B. The user information 1800B is described in detail later in the present disclosure. Further, the operation terminal 130B also has a function of issuing an operation instruction that forces a function indicated by an operation instruction to be indicated, based on such e-mails transmitted thereto.

(Server Device 160)

The server device 160 in the present embodiment differs from the server device 160 in embodiment 1 in that the user information management unit 1730 stores the user information 1800B in place of the user information 1800.

Further, the server device 160 in the present embodiment differs from the server device 160 in embodiment 1 for having, in addition to the functions of the server device 160 in embodiment 1, a function of, after rejecting execution of a function indicated by an operation instruction issued from the operation terminal 130, transmitting an e-mail, to an e-mail address corresponding to the user having issued the operation instruction, inquiring whether or not the user would like to force the function to be executed. In addition, the server device 160 has a function of checking validity of an operation instruction issued by the operation terminal 130B to force execution of a function, determining whether or not to execute the function, and performing control for executing the function based on the determination. Note that in the following, execution by the server device 160 of a function whose execution has been once rejected, in response to an operation instruction for forcing the function to be executed is referred to as "forcible execution" of the function.

<2.3 Data>

(User Information 1800B)

The user information 1800B includes; one or more user names 1810; one or more user accounts 1820; one or more passwords 1830; one or more pieces of attribute information 1840; one or more device types 1850; one or more model numbers 1860; and one or more security module IDs 1870, which are also included in the user information 1800 in embodiment 1.

In addition to such information, the user information 1800B also includes one or more e-mail addresses 1835 and one or more authority levels 1836.

Each e-email address 1835 is an e-mail address indicating a transmission destination of an e-mail inquiring whether or not a user desires to force execution of a function indicated by an operation instruction that has once been rejected by the server device 160.

Each authority level 1836 indicates whether or not a user possesses authority required for forcible execution of functions. In specific, when "1" is set to an authority level 1836, a user has the authority to cause forcible execution of a function, whereas when "0" is set to an authority level 1836, a user does not have the authority to cause forcible execution of functions.

<2.4 Operations>

This concludes the description of the structure of the device control system 100B. The following describes operations performed by the device control system 100B, with reference to the accompanying drawings.

In the device control system 100B, the operation terminal 130 and the device 140 perform the same operations as in the device control system 100.

<2.4.1 Operations of Server Device 160>

The following describes the operations of the server device 160.

FIG. 34 is a flowchart illustrating processing of the server device 160 when accessed by an operation terminal 130 for remote operation.

Note that FIG. 34 does not illustrate processing executed prior to the processing in Step S31 and illustrates the processing in and following that in Step S31, due to the processing in Steps S20 through S30 being the same as those illustrated in FIG. 27.

Further, the processing executed after YES in Step S31 is similar to that illustrated in FIG. 27. Thus, the following description focuses on the processing executed after NO in Step S31.

When determining not to execute the function indicated by the operation instruction received from the operation terminal 130 in Step S31 (i.e., when NO in Step S31), the control unit 1700 of the server device 160 refers to the user information 1800B and transmits an e-mail inquiring whether or not the user desires to force execution of the function to an e-mail address 1835 registered in the user information 1800B (Step S60). Note that in the present embodiment, the operation terminal 130B, and not the operation terminal 130, receives this e-mail.

Following this, the control unit 1700 waits for a predetermined amount of time (e.g., five minutes) for a request for forcible execution to be received (Step S61), and when a request for forcible execution is not received within the predetermined amount of time (NO in Step S61), terminates processing. Meanwhile, when the server device 160 receives a request for forcible execution from the operation terminal 130B via the communication unit 1750 (YES in Step S61), the determination unit 1720 determines whether or not the request for forcible execution so received is valid (Step S62). In specific, this may be realized as follows, for example. The control unit 1700, upon transmitting the e-mail of inquiry to the operation terminal 130B, generates a passphrase unique to the operation instruction (for example, an arbitrary character sequence) and includes the passphrase so generated in the e-mail. The determination unit 1720, when receiving a request for forcible execution, determines whether or not the request includes the same passphrase as the unique passphrase having been generated by the control unit 1700. Thus, the determination unit 1720 determines whether or not the request for forcible execution is valid. In specific, the determination unit 1720 determines that the request for forcible execution is valid only when the passphrase included in the request matches the passphrase included in the e-mail of inquiry transmitted by the control unit 1700, whereas the determination unit 1720 determines that the request is invalid when the request for forcible execution does not include a passphrase or when the passphrase included in the request does not match the passphrase included in the e-mail of inquiry having been transmitted by the control unit 1700.

When the determination unit 1720 determines that the received request is invalid (NO in Step S62), the control unit 1700 terminates processing. This is similar to NO in Step S61. Meanwhile, when determining that the received request is valid (YES in Step S62), the determination unit 1720 determines whether or not the request for forcible execution is issued by a user possessing the authority to cause forcible execution (Step S63). In specific, the determination unit 1720 refers to the user information 1800B, and determines that the user having issued the request for forcible execution possesses the authority to cause forcible execution when the authority level 1836 corresponding to the user indicates "1". Meanwhile, when the authority level 1836 corresponding to the user does not indicate "1" (e.g., when the authority level 1836 indicates "0"), the determination unit 1720 determines that the user having issued the request for forcible execution does not possess the authority to cause forcible execution.

When the determination unit 1720 determines that the user having issued the request for forcible execution does not possess the authority to cause forcible execution (NO in Step S63), the control unit 1700 terminates processing. This is similar to NO in Steps S61 and S62. Meanwhile, when the determination unit 1720 determines that the user having issued the request for forcible execution possesses the authority to cause forcible execution (YES in Step S63), the command issuing unit 1760 refers to the command information 2000 stored by the function information management unit 1740 to extract an execution command corresponding to the execution-target function, and transmits the execution command so extracted to the operation-target device 140 via the communication unit 1750 (Step S33).

<2.5 Specific Example of Operations of Device Control System 100B in Remote Operation>

The following explains the specific operations performed in the device control system 100B, which includes an operation terminal 130, an operation terminal 130B, one or more devices 140, and a server device 160 having the respective functions described above, when a device 140 is remotely operated by using the operation terminal 130 and the operation terminal 130B.

Figure 35:
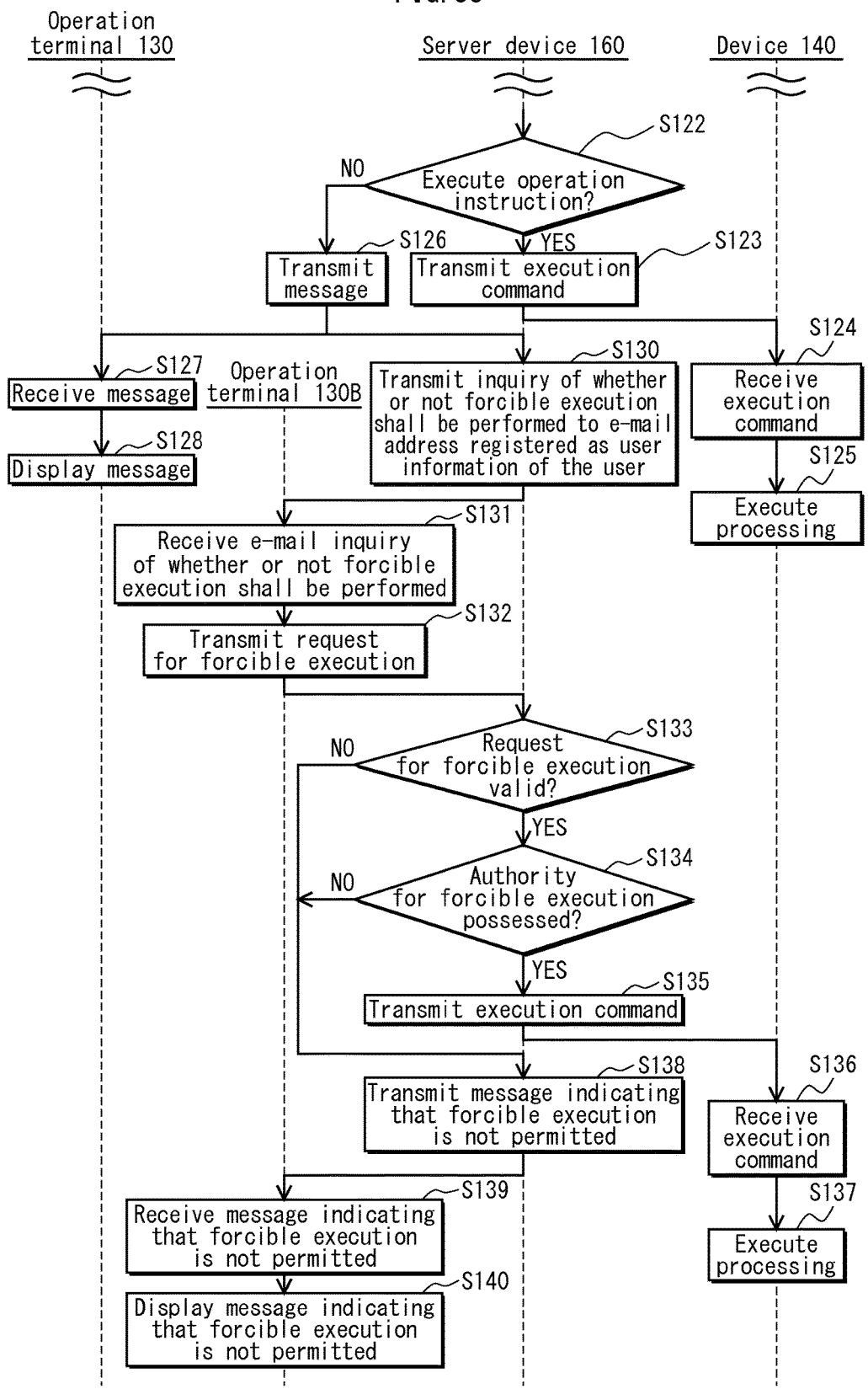
FIG. 35 illustrates one example of sequence of processing in remote operation by device control system 100B in embodiment 2.

FIG. 35 illustrates one example of the sequence of processing in the remote operation in embodiment 2.

Note that processing executed prior to Step S130 is the same as the processing in Steps S110 through S128 in FIG. 31. Thus, to simplify description and illustration, FIG. 35 does not illustrate the steps up to Step S121 and illustrates the processing in and following Step S122.

When NO in Step S122, the server device 160 transmits a message indicating rejection of execution of the function indicated by the operation instruction to the operation terminal 130 (Step S126), and transmits an e-mail inquiring whether or not the user desires to force execution of the function to an e-mail address 1835 registered in the user information 1800B (Step S130). This e-mail is received by the operation terminal 130B and not the operation terminal 130 (Step S131).

The user confirms the contents of this e-mail, and determines whether or not to cause forcible execution of the function. When the user determines to cause forcible execution of the function, the user inputs an instruction for causing forcible execution of the function to the operation terminal 130B. The operation terminal 130B, when receiving the input from the user, transmits a request for forcible execution of the function (Step S132).

The server device 160 receives the request for forcible execution of the function from the operation terminal 130B, and determines whether or not the request is valid (Step S133). Note that details of this determination have already been described in Step S62 in FIG. 34. The server device 160, when determining that the request for forcible execution of the function is valid (YES in Step S133), determines whether or not the user having issued the request possesses the authority to cause forcible execution of the function (Step S134). Note that details of this determination have already been described in Step S63 in FIG. 34.

The server device 160, when determining that the user having issued the request possesses the authority to cause forcible execution of the function, transmits an execution command to the operation-target device 140 (Step S135).

The operation-target device 140 receives the execution command transmitted by the server device 160 (Step S136), and executes processing corresponding to the execution command (Step S137).

Meanwhile, when NO in Step S133 or NO in Step S134, the server device 160 transmits, to the operation terminal 130B, a message indicating that forcible execution of the function is not permitted (Step S138).

The operation terminal 130B receives the message indicating that forcible execution of the function is not permitted (Step S139), and displays the message on the display unit 310 (Step S140).

<2.6 Conclusion>

In the device control system 100B pertaining to the present embodiment, after rejecting execution of a function indicated by an operation instruction issued from the operation terminal 130, the server device 160 transmits, to an e-mail address of the user, an inquiry of whether or not the user desires to force execution of the function. Further, when receiving an instruction from a valid user who possesses the authority to operate the operation-target device, the server device 160 determines whether or not to perform forcible execution of the function, as a result of which the server device 160 may execute the function once having been rejected.

According to this, when for example an operation instruction for operating a device 140, maliciously issued by a third party, is rejected by the server device 160, the server device 160 transmits an inquiry to an e-mail address of a valid user registered in advance to the server device 160 and not an e-mail address of the third party who has issued the invalid operation instruction. Due to this, the valid user can be notified of the issuance of the invalid operation instruction. Further, even when execution of a function based on an operation instruction issued by a valid user is rejected once, forcible execution of the function is realized by the server device 160 transmitting to the user an inquiry of whether or not the user desires to force the function to be executed, and by the user responding to this inquiry.

<3. Embodiment 3>

<3.1 Overview>

In the device control system 100 in embodiment 1, when the user issues an operation instruction for operating the operation-target device 140 by operating the operation terminal 130, the environment information of the operation-target device 140 is acquired.

Meanwhile, the present embodiment provides a device control system that differs from the device control system 100 in that, when a user logs in to the server device 160, the server device 160 acquires environment information of one or more devices registered by the user, determines whether or not one or more functions of each of the devices are executable, and transmits to the operation terminal 130 only functions that are executable.

Thus, the user is able to acknowledge, for each of one or more devices that the user has registered, one or more functions that are not available for operation, at the point when the user logs in to the server device 160. That is, the user is able to acknowledge devices and functions available for operation before issuing an operation instruction, and thus, is able to issue an operation instruction by selecting one operation from among functions that are available for operation.

Note that in the following, detailed description is not provided on structures and operations of the device control system pertaining to the present embodiment that are similar to those of the device control system 100, and by focusing on the differences between the device control system pertaining to the present embodiment and the device control system 100.

<3.2 Structure>

The present embodiment describes a device control system 100C. Since the device control system 100C has the same structure as the device control system 100, the same reference signs are used in the following description to simplify description.

In the present embodiment, when a user logs in to the server device 160 by using the operation terminal 130 and before the user performs an operation for issuing an operation instruction, the server device 160 issues an environment information acquisition respect with respect to each of one or more devices registered thereto by the user. Further, the server device 160, for each function of each of such devices, performs a determination of whether or not the function is operable based on the environment information so acquired. Further, the server device 160 in the present embodiment has a function of transmitting, to the operation terminal 130, information on operatable devices and functions. Thus, the server device 160 in the present embodiment differs from the server device 160 in embodiment 1.

Further, the operation terminal 130 in the present embodiment has a function of receiving, from the server device 160, information on operatable devices and functions after the user logs in to the server device 130 by using the operation terminal 130 and before a device menu is displayed. Thus, the operation terminal 130 in the present embodiment differs from the operation terminal 130 in embodiment 1.

<3.3 Operations>

This concludes the description of the structure of the device control system 100C. The following describes operations performed by the device control system 100C, with reference to the accompanying drawings.

<3.3.1 Operations of Operation Terminal 130>

The following describes the operations of an operation terminal 130.

Figure 36:
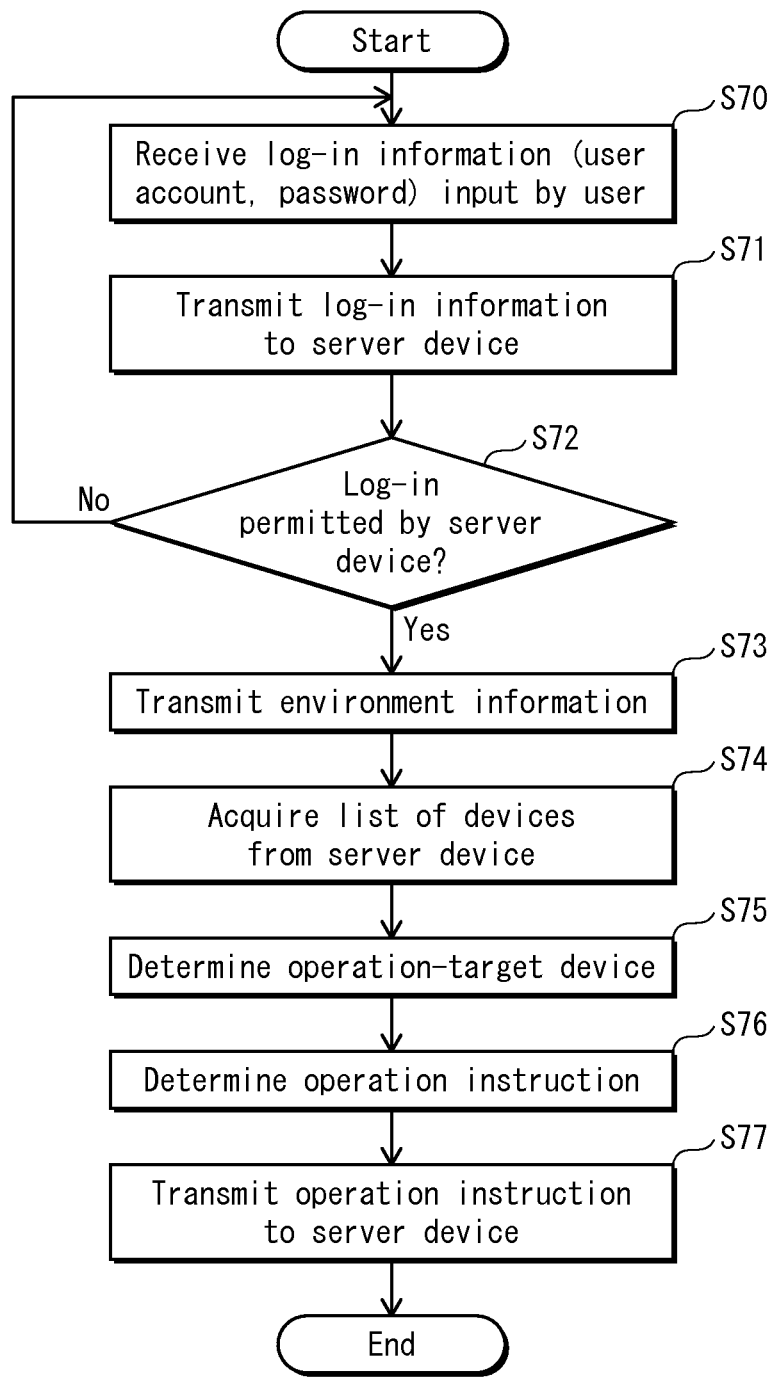
FIG. 36 is a flowchart illustrating processing by operation terminal 130 in embodiment 3.

FIG. 36 is a flowchart illustrating processing of the operation terminal 130 when issuing an operation instruction.

A user desiring to remotely operate a device 140 first logs in to the server device 160 by using the operation terminal 130, and issues an operation instruction according to an operation menu.

The operation reception unit 320 of the operation terminal 130 receives the user account and the log-in password that the user inputs to log in to the server device 160, and outputs the user account and the log-in password so received to the control unit 300 (Step S70).

The operation terminal 130 transmits the user account and the log-in password so received to the server device 160 via the communication unit 350. Here, note that a security module ID received from a first security module attached to the operation terminal 130 is also transmitted to the server device 160 along with the user account and the log-in password (Step S71). Note that the user account, the log-in password, and the security module ID are encrypted by the encryption processing unit 360 before transmission, and encrypted information yielded through the encryption is transmitted to the server device 160.

Then, the operation terminal 130 determines whether or not the user has been permitted to log in to the server device 160 (Step S72). In specific, this determination is made according to information transmitted from the server device 160 that indicates whether or not the user has been permitted to log in.

The operation terminal 130, when receiving information indicating that the user has not been permitted to log in from the server device 160 (No in Step S72), returns to Step S70.

Meanwhile, the operation terminal 130, when receiving information indicating that the user has been permitted to log in from the server device 160 (YES in Step S72), transmits environment information thereof to the server device 160 (Step S73). The environment information transmitted in Step S73 is similar to the environment information transmitted in Step S17 in FIG. 26.

Subsequently, the operation terminal 130 acquires a list of remotely-operatable devices from the server device 160 (Step S74). Note that the list of operatable devices acquired in Step S74 includes, among the devices that the user has registered to the server device 160, only devices that have functions that the server device 160 determines, at the point when the operation terminal 130 logs in thereto, as being executable when operation instructions for such functions are issued. This differs from the list of devices acquired in Step S13 in embodiment 1, which includes all devices that the user has registered to the server 160.

The display unit 310 displays the device list so acquired by using the touch panel 240, and the user performs an operation on the touch panel 240 with the device list displayed thereon to select an operation-target device.

The operation reception unit 320 receives the operation that the user performs on the touch panel 240, and the control unit 300 specifies the operation-target device based on the operation (Step S75).

Having selected the operation-target device, the user proceeds to selecting a function that the user would like to cause the operation-target device to execute by using the touch panel 240. Here, note that the touch panel 240 only displays functions that are executable. That is, the touch panel 240 does not display functions that are not executed even when operation instructions therefor are issued by the user.

The operation reception unit 320 receives this selection of function, and the control unit 300 specifies an operation instruction based on the selected function.

The control unit 300 transmits the operation instruction so specified to the server device 160 via the communication unit 350 (Step S77).

<3.3.2 Operations of Server Device 160>

The following describes the operations of the server device 160.

Figure 37:
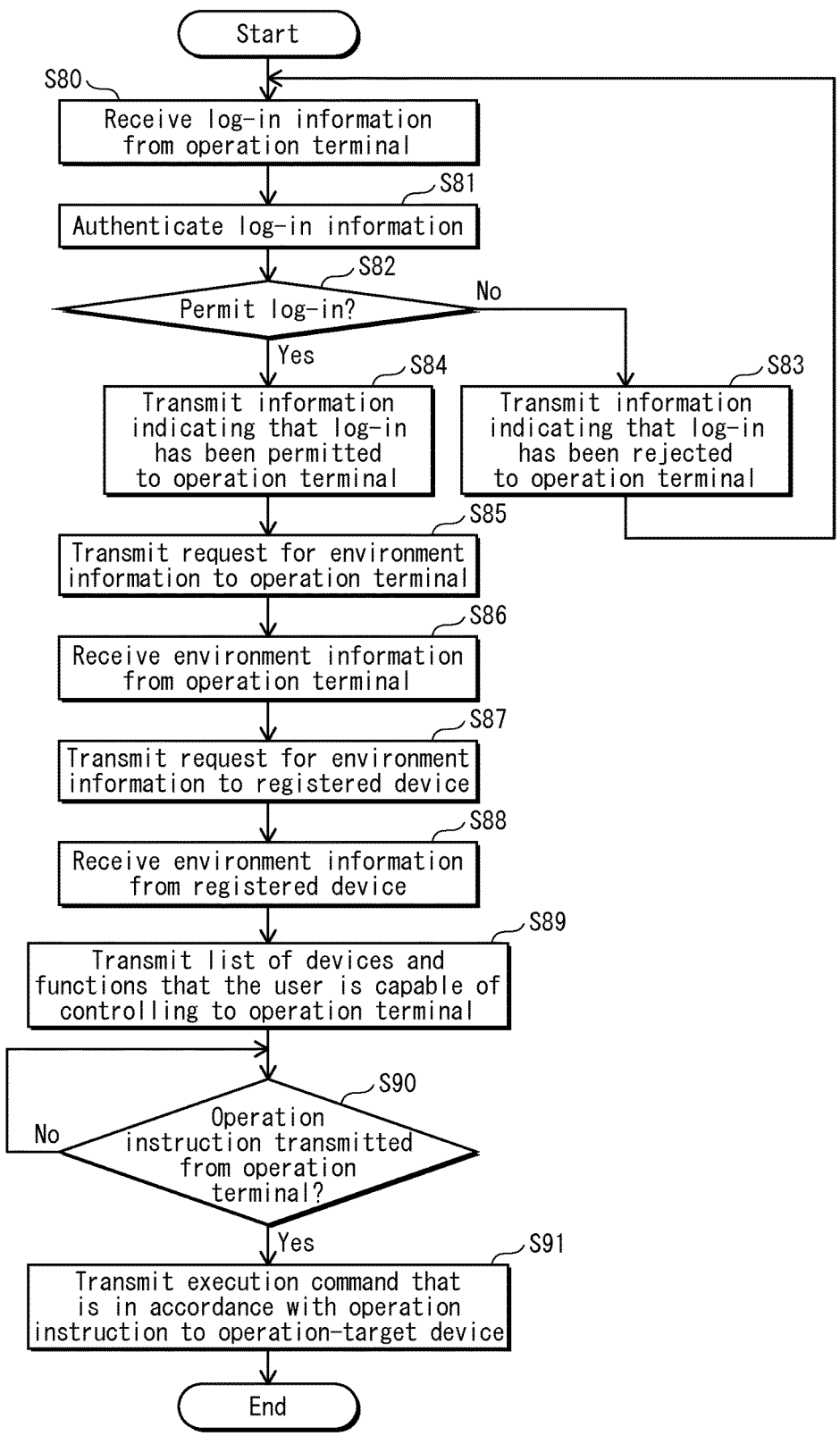
FIG. 37 is a flowchart illustrating processing by server device 160 in embodiment 3.

FIG. 37 is a flowchart illustrating processing of the server device 160 when accessed by an operation terminal 130 for remote operation.

The processing in each of Steps S80 through S84 in FIG. 37 is similar to the processing in a corresponding one of Steps S20 and S24 in FIG. 27, which have already been described in embodiment 1.

After executing the processing in Step S24, the control unit 1700 transmits, to the operation terminal 130, a request for acquisition of the environment information of the operation terminal 130 (Step S85). Then, the control unit 1700 receives the environment information of the operation terminal 130 in response to the request (Step S86).

Subsequently, the control unit 1700 refers to the user information 1800, and transmits, via the communication unit 1750, a request for acquisition of environment information to each of the devices that the logged-in user has registered to the server device 160 (Step S87). Here, the environment information requested by the control unit 1700 in Step S87 is similar to the environment information requested in Step S29 in FIG. 27, which has already been described in embodiment 1.

Subsequently, the determination unit 1720 determines, for each of the devices that the user has registered to the server 160, whether or not each function of the device is executable. The determination unit 1720 performs this determination based on the environment information acquired from the operation terminal 130 and the environment information acquired from the devices that the user has registered to the server device 160. In specific, this determination is performed based on a method similar to the method applied in Step S31 in FIG. 27. Further, based on the results of this determination, the server device 160 transmits, to the operation terminal 130, information on only the operatable devices and functions (Step S89).

Following this, the control unit 1700 waits for an operation instruction to be issued from the operation terminal 130 (Step S90), and when the control unit 1700 receives an operation instruction from the operation terminal 130 (YES in Step S90), the command issuing unit 1760 refers to the command information 2000 stored by the function information management unit 1740 to extract an execution command corresponding to the execution-target function, and the server device 160 transmits the execution command so extracted to the operation-target device 140 via the communication unit 1750 (Step S91).

<3.4 Specific Example of Operations of Device Control System 100C in Remote Operation>

The following explains the specific operations performed in the device control system 100C, which includes an operation terminal 130, one or more devices 140, and a server device 160 having the respective functions described above, when a device 140 is remotely operated by using the operation terminal 130.

Figure 38:
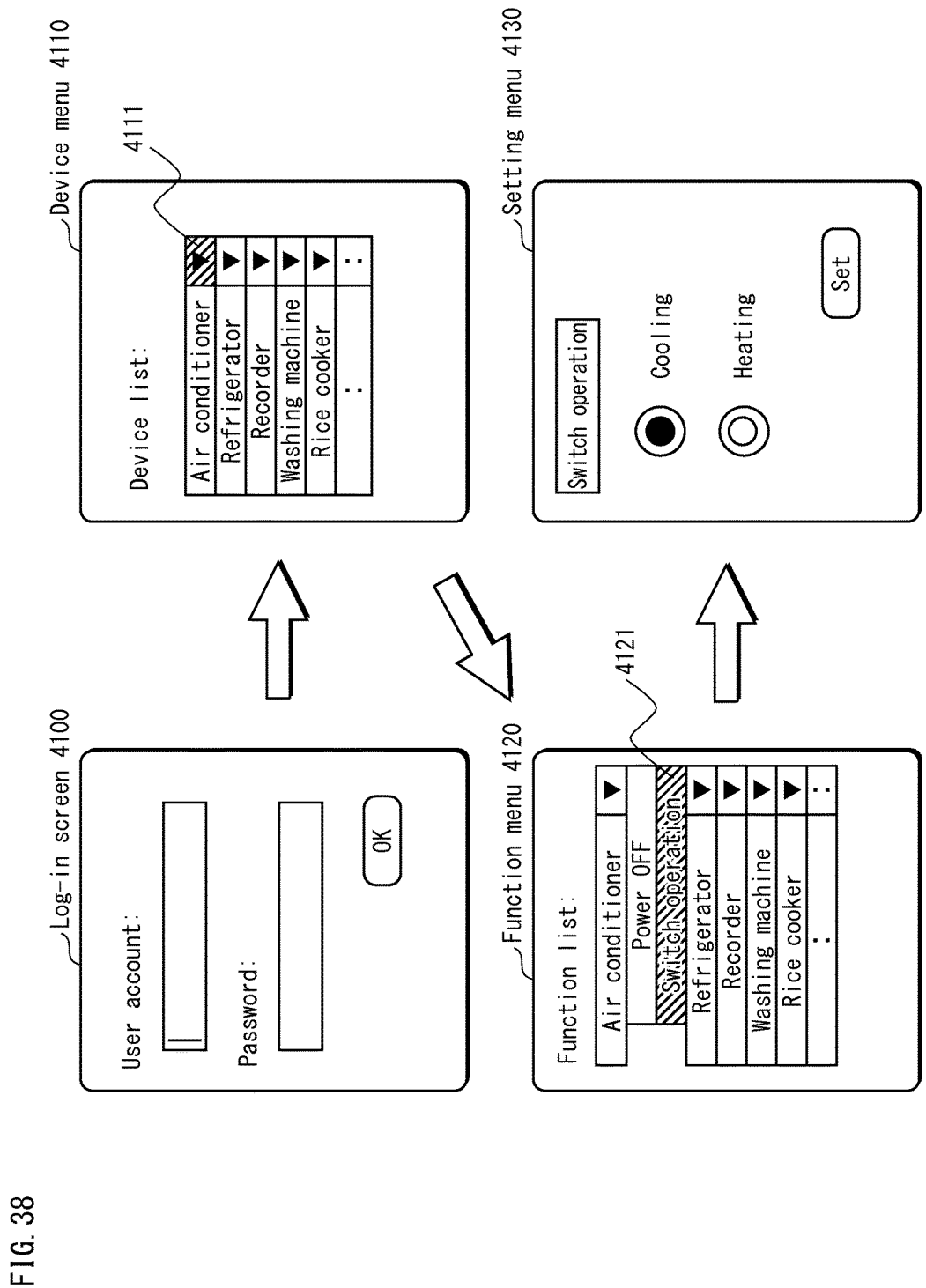
FIG. 38 illustrates one example of sequence of processing in remote operation by device control system 100C in embodiment 3.

FIG. 38 illustrates one example of a user interface displayed by the display unit 310 of the operation terminal 130. Further, FIG. 39 illustrates one example of the sequence of processing in the remote operation in the device control system 100C in the present embodiment.

First, a user desiring to remotely operate a device 140 inputs his/her user account and password on a log-in screen (e.g., the log-in screen 4100 illustrated in FIG. 38), whereby the user logs in to the server device 160 (Step S210). Here, description is provided based on the assumption that the user's user account and password are already registered to the server device 160. In specific, when the user presses the OK button after having input his/her user account and password, the control unit 300 of the operation terminal 130 encrypts the user account, the password, and a security module ID of the first security module 110 by using the encryption processing unit 360, and transmits the encrypted information to the server device 160 via the communication unit 350 as log-in information.

The server device 160 authenticates the log-in information so received (Step S211). In specific, the server device 160 receives the log-in information transmitted from the operation terminal 130, decrypts the log-in information so received by using the encryption processing unit 1710, and checks the validity of the log-in information so received by referring to the user information 1800 stored in the user information management unit 1730.

When determining that the log-in information is valid, the server device 160 transmits, to the operation terminal 130, a request for acquisition of the environment information of the operation terminal 130, and the operation terminal 130 transmits the environment information thereof to the server device 160 in response to the request (Step S212). The server device 160 receives the environment information transmitted from the operation terminal 130 (Step S213).

Subsequently, the server device 160 refers to the user information 1800, and transmits a request for acquisition of environment information to each of the devices that the logged-in user has registered to the server device 160 (Step S214).

A device 140 that receives the request for acquisition of environment information from the server device 160 transmits environment information thereof to the server device 160 in response to the request (Step S215).

Accordingly, the server device 160 receives environment information from each of the devices to which the request for acquisition of environment information has been transmitted (Step S216).

Subsequently, the server device 160, refers to the environment condition information stored in the environment condition storage unit 1735 based on the environment information received from the operation terminal 130 and each of the devices, and performs, for each function of each of the devices, a determination of whether or not to permit execution of the function, (Step S217). Further, the server device 160 transmits a device list and operation-permitted function information to the operation terminal 130 (Step S218). The device list is information on devices whose execution has been permitted and the operation-permitted function information is information on functions whose execution has been permitted.

The operation terminal 130 receives the device list transmitted from the server device 160, and causes the display unit 310 to display a list of devices that the user is able to remotely operate (e.g., the device menu 4110 illustrated in FIG. 38) based on the device list so received (Step S219).

The user selects one device that he/she would like to remotely operate from the devices included in the device menu 4110. In specific, when the user presses a pull-down button 4111 corresponding to an air conditioner in the device menu 4110 illustrated in FIG. 38 to operate the air conditioner, a list of controllable functions (e.g., the function menu 4120 illustrated in FIG. 38) is displayed. Note that in the example illustrated in FIG. 38, the server device 160 has made a determination to reject execution of the "Power ON" and "Set timer" functions of the air conditioner. Thus, the function menu 4120 illustrated in FIG. 38 differs from the function menu 4020 illustrated in FIG. 30 in that the "Power ON" and "Set timer" functions are not displayed.

The user selects one function for which an operation instruction is to be issued from among the functions included in the list. In the example of the function menu 4120, the user has selected the "Switch operation" function 4121. When the user selects the "Switch operation" function 4121, the operation terminal 13o causes the display unit 310 to display the setting menu 4130 for the "Switch operation" function 4121. When the setting menu 4130 is displayed, the user selects an operation that he/she would like to set on the setting menu 4130 so displayed. In the example illustrated in FIG. 38, the user has selected the operation of switching to cooling. When the user selects an operation and presses the "Set" button, the operation terminal 130 transmits an operation instruction corresponding to the operation so selected to the server device 160 (Step S220).

Subsequently, the server device 160 receives the operation instruction transmitted from the operation terminal 130 (Step S221). The server device 160, when receiving the operation instruction from the operation terminal 130, transmits an execution command corresponding to the operation instruction to the operation-target device 140 (Step S222).

When receiving the execution command from the server device 160 (Step S223), the device 140 executes the processing indicated by the execution command (Step S224).

<3.5 Conclusion>

In the device control system 100C pertaining to the present embodiment, only information pertaining to remotely operatable functions available at the point when the operation terminal 130 logs in to the server device 160 is transmitted from the server device 160 to the operation terminal 130. That is, the list of functions that the operation terminal 130 presents to the user to allow the user to operate devices only includes functions that devices are able to execute in the respective device states at the point when the user logs in to the server device 160. Thus, the user is able to acknowledge, before issuing an operation instruction for a function, whether or not the function is executable.

<4. Modifications>

In the above, the device control system pertaining to the present invention has been described based on embodiments thereof. However, the embodiments may for example be modified as described in the following without departing from the spirit and the scope of the present invention, and as such, the device control system pertaining to the present invention is not limited to those described in the embodiments.

(1) In embodiments 1 through 3, the environment information of the operation-target device 140, with respect to which the determination of whether or not environment conditions are satisfied is performed, is acquired solely from the operation-target device 140. However, such the environment information of the operation-target device 140 need not solely be acquired from the operation-target device 140. That is, the environment information of the operation-target device 140 may be acquired from any source, as long as such environment information is acquirable. For example, part of the environment information of the operation-target device 140 may be acquired from a device, a sensor, or the like other than the operation-target device 140, or may be acquired from user information, function management information, or the like managed by the server device 160. To provide a specific example, the location information of the operation-target device 140 may not be acquired from the operation-target device 140 itself, and may instead be calculated from an address included in a piece of attribute information 1840 in the user information 1800. Alternatively, a modification may be made such that location information 1880 is added to the user information 1800. Illustration of the user information modified in such a manner (i.e., user information 1800C) is provided in FIG. 40. When making such a modification, location information (latitude and longitude) of each device that a user registers to the server device 160 is registered in advance to the server device 160 as location information 1880, and the location information of the operation-target device 140 is acquirable from the corresponding piece of location information 1880.

Further, information pertaining to a surrounding of the operation-target device 140 (e.g., information regarding whether or not a person is present around the operation-target device 140) may be acquired from a human detection sensor or the like located in the same area as the operation-target device 140. Alternatively, information of temperature, humidity, and present year, month, date, and time, etc., may be acquired from one or more dedicated sensors located in the same areas as the operation-target device 140.

When making such modifications, each device 140 no longer needs to include one or more sensors of types similar to those described above for the acquisition of environment information, and the server device 160 would be able to acquire environment information of the devices 140 in an efficient manner.

(2) In embodiments 1 and 2, the server device 160 acquires the environment information of the operation terminal 130 having issued an operation instruction. However, the environment information of the operation terminal 130 need not be acquired. That is, it suffices for the environment information of the operation terminal 130 to be acquired only when the environment conditions that are set requires such information to be used in the determination of whether or not to permit execution of a function. For example, when the operation terminal 130 issues an operation instruction for executing a function to which a condition based on the positional relationship between the operation terminal 130 and the operation-target device 140 is not set, environment information indicating the location of the operation terminal 130 is not necessary, in which case such environment information need not be acquired from the operation terminal 130.

(3) In embodiment 1, the environment information acquired from the operation-target device 140 includes all of the following information: information indicating the operation state of the operation-target device 140 (for example, whether or not the operation-target device 140 is currently in operation); information indicating the location of the operation-target device 140 (e.g., the latitude and longitude of the location of the operation-target device 140); information indicating the present date/time (including year and month); information indicating the temperature around the operation-target device 140; and information indicating whether or not a person is present around the operation-target device 140. However, the environment information acquired from the operation-target device 140 need not include all such information, as long as information necessary for performing the determination of whether or not environment conditions that are set are satisfied is acquirable. For example, in the device control system 100 in embodiment 1, when an operation instruction is issued for executing the "Power OFF" function of the recorder, it suffices for the environment information acquired from the recorder to include information indicating the present operation state of the recorder (i.e., whether or not the recorder is in recording) and information indicating whether or not a person is around the recorder. That is, information other than such information need not be acquired as environment information of the recorder.

(4) In embodiments 1 through 3, the location conditions in the location condition information 3100 are set based on the distance between the operation terminal 130 and devices 140, and the determination of whether or not to permit execution of a function indicated by an operation instruction (referred to in the following as the "determination of permission") is performed based on the distance between the operation terminal 130 and the operation-target device 140. However, the determination of permission need not be performed based on the distance between the operation terminal 130 and the operation-target device 140. That is, it suffices for the determination of permission to be performed based on any positional relationship between the operation terminal 130 and the operation-target device 140 at the point when the user attempts to control the operation-target device 140.

For example, a modification may be made such that the determination of permission is performed based on whether or not the operation terminal 130 and the operation-target device 140 are located within a predetermined area. For example, the predetermined area may be one country. In such a case, when the operation-target device 140 is located in Japan, execution of an operation instruction for operating the operation-target device 140 is rejected when issued from an operation terminal 130 located in the U.S.A., and is permitted when issued from an operation terminal 130 located in Japan. Note that the predetermined area need not be the same country and may be any area, provided that the area corresponds to a known unit into which geographical positions are classified. For example, the predetermined area may be the same administrative division (prefectures, in the case of Japan), or may be the same municipality (cities, wards, towns, or villages in the case of Japan).

In addition, a modification may be made such that the distance between the operation terminal 130 and the operation-target device 140 when execution of an operation instruction for operating the operation-target device 140 from the operation terminal 130 is permitted is stored as operation history, and further, execution of a new operation instruction for operating the operation-target device 140 from the operation terminal 130 is permitted when the difference between the distance between the operation terminal 130 and the operation-target device 140 at the point when the new operation instruction is issued and the distance between the operation terminal 130 and the operation-target device 140 acquired from the operation history is within a predetermined range.

(5) In embodiments 1 through 3, a plurality of environment conditions are set for one function, and the determination of permission is performed based on whether or not all of the environment conditions set to the function are satisfied. However, the determination permission need not be performed in such a manner. For example, only one environment conditions may be set for one function.

Alternatively, a modification may be made such that a plurality of environment conditions are set for one function, and the determination of permission is performed based on whether or not a specific one of such environment conditions set for the function is satisfied. Alternatively, a modification may be made such that a plurality of environment conditions are set for one function, and the different environment conditions are provided with different priority levels, in which case the determination of permission is performed such that when the result of the determination of permission differs for different ones of the environment conditions, the result of the determination corresponding to the environment condition with a higher degree of priority is used.

(6) In embodiments 1 through 3, in the user information, one or more devices that one user is able to operate is registered separately from one or more devices that another user is able to operate. However, the devices that users are able to operate need not be registered in such a manner in the user information, provided that specification is possible of devices that a logged-in user can operate. For example, when two or more users are able to operate a same device, the same device may be registered in association with the two or more users. In specific, such a modification is possible by modifying the user information such that one or more devices that users in a group can similarly operate are registered in association with the group.

FIG. 41 illustrates one example of a data structure of user information modified such that devices are registered in association with groups.

(User Information 1800D)

FIG. 41 illustrates user information 1800D. The user information 1800D includes information similar to the user information 1800B in embodiment 2, namely: one or more user names 1810; one or more user accounts 1820; one or more passwords 1830; one or more e-mail addresses 1835; one or more authority levels 1836; one or more attribute information pieces 1840; one or more device types 1850; one or more model numbers 1860; and one or more security module IDs 1870.

Meanwhile, the user information 1800D includes, in addition to the information included in the user information 1800B, one or more groups 1801 and one or more classes 1895.

Each group 1801 indicates a group of users able to operate the same devices. Here, note that there may be a group in which only one user is included.

Each class 1895 identifies whether a corresponding device is an operation-target device or an operation terminal. In specific, the indication of "Device" in a class 1895 indicates that the corresponding device is an operation-target device, whereas the indication of "Operation terminal" in a class 1895 indicates that the corresponding device is an operation terminal In the example illustrated in FIG. 41, group G includes user A and user B, and devices identified as being an air conditioner, a refrigerator, a recorder, a washing machine, a rice cooker, and a smartphone by the corresponding device types 1850 are registered as devices that both user A and user B are able to operate. Further, according to the example illustrated in FIG. 41, the user A and the user B issue operation instructions from a smartphone identified by a model type 1860 "P-06D" and a smartphone identified by a model type 1860 "P-02D".

(7) In embodiment 2, the determination of whether or not to perform forcible execution of a function is performed based on an authority level, which is set for each user. However, the authority required for causing forcible execution need not be set for each user, as long as it can be checked whether or not an issuer of a request for forcible execution possesses the authority for causing forcible execution. For example, instead of setting an authority level for each user, an authority level may be set for each operation terminal. When making such a modification, even when a malicious user uses a user account and a password of a valid user, the malicious user would not be able to cause forcible execution from operation terminals other than operation terminals for which an authority level required for causing forcible execution is set. Thus, the risk of devices being remotely operated maliciously is reduced to a further extent.

Further, in embodiment 2, only two authority levels are set, one ("1") being set when the authority to cause forcible execution is possessed and the other ("0") being set when the authority to cause forcible execution is not possessed. However, authority levels need not be set in such a manner, as long as determination is possible of whether or not the authority for causing forcible execution is possessed. For example, authority levels of different ranks may be provided instead of only authority levels "1" and "0", in which case possessors of authority levels of a predetermined rank or higher may be determined as possessing that the authority for causing forcible execution.

Further, when a modification such as modification (3) above is made and a plurality of users are able to operate the same device, the users may be provided with different authority levels. When making such a modification, when different users issue operation instructions contradicting with one another, the operation instruction issued by a user possessing a higher authority level may be given priority over the operation instruction issued by a user possessing a lower priority level.

(8) In embodiment 2, the validity of a request for forcible execution is determined based on whether or not a unique passphrase that has been included in an e-mail transmitted by the server device 160 is included in the request for forcible execution. However, the determination of validity of a request for forcible execution need not be performed in such a manner. That is, the determination may be performed in any way, as long as the validity of a request for forcible execution can be determined. For example, a modification may be made such that the server device 160 provides, in addition to a normal menu for remote operation, a dedicated operation menu solely for making a request for forcible execution, the server device 160 notifies a user of how the dedicated operation menu can be accessed, and determines the validity of a request for forcible execution based on whether or not the request has been issued by a user performing a predetermined operation on the dedicated menu. Alternatively, a modification may be made such that the server device 160 issues, to a user issuing an operation instruction, an authentication password having a limited period of validity, and determines that a request for forcible execution issued by the user is valid when the user has accessed the server device 160 by using the authentication password.

Further, a modification may be made such that when a user of a service provided by a service provider that manages the server device 160 and provides services for remote operation issues an operation instruction, an e-mail notifying how a dedicated operator can be reached is transmitted to the user, and an execution command based on the operation instruction is transmitted to an operation-target device when the user accesses the operator of the service provider and the operator determines that the user is a valid user.

(9) In the above, each password 1830 in the user information 1800 stored by the server device 160 is a hash value of a log-in password. However, each password 1830 may be information other than a hash value of a log-in password. That is, each password 1830 may store any type of information, as long as a user attempting to log in to the server device 160 can be authenticated by comparing the password 1830 with the password input by the user for logging in to the server device 160. For example, each password 1830 may store a log-in password, or may store a value obtained by encrypting a log-in password.

(10) In embodiment 2, the e-mail of inquiry of forcible execution is received by the operation terminal 130B, which differs from the operation terminal 130, which issues the operation instruction. However, the e-mail of inquiry of forcible execution may be received by the same operation terminal from which the operation instruction is issued. That is, as long as an inquiry of forcible execution is transmitted to a valid user (i.e., a user registered to the user information), the operation terminal from which the request for forcible execution is received may be the same operation terminal from which the operation instruction is issued.

Figure 42:
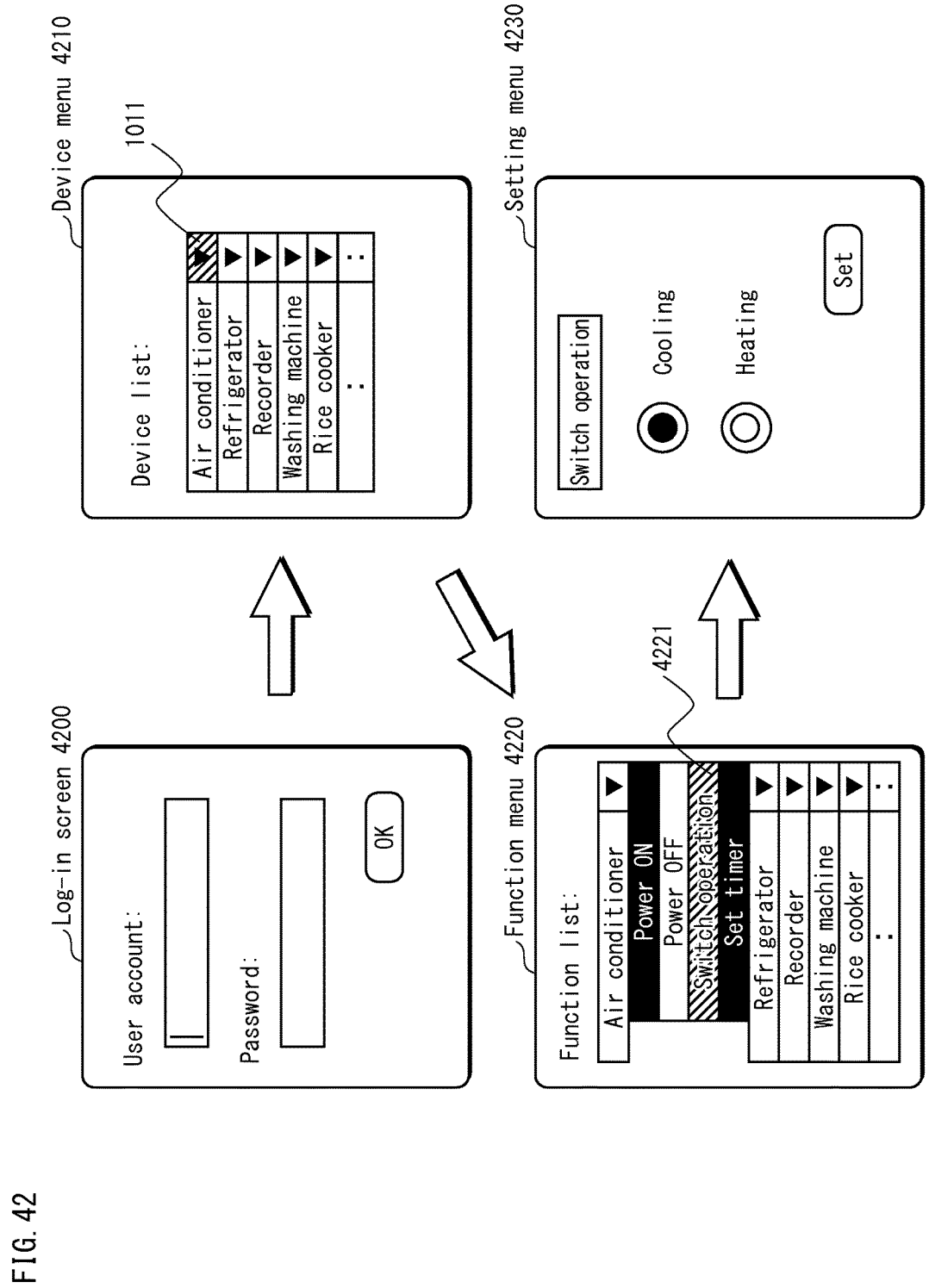
FIG. 42 illustrates a modification of user interface of operation terminal 130 in embodiment 3.

(11) In embodiment 2, only devices that can be operated at the point when the user logs in to the server device 160 are displayed, for example, as the device menu 4110, and only functions that can be executed at the point when the user logs in to the server device 160 are displayed, for example, as the device menu 4120. However, the menus displayed in such situations are not limited to such specific examples. That is, as long as display is performed so that the user can specify which devices can be operated and which functions can be executed, any form of display is applicable. For example, as illustrated in function menu 4220 in FIG. 42, a modification may be made such that functions that are not executable (the "Power ON" and "Set timer" functions in FIG. 42) are displayed differently from functions that are executable, by being displayed in reversed tone, displayed in a different color, or displayed grayed-out, for example. Alternatively, functions that are not executable may be displayed so that the user is not able to select such functions.

Further, a modification may be made such that when none of the functions of a given device are executable, the device itself is not displayed in the device menu 4210, or the device is displayed in the device menu 4210 differently from devices whose functions are executable, by being displayed in reversed tone, displayed in a different color, or displayed grayed-out, for example. Alternatively, a device whose functions are not executable may be displayed so that the user is not able to select such a device.

(12) In embodiments 1 through 3, the communication between the communication LSI 1110 and the home gateway 150 conforms to the Bluetooth™ protocol. However, the communication between the communication LSI 1110 and the home gateway 150 does not necessarily have to conform to the Bluetooth™ protocol, as long as the communication LSI 1110 and the home gateway 150 are able to communicate with one another. For example, the communication between the communication LSI 1110 and the home gateway 150 may be a wireless communication such as that conforming to the Wi-Fi™ protocol or a wired communication utilizing LAN connection.

(13) In embodiments 1 through 3, a user attempt to log in to the server device 160 is authenticated by using a user account and a password. However, the log-in information used when authenticating a user attempt to log in is not limited to such information. For example, biometrical information, such as information on the iris or information on a fingerprint, ma be used in addition to or in place of such information, in which case biometrics authentication is performed when authenticating a user attempt to log in. Further, a modification may be made such that the input of user account and password is unnecessary and a user, by transmitting information identifying a security module, logs in to the server device 160 or receives a list of operation terminals that can be operated.

(14) In embodiments 1 through 3, an operation terminal located outside a house is used to operate devices inside the house. However, the operation terminal need not be located outside a house and may be located anywhere when operated, as long as the operation terminal is able to communicate with the server device 160. For example, the operation terminal may be located inside the house, and may be used to remotely operate a device that is in the same room or a different room in the house.

Further, the operation terminal need not be a smartphone, and may be any device capable of issuing operation instructions for remotely operating other devices. For example, the operation terminal 130 may be a dedicated controller for remote operations or an information device such as a personal computer.

Further, the operation-target devices need not be household electrics device for ordinary household use. For example, the operation-target devices may be devices located inside cars, trains, or airplanes, medical devices located in hospitals, or may by business-use or industrial devices located in offices or factories.

(15) In embodiments 1 through 3, the server device 160 has the function of acquiring environment information from devices and the function of performing the determination of permission based on the environment information. However, the server device 160 need not be provided with all such functions. That is, as long as the device control system, in entirety, is capable of performing the above-described control for remotely operating devices, such functions may be distributed among multiple devices. Further, the rest of the functions of the server device 160 may also be distributed to other devices included in the device control system. For example, the home gateway 150 may be provided with the function of acquiring environment information from devices with which communication can be performed, the function of issuing execution commands for executing functions corresponding to operation instructions, and the function of transmitting the execution commands to operation-target devices. When making such a modification, the home gateway 150 acquires environment information, transmits the environment information to the server device 160, and receives operation instructions from the server device 160.

In addition, a modification may be made such that environment condition information similar to that managed by the server device 160, for devices that the operation terminal 130 is capable of operating, is stored to the operation terminal 130 in advance, and the operation terminal 130 performs the determination of whether or not to execute a function indicated by an operation instruction issued by a user. When making such a modification, the server device 160 acquires environment information of an operation-target device 140, and transmits the environment information to the operation terminal 130.

(16) All or some of the constituent elements described in the embodiments may be implemented by using an integrated circuit having one or multiple chips, may be implemented by using a computer program, or may be implemented in any other form.

In addition, the functions of the constituent elements described in the embodiments are realized by the constituent elements cooperating with processors of a server device, an operation terminal, a device, and first and second security modules.

(17) The device control method pertaining to the present invention may be realized by a computer by using a computer program, or may be transmitted as digital signals of such a computer program.

Alternatively, the present invention may be computer-readable recording media having such a computer program or digital signals recorded thereon. Example of such recording media include: a flexible disk, a hard disk, a CD-ROM, an MO, a DVD, a DVD-ROM, a DVD-RAM, a BD (Blu-ray™ Disc), and semiconductor memory. Alternatively, the present invention may be the computer program or the digital signals recorded on such recording media.

Alternatively, the present invention may be the above-described computer program or the above-described digital signals transmitted via networks, of which telecommunications networks, wired/wireless communications networks, and the Internet are representative, or via data broadcasting.

(18) The embodiments and modifications described above may be combined with one another.

<5. Supplement>

The following describes a structure of a device control system pertaining to one aspect of the present invention, as well as effects and modifications thereof.

(1) A first aspect of the present invention is a device control method used in a device control system in which an operation terminal is used to remotely operate a device with a server device mediating between the operation terminal and the device, the device control method including: receiving, from the operation terminal, an operation instruction for operation of the device; acquiring, upon reception of the operation instruction, environment information pertaining to at least one of the device and the operation terminal; performing a first determination of whether or not to cause execution of processing corresponding to the operation instruction based on whether or not the environment information satisfies a predetermined condition; and performing restriction of command execution such that (i) the device is caused to execute an execution command for execution of the processing when a result of the first determination is affirmative, and (ii) the device is not caused to execute the execution command when the result of the first determination is negative.

According to this, environment information is acquired when an operation instruction for operation of a device is issued from an operation terminal, and a determination is performed of whether or not a predetermined environment condition is satisfied based on the environment information so acquired, whereby a determination is made of whether or not to cause execution of processing corresponding to the operation instruction.

Accordingly, execution of a function based on an inappropriate operation instruction that does not satisfy the environment condition is prevented in the remote operation.

(2) The device control method pertaining to the first aspect of the present invention may further include storing an operation condition that indicates, for each of one or more functions of the device, whether or not execution of processing corresponding to the function is permitted in one or more operation states of the device, and the environment information may include information indicating an operation state of the device, the operation instruction may pertain to one of the functions of the device, and the operation condition may be referred to in the first determination, and the result of the first determination may be affirmative when determined that execution of processing corresponding to said one of the functions is permitted in the operation state indicated by the environment information.

According to this, a determination of whether or not execution of processing corresponding to an operation instruction is permitted is performed based on an operation state of an operation-target device at the point when the operation instruction is issued.

(3) In the device control method pertaining to the first aspect of the present invention, the environment information may include location information pertaining to locations of the operation terminal and the device, and the result of the first determination may be affirmative when information pertaining to a positional relationship between the operation terminal and the device, which is based on the location information, indicates a positional relationship within a predetermined range.

According to this, a determination of whether or not execution of processing corresponding to an operation instruction is permitted is performed based on a positional relationship between an operation terminal having issued the operation instruction and an operation-target device at the point when the operation instruction is issued.

(4) In the device control method pertaining to the first aspect of the present invention, the operation terminal may include a position measurement device that utilizes the GPS (Global Positioning System), and in the acquisition of the environment information, the location information pertaining to the operation terminal may be acquired from position information output from the position measurement device.

According to this, information pertaining to a location of an operation terminal can be accurately acquired by using the GPS.

(5) In the device control method pertaining to the first aspect of the present invention, the environment information may include time information pertaining to a time point at which the operation terminal issues the operation instruction, and the result of the first determination may be affirmative when the time information indicates a time point within a predetermined time period, in a condition pertaining to a relationship between the operation instruction and the time point at which the operation terminal issues the operation instruction.

According to this, a determination of whether or not execution of processing corresponding to an operation instruction is permitted is performed based on information pertaining to the time at the point when the operation instruction is issued.

(6) In the device control method pertaining to the first aspect of the present invention, the environment information may include temperature information pertaining to a temperature around the device, and the result of the first determination may be affirmative when the temperature information indicates a temperature within a predetermined temperature range, in a condition pertaining to a relationship between the operation instruction and the temperature around the device.

According to this, a determination of whether or not execution of processing corresponding to an operation instruction is permitted is performed based on information pertaining to the temperature around an operation-target device at the point when the operation instruction is issued.

(7) The device control method pertaining to the first aspect of the present invention may further include performing a detection of whether or not a person is within a predetermined range around the device, and the result of the first determination may be affirmative when a result of the detection indicates that a person is not within the predetermined range, in a condition pertaining to the operation instruction and the detection.

According to this, a determination of whether or not execution of processing corresponding to an operation instruction is permitted is performed based on information on whether or not a person is present around an operation-target device at the point when the operation instruction is issued.

(8) The device control method pertaining to the first aspect of the present invention may further include: transmitting, when the result of the first determination is negative, information indicating the negative result of the first determination to a user of the device; receiving input of information pertaining to the operation instruction from the user, to which the information indicating the negative result of the determination is transmitted; outputting, based on the input by the user, execution authority information pertaining to an authority of control required for causing execution of the processing; receiving the execution authority information; and performing, based on the execution authority information, a check of whether or not an authority required to cause forcible execution of the processing is possessed, and the restriction of command execution may be performed such that the device is exceptionally caused to execute the processing when a result of the check is affirmative.

According to this, even when execution of processing corresponding to an operation instruction is first rejected, forcible execution of the processing, execution of which is once rejected, is possible.

(9) The device control method pertaining to the first aspect of the present invention may further include: acquiring and storing user information pertaining to a determination of whether or not a user possesses the authority required to cause forcible execution of the processing, and the execution authority information may include user specification information enabling specification of the user who has issued the operation instruction, and the check may be performed by comparing the user information and the user specification information.

According to this, a check can be performed of whether or not a user having made a request to cause forcible execution possesses authority required to cause forcible execution, by referring to information stored in advance that indicates whether or not authority required to cause forcible execution is possessed.

Accordingly, when a request to cause forcible execution is received from a user who does not possess the authority required for causing forcible execution, forcible execution is not performed.

(10) A second aspect of the present invention is a device control method used in a device control system in which an operation terminal is used to remotely operate a device with a server device mediating between the operation terminal and the device, the device control method including: acquiring environment information to be used for performing the remote operation, the environment information pertaining to at least one of the device and the operation terminal; performing, for each of one or more functions of the device, a first determination of whether or not to permit execution of processing corresponding to the function, the first determination performed based on whether or not the environment information satisfies a predetermined condition; transmitting determination information indicating a result of the first determination to the operation terminal; causing the operation terminal to output an operation instruction pertaining to one function among the functions of the device, the determination information indicating that execution of processing corresponding to one or more of the functions of the device including said one function is permitted; receiving input of the operation instruction; and causing the device to perform control of execution of processing corresponding to the operation instruction.

According to this, a user is able to acknowledge operatable functions of each device at the point when the user logs in, and is able to issue an operation instruction by selecting a function among the functions operatable at the point when the user logs in.

(11) A third aspect of the present invention is a device control system that includes: a server device; an operation terminal; and a device, and that is for remotely controlling the device, via the server device, according to an operation instruction issued by the operation terminal, wherein the server device includes: a server device communication unit that communicates with the operation terminal and the device; an operation instruction reception unit that receives the operation instruction from the operation terminal via the server device communication unit; an environment information acquisition unit that, upon reception of the operation instruction by the operation instruction reception unit, acquires environment information pertaining to at least one of the device and the operation terminal via the server device communication unit; a determination unit that performs a determination of whether or not to cause execution of processing corresponding to the operation instruction based on whether or not the environment information satisfies a predetermined condition; and an execution restriction unit that performs restriction of command transmission by (i) transmitting, to the device via the server device communication unit, an execution command for execution of the processing when a result of the determination by the determination unit is affirmative, and (ii) not transmitting the execution command when the result of the determination by the determination unit is negative, the operation terminal includes: an operation terminal communication unit that communicates with the server device; an operation instruction unit that transmits an operation instruction for operation of the device to the server device via the operation terminal communication unit; and an environment information output unit that outputs environment information of the operation terminal to the server device via the operation terminal communication unit, and the device includes: a device communication unit that communicates with the server device; an environment information transmission unit that transmits environment information of the device to the server device via the device communication unit; an execution instruction reception unit that receives the execution command from the server device via the device communication unit; and a command execution unit that executes the processing when the execution instruction reception unit receives the execution command.

According to this, environment information is acquired when an operation instruction for operation of a device is issued from an operation terminal, and a determination is performed of whether or not a predetermined environment condition is satisfied based on the environment information so acquired, whereby a determination is made of whether or not to cause execution of processing corresponding to the operation instruction.

Accordingly, execution of a function based on an inappropriate operation instruction that does not satisfy the environment condition is prevented in the remote operation.

(12) A fourth aspect of the present invention is a server device that is used in a device control system for remotely operating a device, that receives an operation instruction for remote operation of the device from an operation terminal, and that performs execution control of processing corresponding to the operation instruction, the server device including: a communication unit that communicates with the operation terminal and the device; an operation instruction reception unit that receives an operation instruction for operation of the device from the operation terminal via the communication unit; an environment information acquisition unit that, upon reception of the operation instruction by the operation instruction reception unit, acquires environment information pertaining to at least one of the device and the operation terminal via the communication unit; a determination step that performs a determination of whether or not to cause execution of processing corresponding to the operation instruction based on whether or not the environment information satisfies a predetermined condition; and an execution restriction unit that performs restriction of command transmission by (i) transmitting, to the device via the communication unit, an execution command for execution of the processing when a result of the determination by the determination unit is affirmative, and (ii) not transmitting the execution command when the result of the determination by the determination unit is negative.

According to this, environment information is acquired when an operation instruction for operation of a device is issued from an operation terminal, and a determination is performed of whether or not a predetermined environment condition is satisfied based on the environment information so acquired, whereby a determination is made of whether or not to cause execution of processing corresponding to the operation instruction.

Accordingly, execution of a function based on an inappropriate operation instruction that does not satisfy the environment condition is prevented in the remote operation.

INDUSTRIAL APPLICABILITY

The present invention is usable as control technology for remotely operating a device by using an operation terminal with an external server device mediating between the operation terminal and the device.

REFERENCES SIGNS LIST 100, 100B, 100C device control system
110, 120, 120A, 120B, 120C security module
130, 130B operation terminal
140, 140A, 140B, 140C device
150 home gateway
160 server device
170 network 180 base station
325 environment information acquisition unit
370 operation terminal information storage unit
400 operation terminal information
910 command reception unit
960 environment information acquisition unit
970 device information storage unit
1000 device information
1210 command checking unit
1720 determination unit
1730 user information management unit
1735 environment condition storage unit
1740 function information management unit
1745 environment information acquisition unit
1760 command issuing unit
1800, 1800B, 1800C, 1800D user information
1900 function information
2000 command information
3000 operation condition information
3100 location condition information
3200 date/time condition information
3300 temperature condition information
3400 in-room presence condition information
4000, 4100, 4200 log-in screen
4010, 4110, 4210 device menu
4020, 4120, 4220 function menu
4030, 4130, 4230 setting menu

The invention claimed is:

1. A device control method used in a device control system in which an operation terminal is used to remotely operate a device with a server device mediating between the operation terminal and the device, the device control method comprising:
  receiving, from the operation terminal, an operation instruction for operation of the device;
  acquiring, upon reception of the operation instruction, environment information pertaining to at least one of the device and the operation terminal;
  performing, by using the environment information, a first determination of whether or not to cause execution of processing corresponding to the operation instruction;
  controlling command execution such that (i) the device is caused to execute an execution command for execution of the processing when a result of the first determination is affirmative, and (ii) the device is not always caused to execute the execution command when the result of the first determination is negative;
  only when the result of the first determination is negative, generating first information that is unique to the operation instruction and transmitting, to a predetermined destination which is associated with a user who has issued the operation instruction, an inquiry including the first information and inquiring whether or not the user desires to cause forcible execution of the processing, the predetermined destination acquired at least before the transmission of the inquiry;
  receiving, as a response to the inquiry, a request to cause forcible execution of the processing, the request including second information that is unique to the operation instruction; and
  performing a second determination of whether or not the request is valid by determining whether the second information included in the request matches the first information included in the inquiry, the request being determined as being valid only when the second information matches the first information, wherein
  in the generating first information that is unique to the operation instruction, the first information is generated, by the server device, as an arbitrary character sequence,
  in the performing the second determination, the second information matches the first information when the second information is a same arbitrary character sequence as the arbitrary character sequence generated in the generating first information that is unique to the operation instruction, and
  command execution is controlled such that the device is caused to execute the execution command only when the request is valid.

2. The device control method of claim 1 further comprising:
  storing an operation condition that indicates, for each of one or more functions of the device, whether or not execution of processing corresponding to the function is permitted in one or more operation states of the device, wherein
  the environment information includes information indicating an operation state of the device,
  the operation instruction pertains to one of the one or more functions of the device, and
  the operation condition is referred to in the first determination, and the result of the first determination is affirmative when determined that execution of processing corresponding to said one of the one or more functions is permitted in the operation state indicated by the environment information.

3. The device control method of claim 1, wherein
  the environment information includes location information pertaining to locations of the operation terminal and the device, and
  the result of the first determination is affirmative when information pertaining to a positional relationship between the operation terminal and the device, which is based on the location information, indicates a positional relationship within a predetermined range.

4. The device control method of claim 1, wherein
  the environment information includes time information pertaining to a time point at which the operation terminal issues the operation instruction, and
  the result of the first determination is affirmative when the time information indicates a time point within a predetermined time period, in a condition pertaining to a relationship between the operation instruction and the time point at which the operation terminal issues the operation instruction.

5. The device control method of claim 1, wherein
  the environment information includes temperature information pertaining to a temperature around the device, and
  the result of the first determination is affirmative when the temperature information indicates a temperature within a predetermined temperature range, in a condition pertaining to a relationship between the operation instruction and the temperature around the device.

6. The device control method of claim 1 further comprising:
  performing a detection of whether or not a person is within a predetermined range around the device, wherein
  the result of the first determination is affirmative when a result of the detection indicates that a person is not within the predetermined range, in a condition pertaining to the operation instruction and the detection.

7. The device control method of claim 1 further comprising:
receiving execution authority information pertaining to an authority of control required for causing execution of the processing; and
performing, based on the execution authority information, a check of whether or not an authority required to cause forcible execution of the processing is possessed, wherein
the command execution is controlled such that the device is not caused to execute the execution command when a result of the check is negative.

8. The device control method of claim 7, wherein
user information is acquired in advance, the user information pertaining to a determination of whether or not a user possesses the authority required to cause forcible execution of the processing,
the execution authority information includes user specification information enabling specification of the user who has issued the operation instruction, and
the check is performed by comparing the user information and the user specification information.

9. The device control method of claim 1, wherein
when the request is not received by a predetermined time point following the transmission of the inquiry, the device is not caused to execute the execution command.

10. The device control method of claim 1, wherein
the inquiry is received by another operation terminal differing from the operation terminal, and the request is received from the another operation terminal.

11. The device control method of claim 1, wherein
the inquiry is received by another operation terminal differing from the operation terminal, and the request is received from the operation terminal.

12. The device control method of claim 1, wherein
the inquiry is received by the operation terminal, and the request is received from the operation terminal.

13. The device control method of claim 1, wherein
each of the arbitrary character sequence generated in the generating first information that is unique to the operation instruction and the same arbitrary character sequence comprises a passphrase.

14. A device control method used in a device control system in which an operation terminal is used to remotely operate a device with a server device mediating between the operation terminal and the device, the device control method comprising:
acquiring environment information to be used for performing the remote operation, the environment information pertaining to at least one of the device and the operation terminal;
performing, for each of one or more functions of the device, a first determination of whether or not to permit execution of processing corresponding to the function, the first determination performed by using the environment information;
only when the result of the first determination is negative, generating first information that is unique to the operation instruction and transmitting, to a predetermined destination which is associated with a user who performs the remote operation, an inquiry including the first information and inquiring whether or not the user desires to cause forcible execution of one of the one or more functions of the device, the predetermined destination acquired at least before the transmission of the inquiry;
receiving, as a response to the inquiry, a request to permit forcible execution of said one of the one or more functions of the device, the request including second information that is unique to said one of the one or more functions of the device;
performing a second determination of whether or not the request is valid by determining whether the second information included in the request matches the first information included in the inquiry, the request being determined as being valid only when the second information matches the first information; and
transmitting determination information indicating a result of the first determination to the operation terminal, wherein
in the generating first information that is unique to the operation instruction, the first information is generated, by the server device, as an arbitrary character sequence,
in the performing the second determination, the second information matches the first information when the second information is a same arbitrary character sequence as the arbitrary character sequence generated in the generating first information that is unique to the operation instruction, and
the result of the first determination is affirmative when a result of the second determination is affirmative,
the device control method further comprises:
causing the operation terminal to output an operation instruction pertaining to one function among the one or more functions of the device, the determination information indicating that execution of processing corresponding to one or more of the one or more functions of the device including said one function is permitted;
receiving input of the operation instruction; and
causing the device to perform control of execution of processing corresponding to the operation instruction only when the request is valid.

15. A device control system that includes: a server device; an operation terminal; and a device, and that is for remotely controlling the device, via the server device, according to an operation instruction issued by the operation terminal, wherein
the server device comprises:
a first processor; and
a first non-transitory computer-readable recording medium having stored thereon first executable instructions, which when executed by the first processor, cause the server device to:
communicate with the operation terminal and the device;
receive the operation instruction from the operation terminal;
acquire, upon reception of the operation instruction, environment information pertaining to at least one of the device and the operation terminal;
perform, by using the environment information, a determination of whether or not to cause execution of processing corresponding to the operation instruction;
control command transmission by (i) transmitting, to the device, an execution command for execution of the processing when a result of the determination of whether or not to cause execution of processing corresponding to the operation instruction is affirmative, and (ii) not always transmitting the execution command when the result of the determination of whether or not to cause execution of processing corresponding to the operation instruction is negative;

store in advance a predetermined destination which is associated with a user who has issued the operation instruction, and only when the result of the determination is negative, generate first information that is unique to the operation instruction and transmit an inquiry including the first information and inquire whether or not the user desires to cause forcible execution of the processing to the predetermined destination;

receive, as a response to the inquiry, a request to cause forcible execution of the processing, the request including second information that is unique to the operation instruction; and perform a second determination of whether or not the request is valid by determining whether the second information included in the request matches the first information included in the inquiry, the request being determined as being valid only when the second information matches the first information, wherein the first information is generated, by the server device, as an arbitrary character sequence, in the performed second determination, the second information matches the first information when the second information is a same arbitrary character sequence as the generated arbitrary character sequence, and the execution command is transmitted only when the request is valid, the operation terminal comprises:
 a second processor; and
 a second non-transitory computer-readable recording medium having stored thereon second executable instructions, which when executed by the second processor, cause the operation terminal to:
 communicate with the server device;
 transmit an operation instruction for operation of the device to the server device; and
 output environment information of the operation terminal to the server device, and the device comprises:
 a third processor; and
 a third non-transitory computer-readable recording medium having stored thereon third executable instructions, which when executed by the third processor, cause the device to:
 communicate with the server device;
 transmit environment information of the device to the server device;
 receive the execution command from the server device; and
 execute the processing when the execution command is received.

16. A server device that is used in a device control system for remotely operating a device, that receives an operation instruction for remote operation of the device from an operation terminal, and that performs execution control of processing corresponding to the operation instruction, the server device comprising:
 a first processor; and
 a first non-transitory computer-readable recording medium having stored thereon first executable instructions, which when executed by the first processor, cause the server device to:
 communicate with the operation terminal and the device;
 receive the operation instruction for remote operation of the device from the operation terminal;
 acquire, upon reception of the operation instruction, environment information pertaining to at least one of the device and the operation terminal;
 perform, by using the environment information, a determination of whether or not to cause execution of processing corresponding to the operation instruction;
 control command transmission by (i) transmitting, to the device, an execution command for execution of the processing when a result of the determination of whether or not to cause execution of processing corresponding to the operation instruction is affirmative, and (ii) not always transmitting the execution command when the result of the determination of whether or not to cause execution of processing corresponding to the operation instruction is negative;
 store in advance a predetermined destination which is associated with a user who has issued the operation instruction, and only when the result of the determination is negative, generate first information that is unique to the operation instruction and transmit an inquiry including the first information and inquire whether or not the user desires to cause forcible execution of the processing to the predetermined destination;
 receive, as a response to the inquiry, a request to cause forcible execution of the processing, the request including second information that is unique to the operation instruction; and
 perform a second determination of whether or not the request is valid by determining whether the second information included in the request matches the first information included in the inquiry, the request being determined as being valid only when the second information matches the first information, wherein
 the first information is generated, by the server device, as an arbitrary character sequence,
 in the performed second determination, the second information matches the first information when the second information is a same arbitrary character sequence as the generated arbitrary character sequence, and
 the execution command is transmitted only when the request is valid.

* * * * *